United States Patent
Rodeheffer et al.

(10) Patent No.: US 6,721,275 B1
(45) Date of Patent: Apr. 13, 2004

(54) BRIDGED NETWORK STATIONS LOCATION REVISION

(75) Inventors: Thomas L. Rodeheffer, Mountain View, CA (US); Darrell Anderson, Durham, NC (US); Chandramohan A. Thekkath, Palo Alto, CA (US); Raymond P. Stata, Palo Alto, CA (US); Mark D. Lillibridge, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/494,858

(22) Filed: Feb. 1, 2000

Related U.S. Application Data

(60) Provisional application No. 60/132,265, filed on May 3, 1999, and provisional application No. 60/133,645, filed on May 11, 1999.

(51) Int. Cl.$^7$ .......................... H04L 12/46; H04L 12/66; G06F 13/00

(52) U.S. Cl. ...................... 370/238; 370/256; 370/401; 709/220; 709/250

(58) Field of Search ............................... 370/229, 231, 370/235, 238, 254, 255, 256, 389, 400, 401, 412, 428, 463, 465; 709/220, 223, 230, 238, 241, 249, 250

(56) References Cited

U.S. PATENT DOCUMENTS

| | | | | |
|---|---|---|---|---|
| 5,088,091 | A | | 2/1992 | Schroeder et al. .......... 370/94.3 |
| 5,138,615 | A | | 8/1992 | Lamport et al. ............ 370/94.3 |
| 5,535,338 | A | | 7/1996 | Krause et al. ............ 395/200.2 |
| 5,608,726 | A | * | 3/1997 | Virgile ........................ 370/401 |
| 5,898,686 | A | * | 4/1999 | Virgile ........................ 370/381 |
| 5,968,123 | A | * | 10/1999 | Fujiwara et al. ............ 709/223 |
| 5,968,130 | A | * | 10/1999 | Okanoue et al. ............ 709/238 |
| 6,192,436 | B1 | * | 2/2001 | Jacobson et al. ........... 710/104 |
| 6,434,157 | B1 | * | 8/2002 | Dube et al. .................. 370/401 |

OTHER PUBLICATIONS

Manual "OSI IS–IS Intra–domain Routing Protocol" including Section 8.4.4 "LAN Designated Intermediate Systems", by David Oran, 152 pages, RFC 1142, Feb. 1990. http://www.rfc–editor.org/rfc.html.
Patent application Ser. No. 09/496,246, entitled, "Bridged Networks with Smart Bridges", filed Feb. 1, 2000.
Patent application Ser. No. 09/496,294, entitled, "Bridged Network Topology Acquisition", filed Feb. 1, 2000.
Patent application Ser. No. 09/495,986, entitled, "Bridged Network Communications Initialization And Operation With Transparent Shortest Path Routing" Filed Feb. 1, 2000.
Web Page, "Free On Line Dictionary of Computing (FOLDOC)" http://wombat.doc.ic.ac.uk/foldoc/index.html, 24 pages, Dictionary Entries: Packet Switching, Network, Wide Area Network, Ethernet, Topology, Network Segment, Host, Node, Repeater, Bridge, Data Link Layer, Open Systems Interconnect (OSI), Physical Layer, Network Layer, Transport Layer, Session Layer, Presentation Layer, Application Layer, Fragmentation, Frame, Router, Network, Spanning Tree Algorithm and Epoch.

(List continued on next page.)

Primary Examiner—Alpus H. Hsu

(57) ABSTRACT

Managing end stations locations in a bridged network includes providing a smart bridge, and performing communications operations using a network flood active port connections table, a network flood reaching table, a best path forwarding table and a best path sourcing table. An end station locations revision manages a host location (HLOC) table. End stations locations revision is invoked upon detection of changes in any end station location. The end stations locations revision exchanges location revision grandparent (LRG), a location revision child (LRC) table and a location revision wavefront distribution protocol. The locations revision passes the location revision request from the smart bridge over a topology of the bridged network. A location revision wavefront starts at the root, and spreads a location revision request for revising the HLOC of the other smart bridges. The wavefront spreads by wavefront protocol.

23 Claims, 30 Drawing Sheets-

Flowchart of a routing function.

OTHER PUBLICATIONS

T.L. Rodeheffer and M.D. Schroeder, "Automatic Reconfiguration in Autonet", Digital, Systems Research Center, Report 77, Sep. 18, 1991, pp. 1–43.

Roosevelt Giles, "All–In–One CISCO CCIE Study Guide", Table of Contents, Chapter 2, Data Link Layer—MAC Layer Issues, pp. 21–138, Chapter 3, Logical Link Control Layer, pp. 139–165, Chapter 4, Bridging and LAN Switching, pp. 167–222, The McGraw–Hill Co., Inc., 1998, ISBN 0–07–913728–8.

"Bridge and Extended LAN, Reference", Table of Contents, Chapter 1–Introduction, Chapter 2–Bridge Operation, Chapter 3–The Spanning Tree, Chapter 4–Extended LAN and Bridge Management, pp. 1–1 to 4–10, and Chapter 6–Configuration, pp. 6–1 to 6–39, Digital Equipment Corporation, Sep. 1991, EK–DEBAM–HR–003.

"Local And Metropolitan Area Networks, IEEE Standard for Interoperable LAN/MAN Security (SILS)", IEEE Std. 802.10–1998, Cover, Introduction, pp. 1–36 and pp. 77–End, Institute of Electrical and Electronics Engineers, 1998, ISBN 0–7381–1419–7.

* cited by examiner

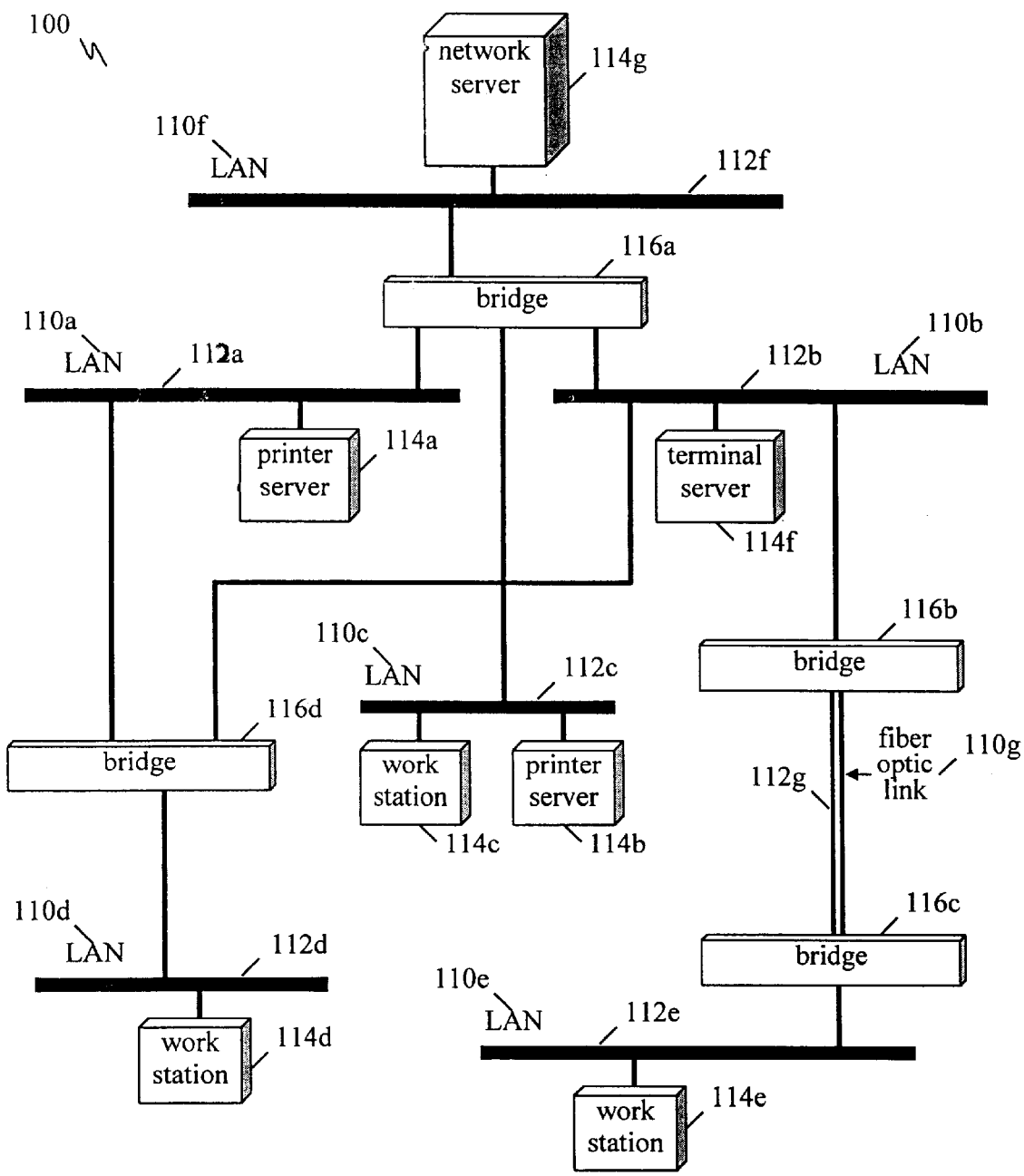
Figure 1: An example of a network with an extended network architecture.

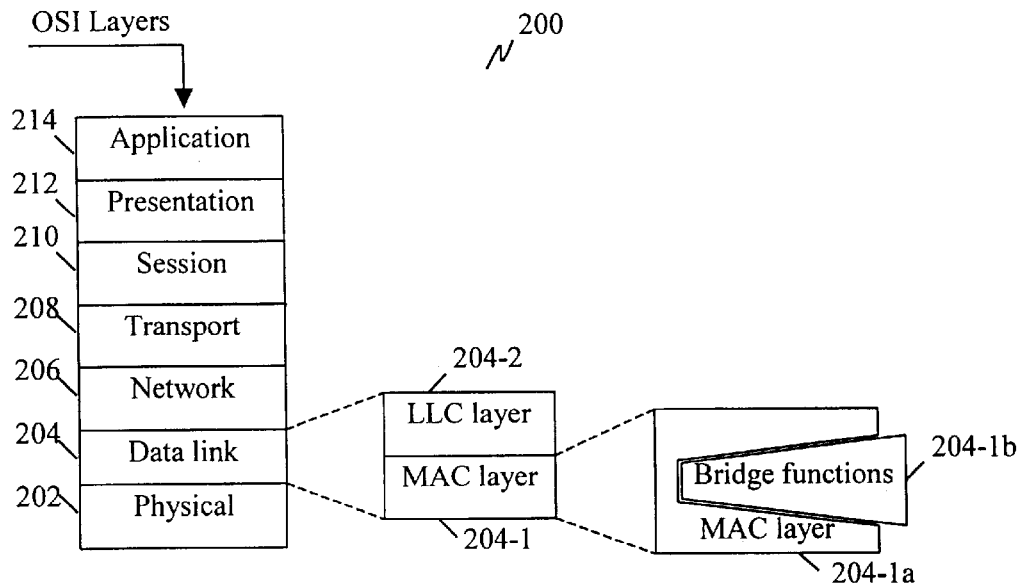
Figure 2: Data link layer bridging in the OSI (Open System Interconnect) architecture model.
Transmission Data Frame (Packet) IEEE 802.2/Ethernet 300
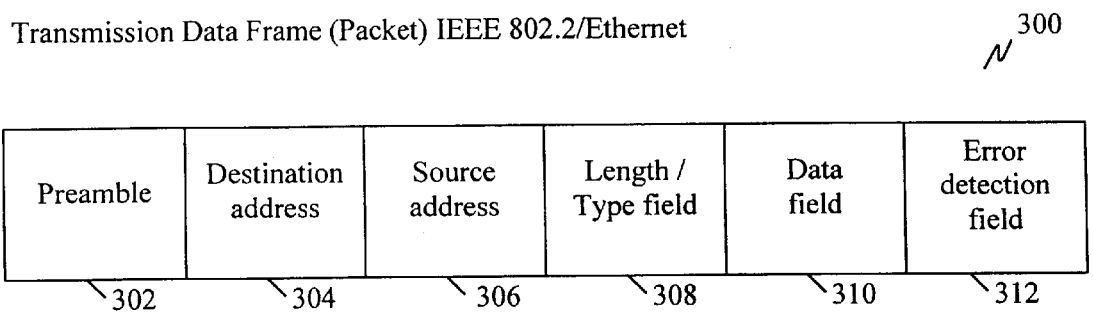
Figure 3: Transmission data frame (packet) that is relayed by bridges in the network.

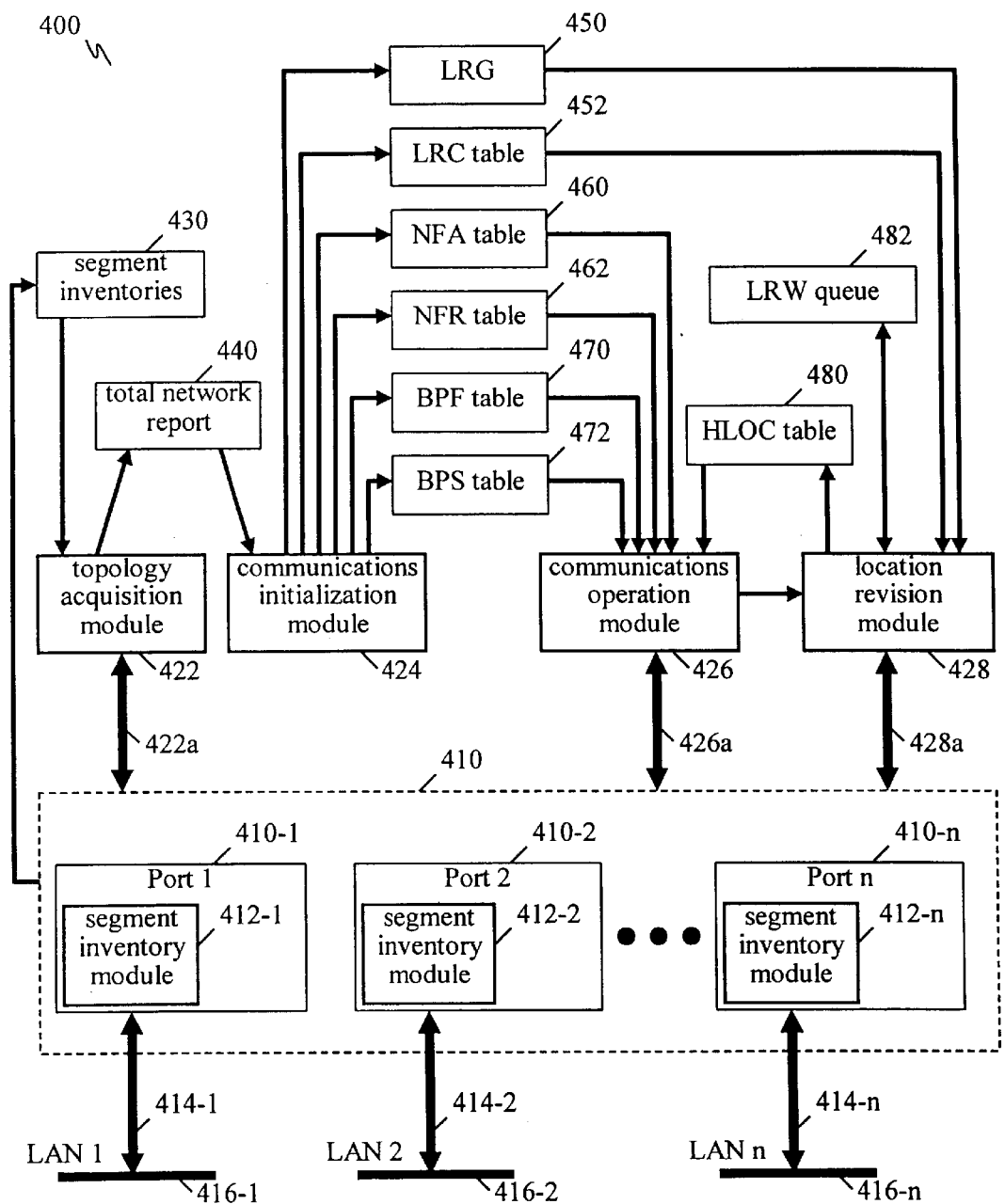
Figure 4: A structural model of bridges implemented in accordance with the invention.

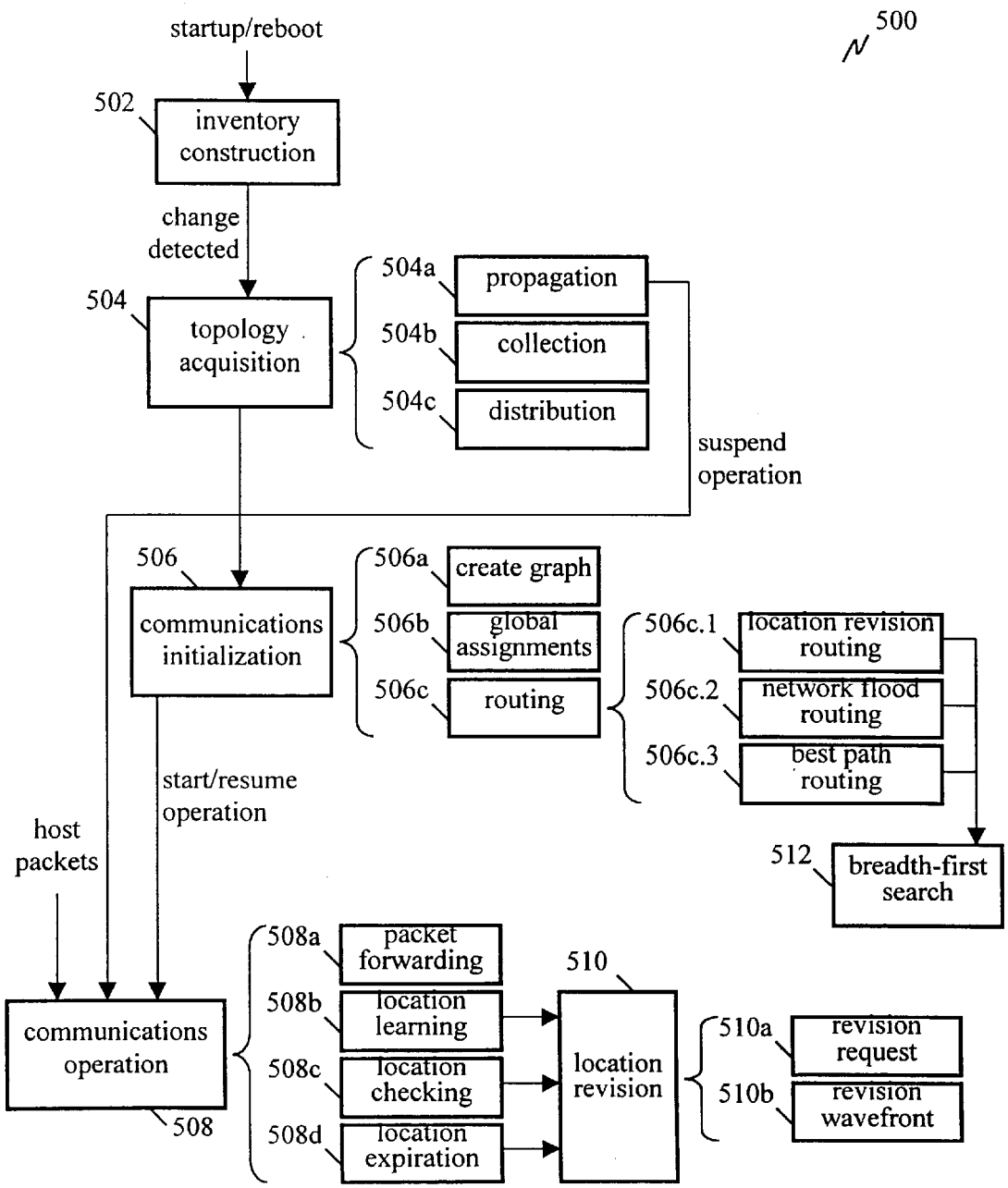
Figure 5: A suite of functions for providing a transparent shortest path routing in the bridged network.

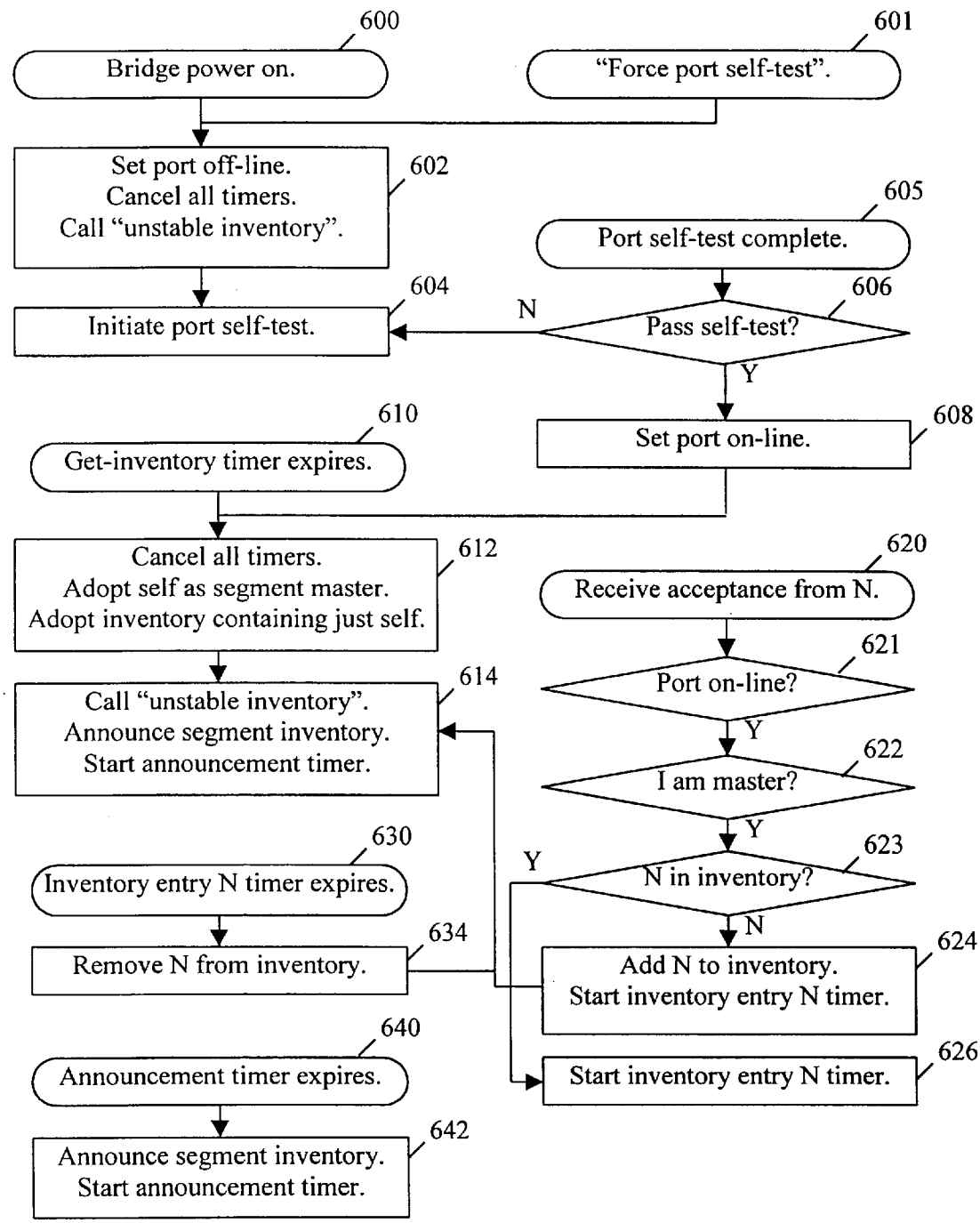
Figure 6a: A flowchart of a segment inventory function.

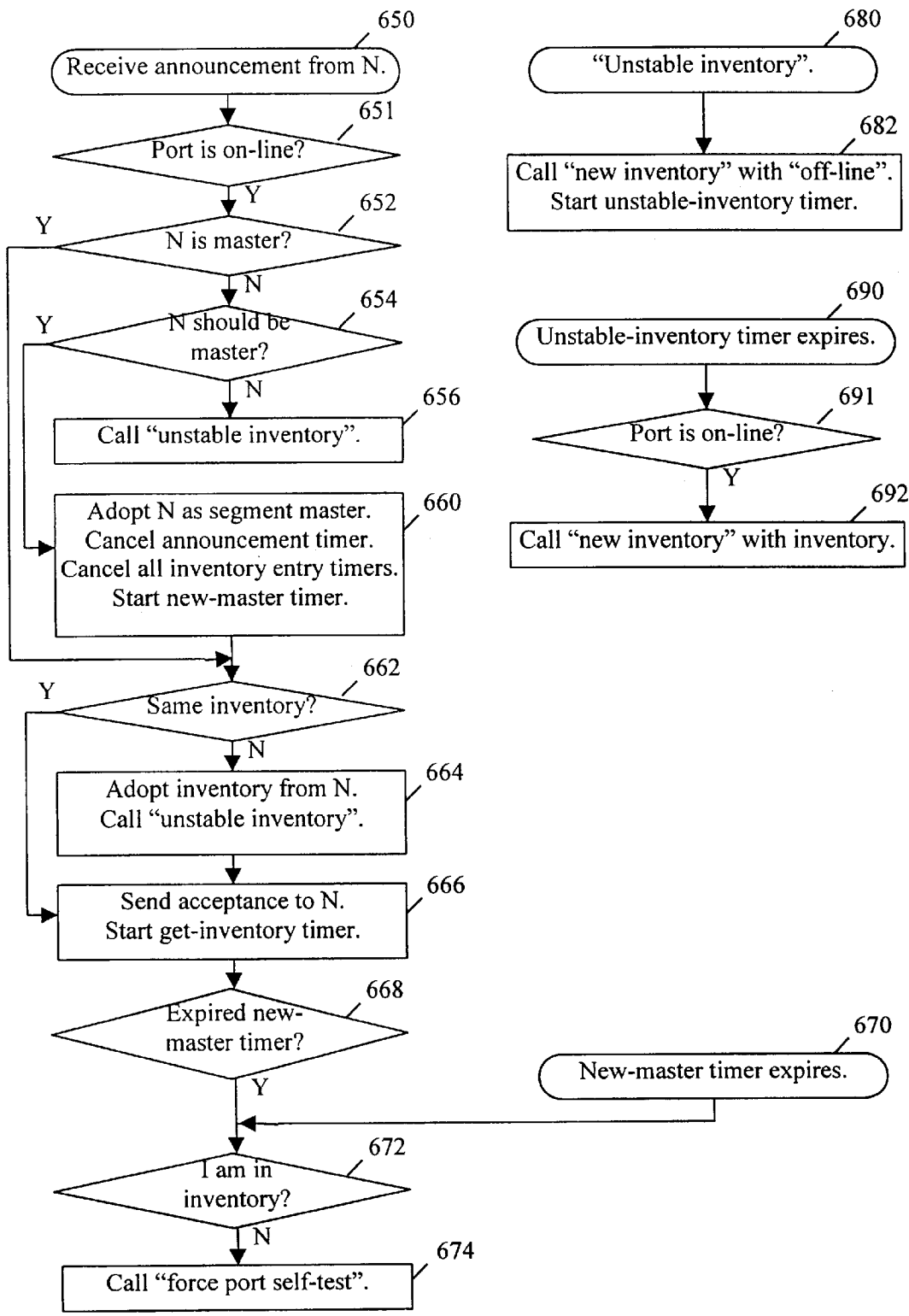
Figure 6b: A flowchart of a segment inventory function (continued).

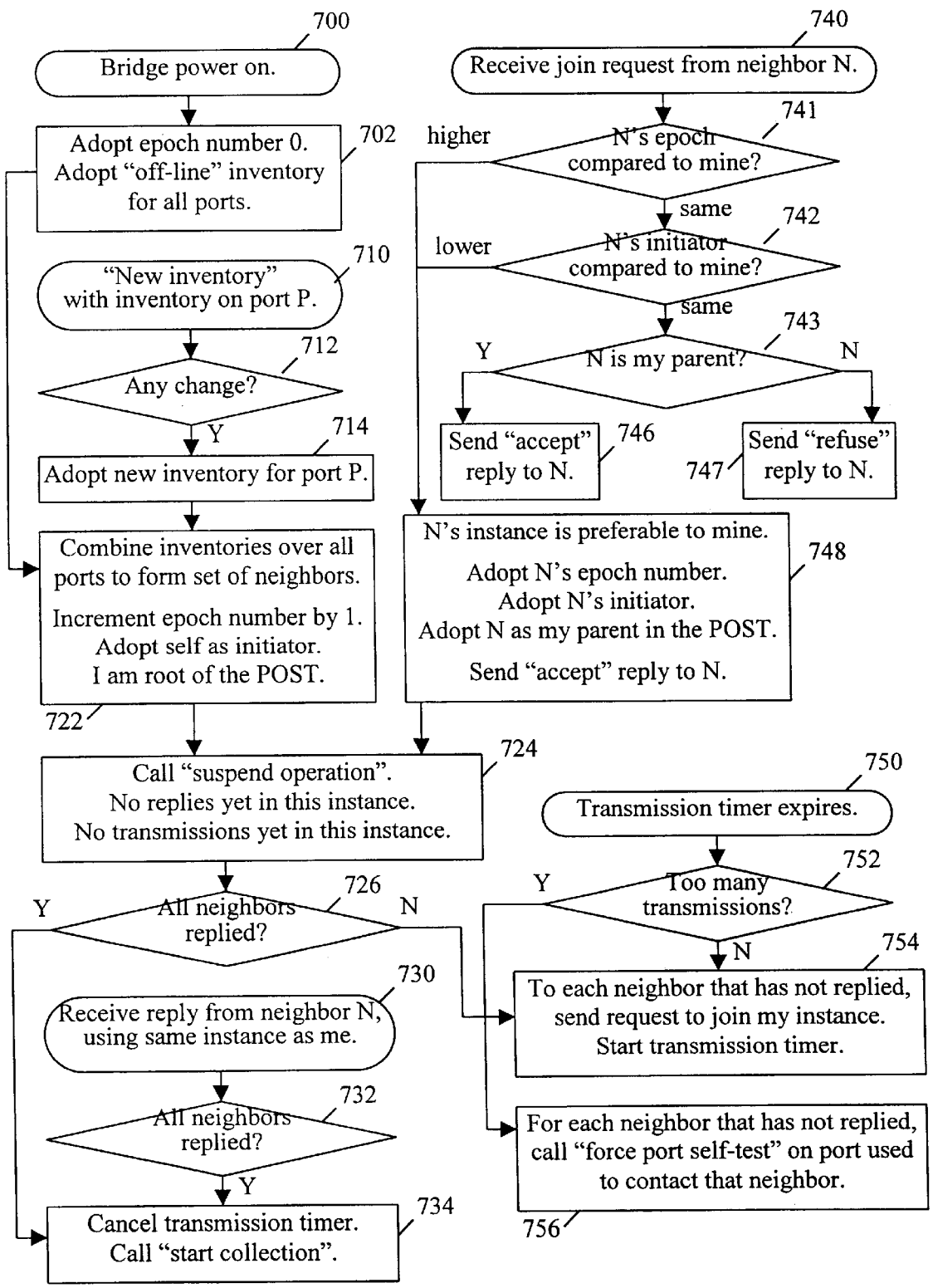
Figure 7: A flowchart of a propagation function.

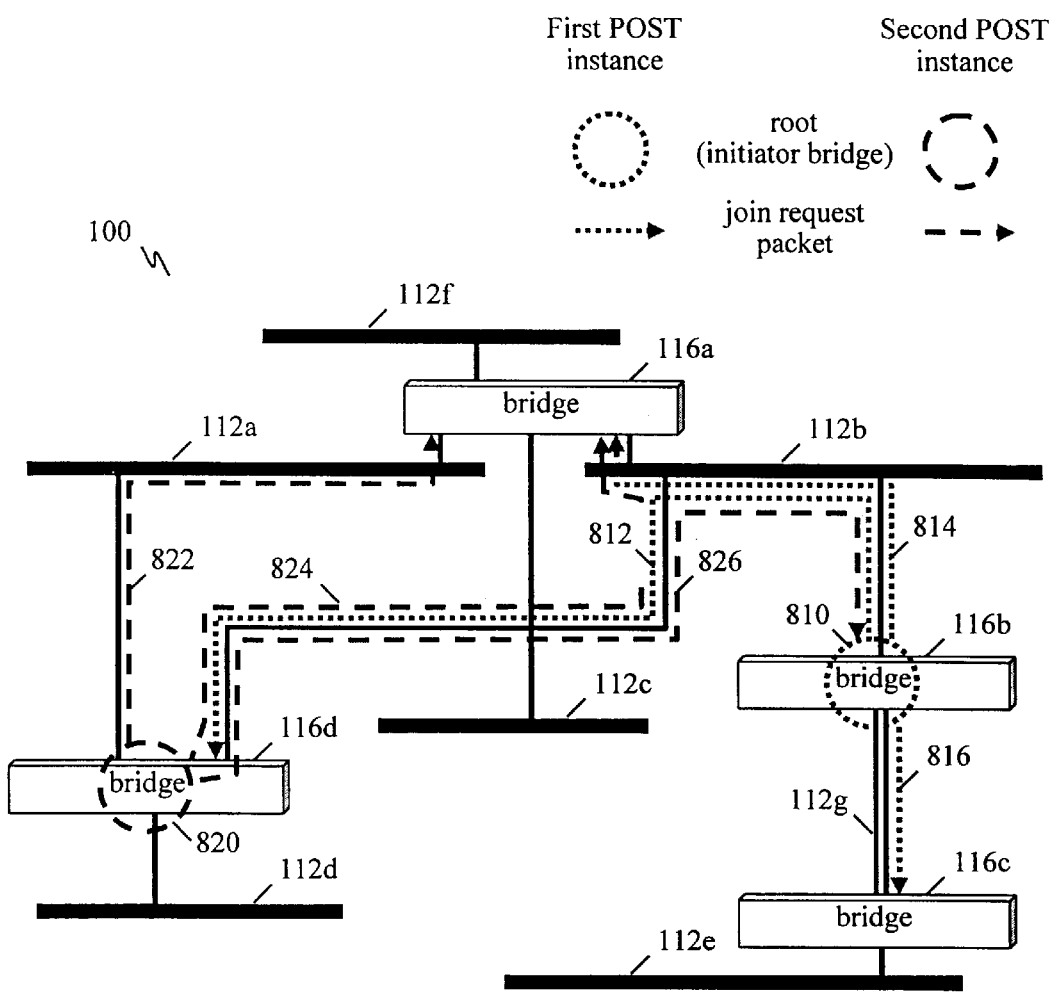
Figure 8: Construction of a POST (propagation order spanning tree), taking for example the network of Figure 1.

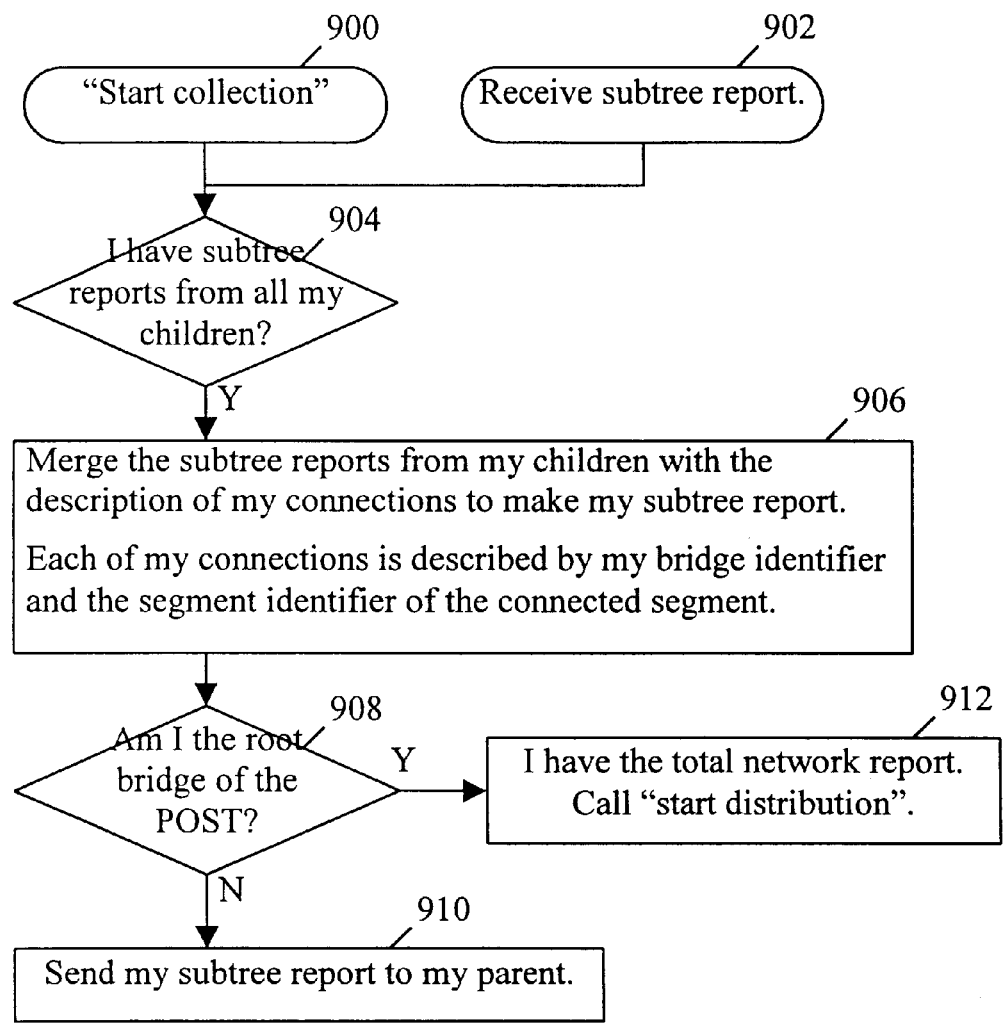
Figure 9: Flowchart of a collection function.
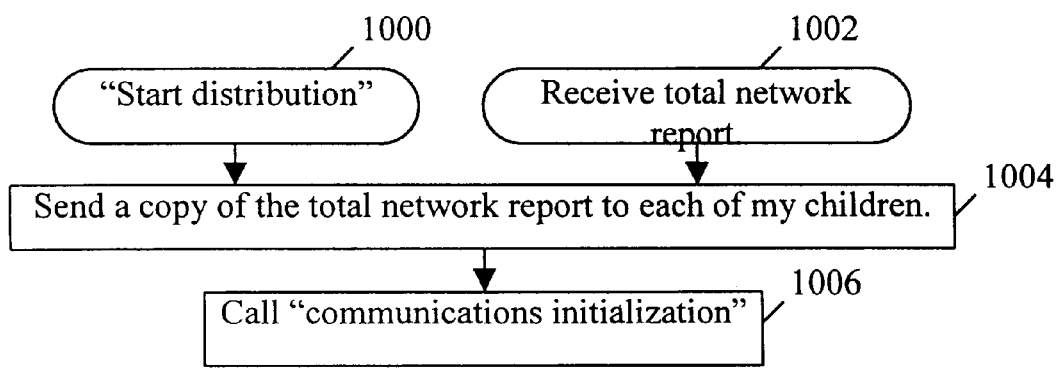
Figure 10: Flowchart of a distribution function.

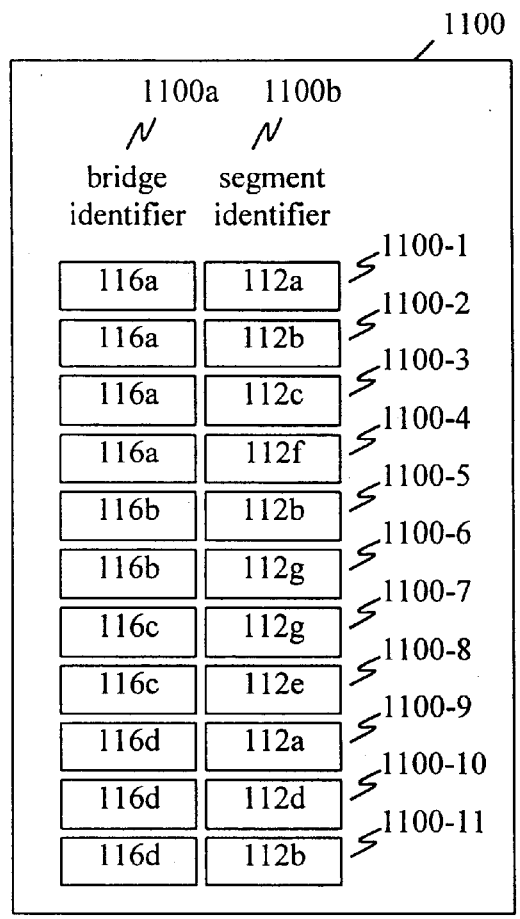
Figure 11: A total network report, taking for example the network of Figure 1.
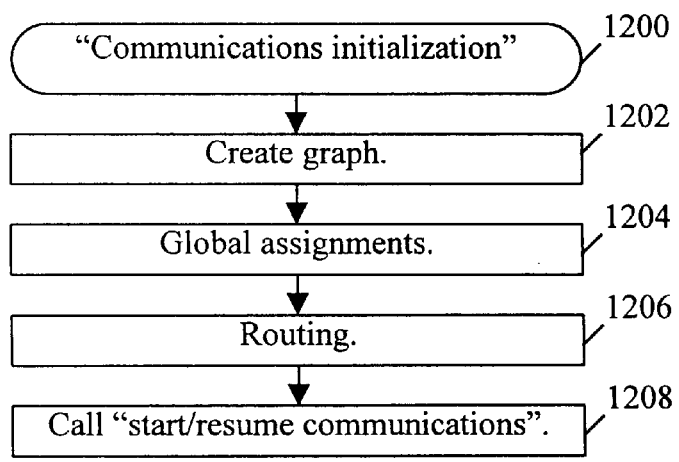
Figure 12: Flowchart of a communications initialization function.

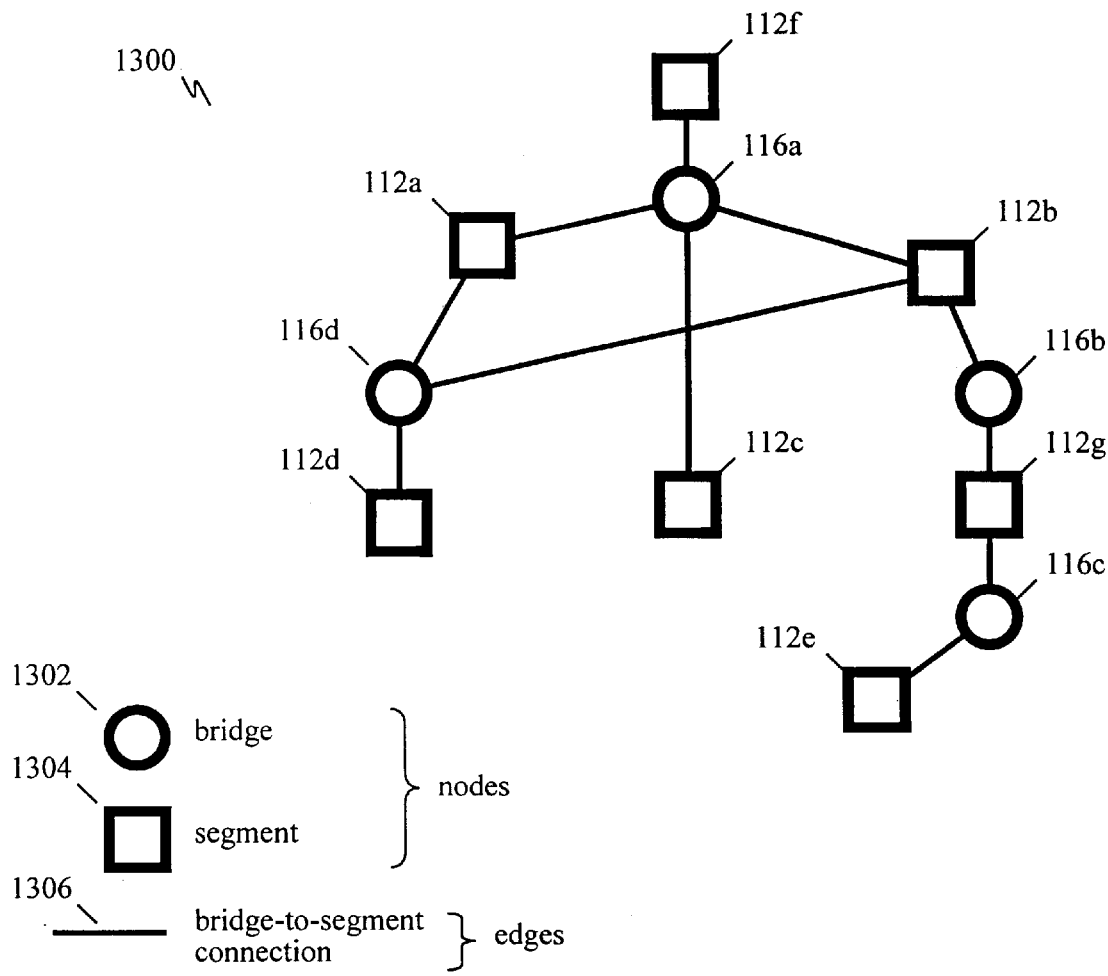
Figure 13: Graphical representation of the bridges, segments, and connections in the network of Figure 1.
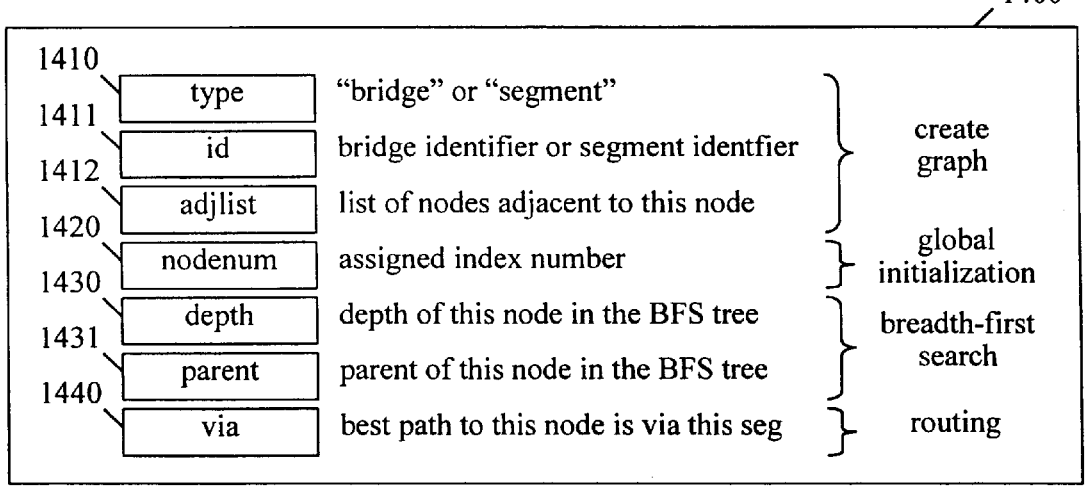
Figure 14: Node data structure used in the preferred embodiment.

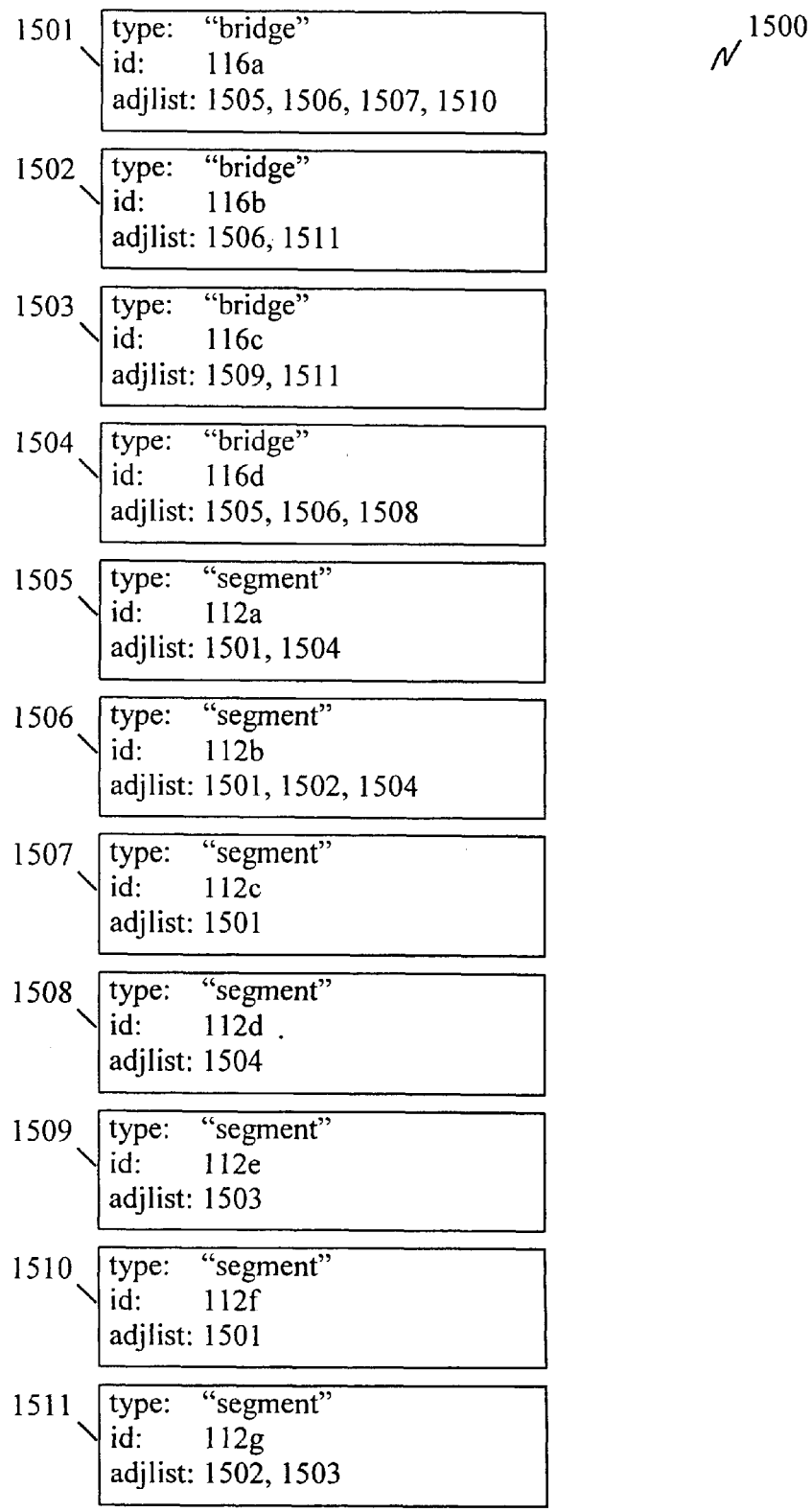
Figure 15: A network topology graph data structure taking for example the network of Figure 1.

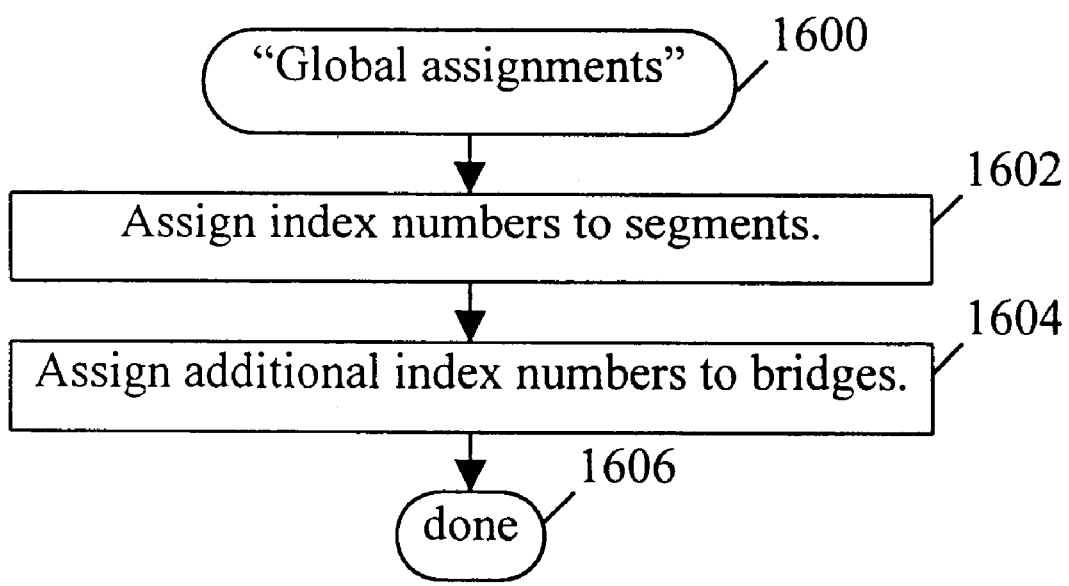
Figure 16: Flowchart of a global assignments function.

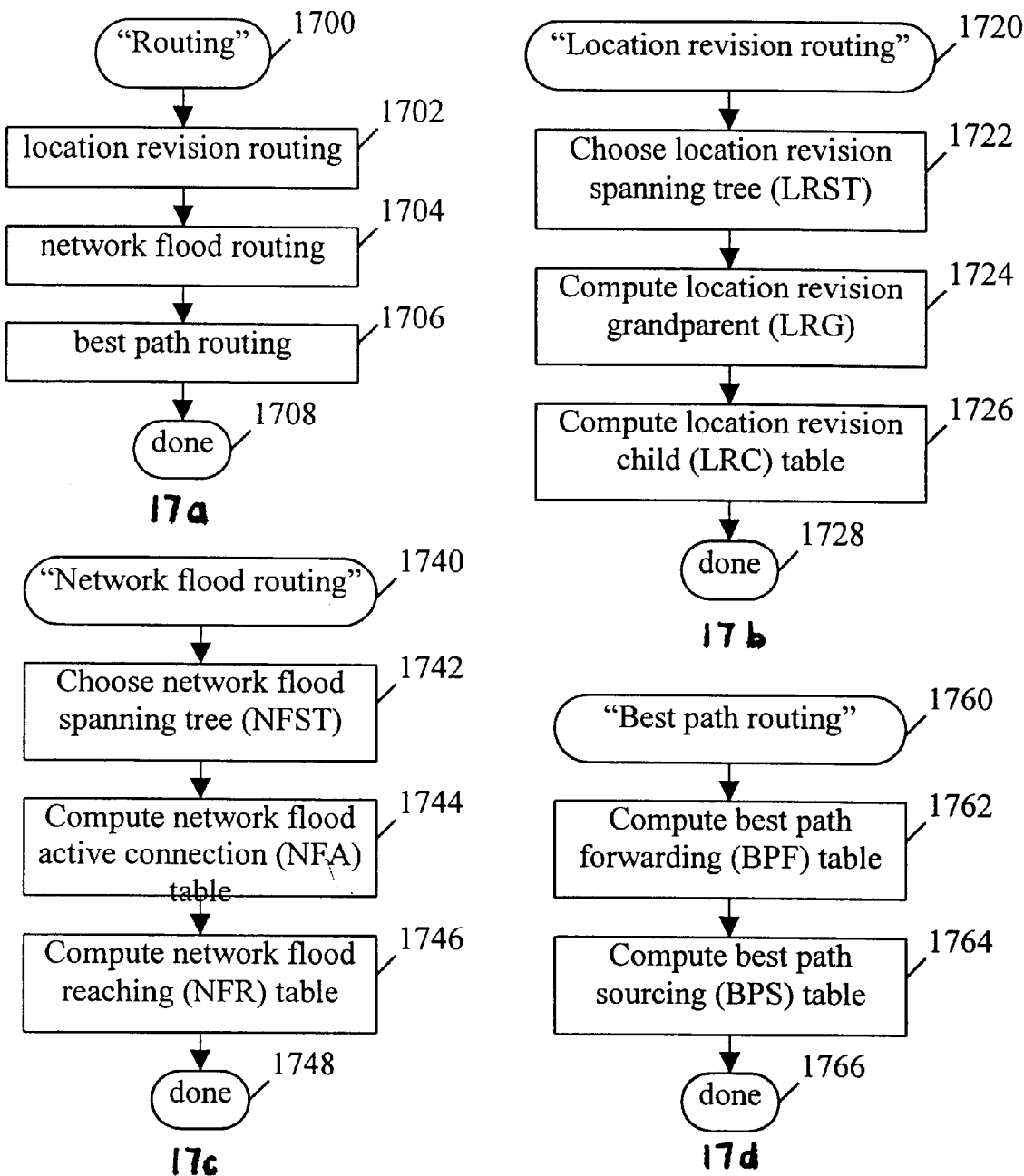
Figure 17: Flowchart of a routing function.

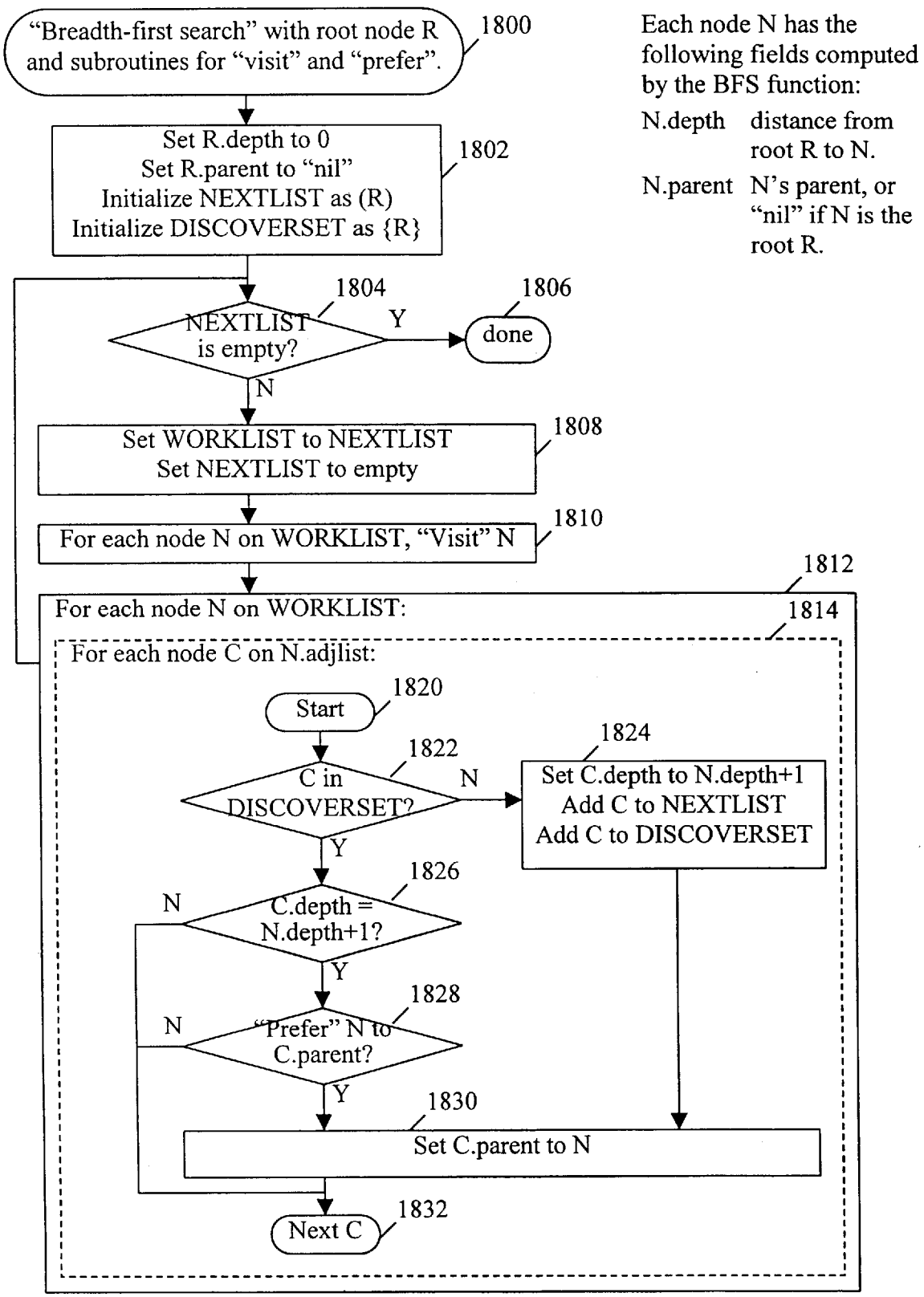
Figure 18: Flowchart of a breadth-first search function.

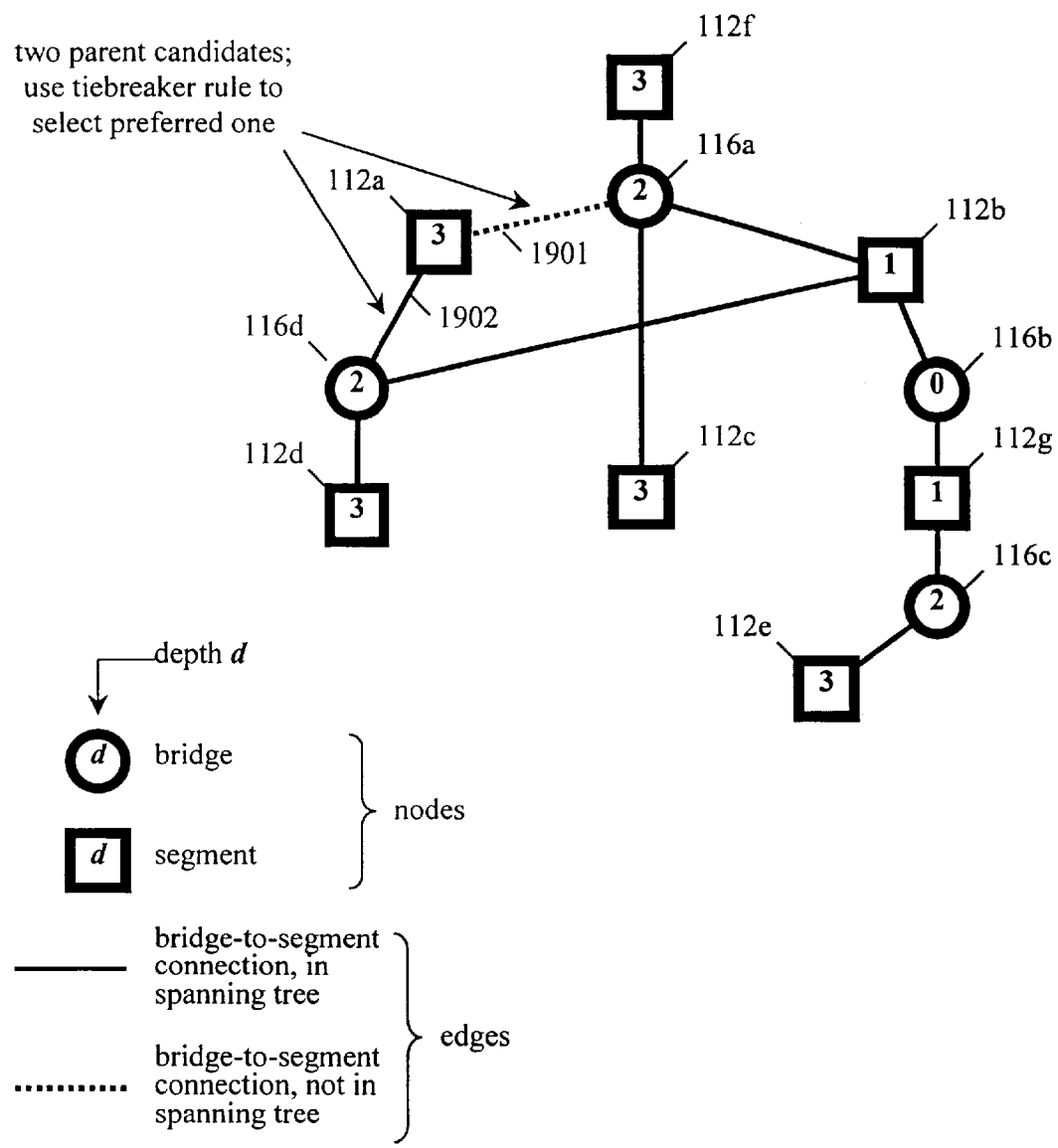
Figure 19: A spanning tree constructed by a breadth-first search function taking for example the network of Figure 1.

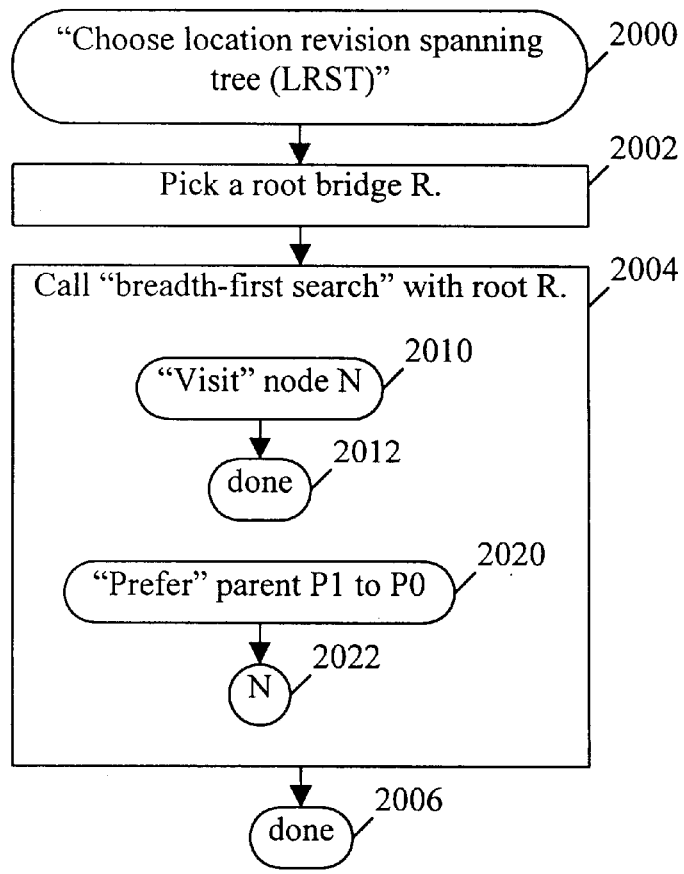
Figure 20: Flowchart of steps to choose a location revision spanning tree (LRST).
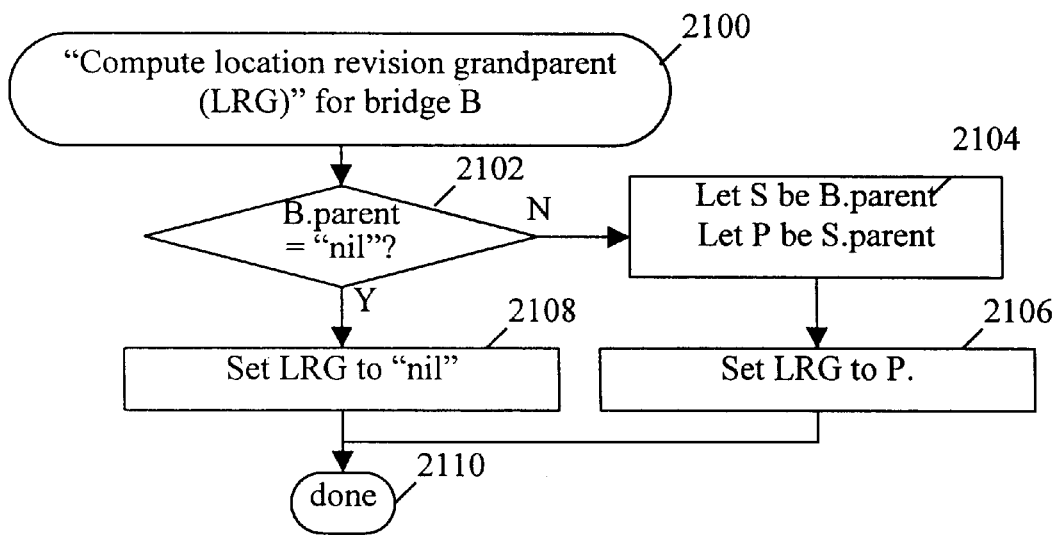
Figure 21: Flowchart of steps to compute the location revision grandparent (LRG).

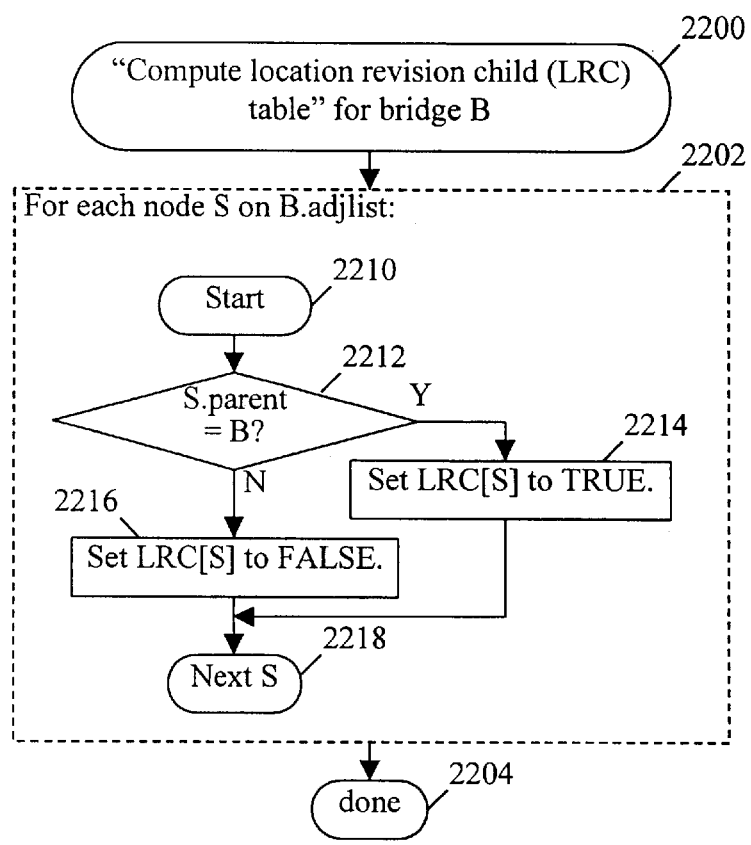
Figure 22: Flowchart of steps to compute the location revision child (LRC) table.

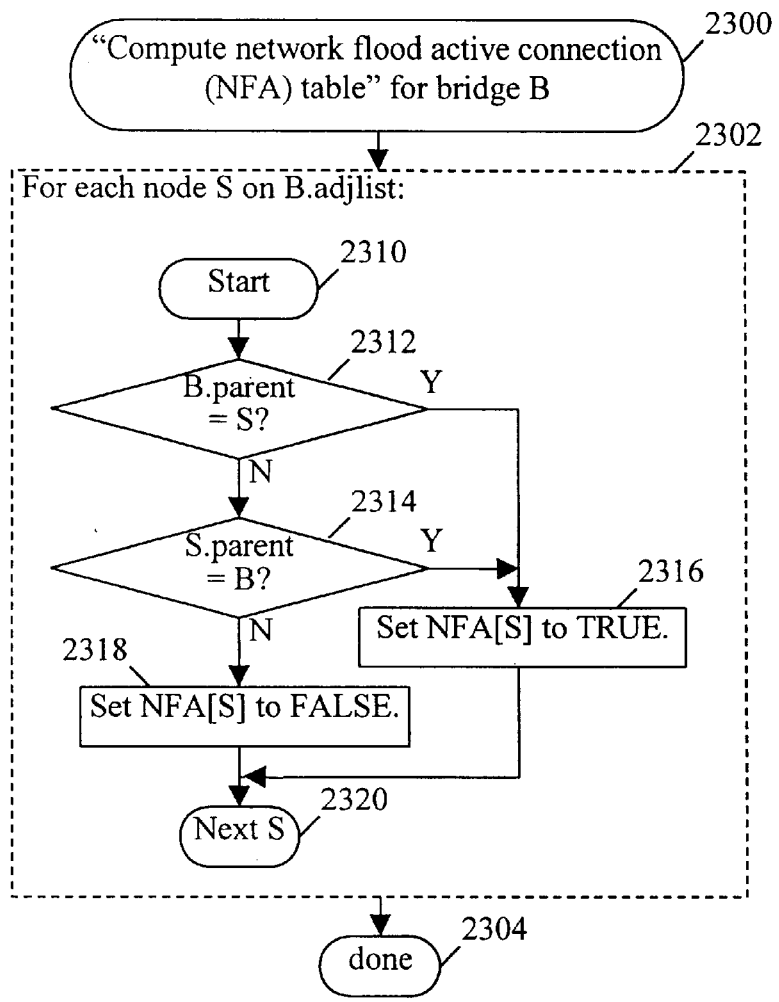
Figure 23: Flowchart of steps to compute the network flood active connection (NFA) table.

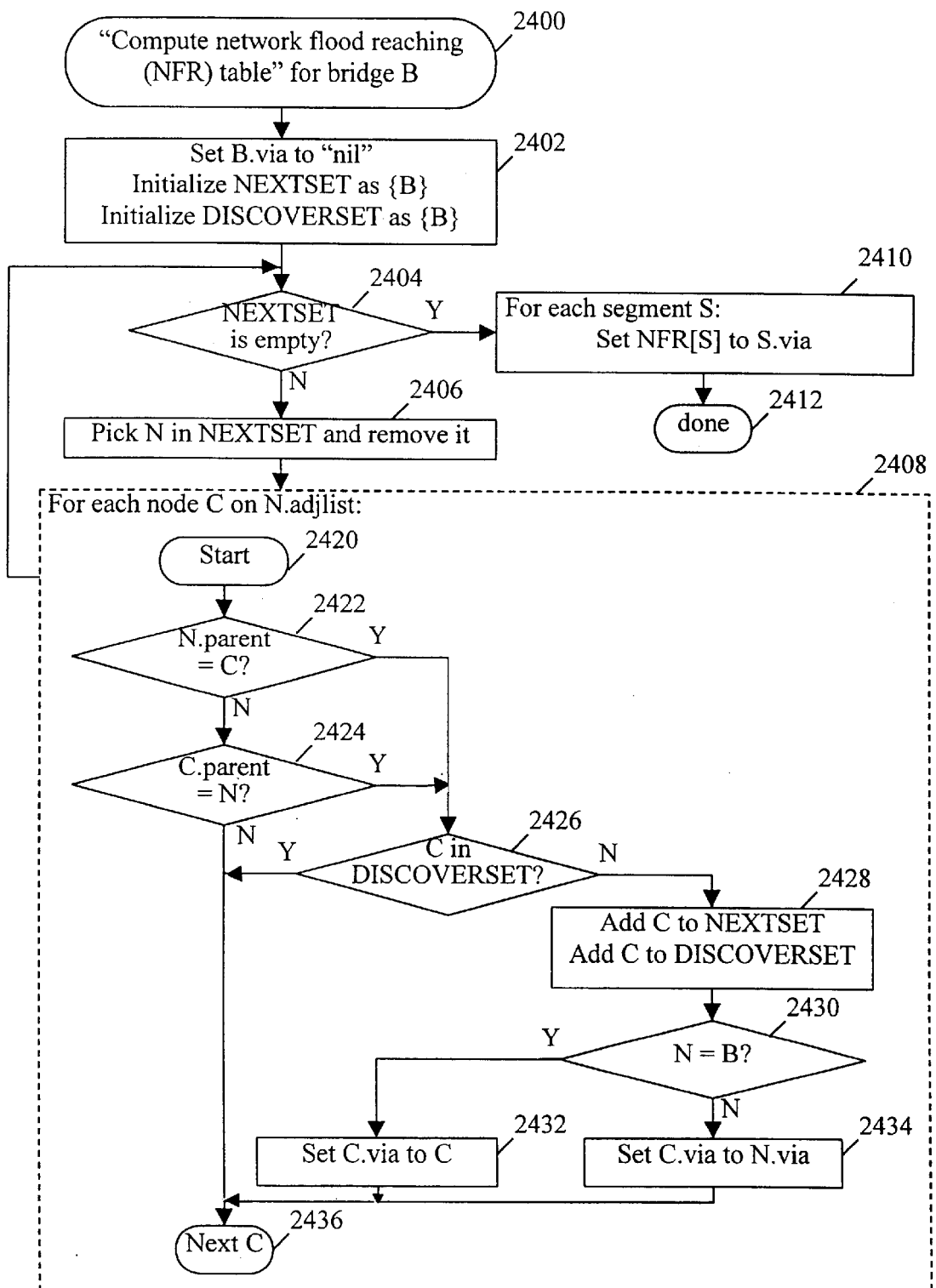
Figure 24: Flowchart of steps to compute the network flood reaching (NFR) table.

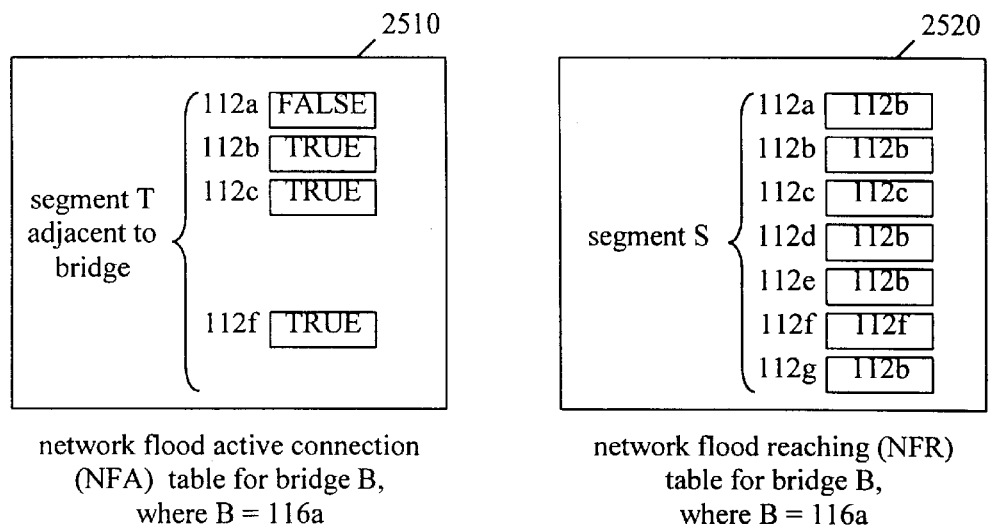
Figure 25: Network flood active connection (NFA) and network flood reaching (NFR) tables for bridge 116a of the network of Figure 1, taking for example the spanning tree of Figure 19 as the network flood spanning tree.

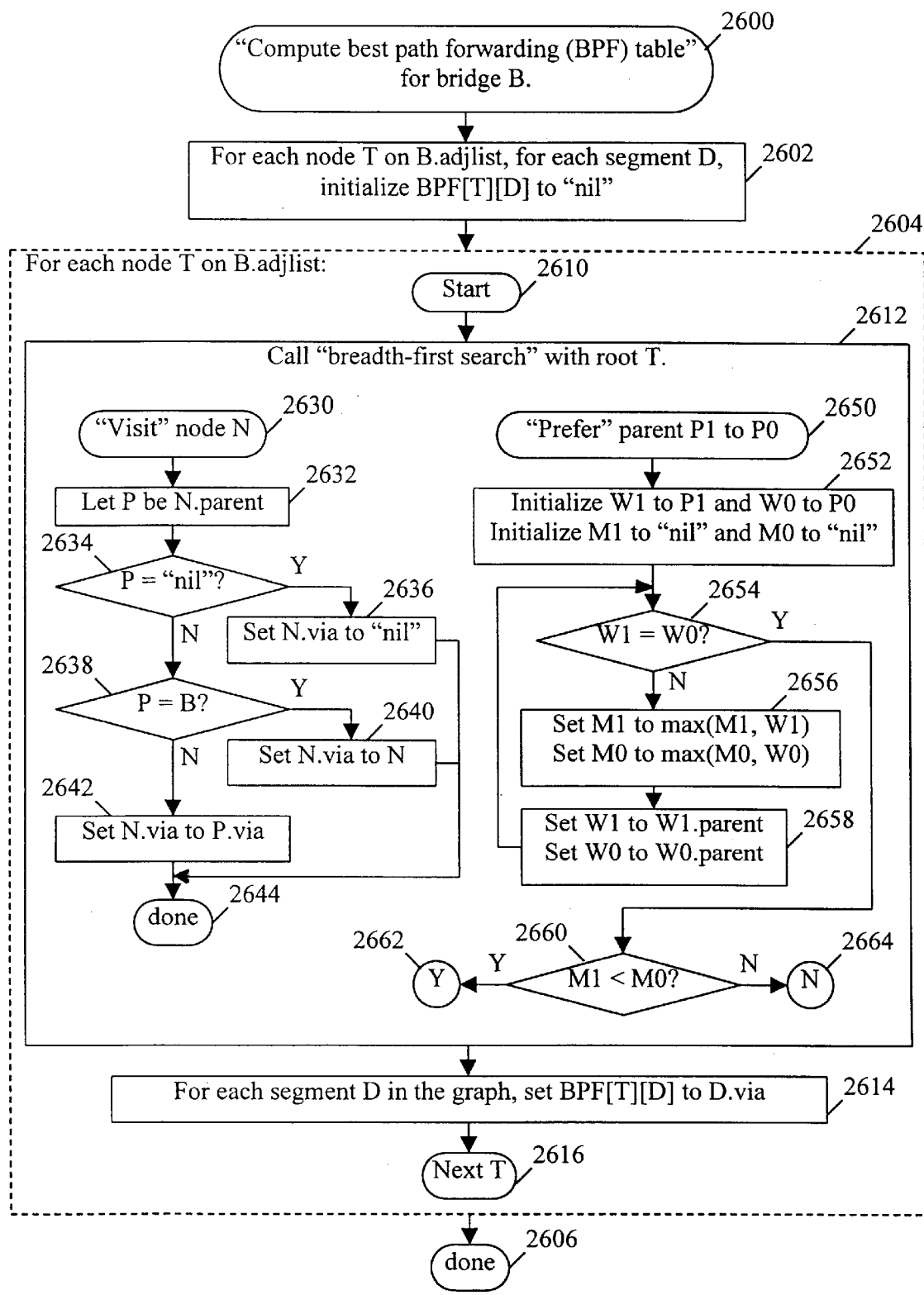
Figure 26: Flowchart of steps to compute the best path forwarding (BPF) table.

least                                                                                          greatest
116d < 116c < 116b < 116a < 112g < 112f < 112e < 112d < 112c < 112b < 112a
Figure 27: A total ordering of nodes, taking for example the network of Figure 1.
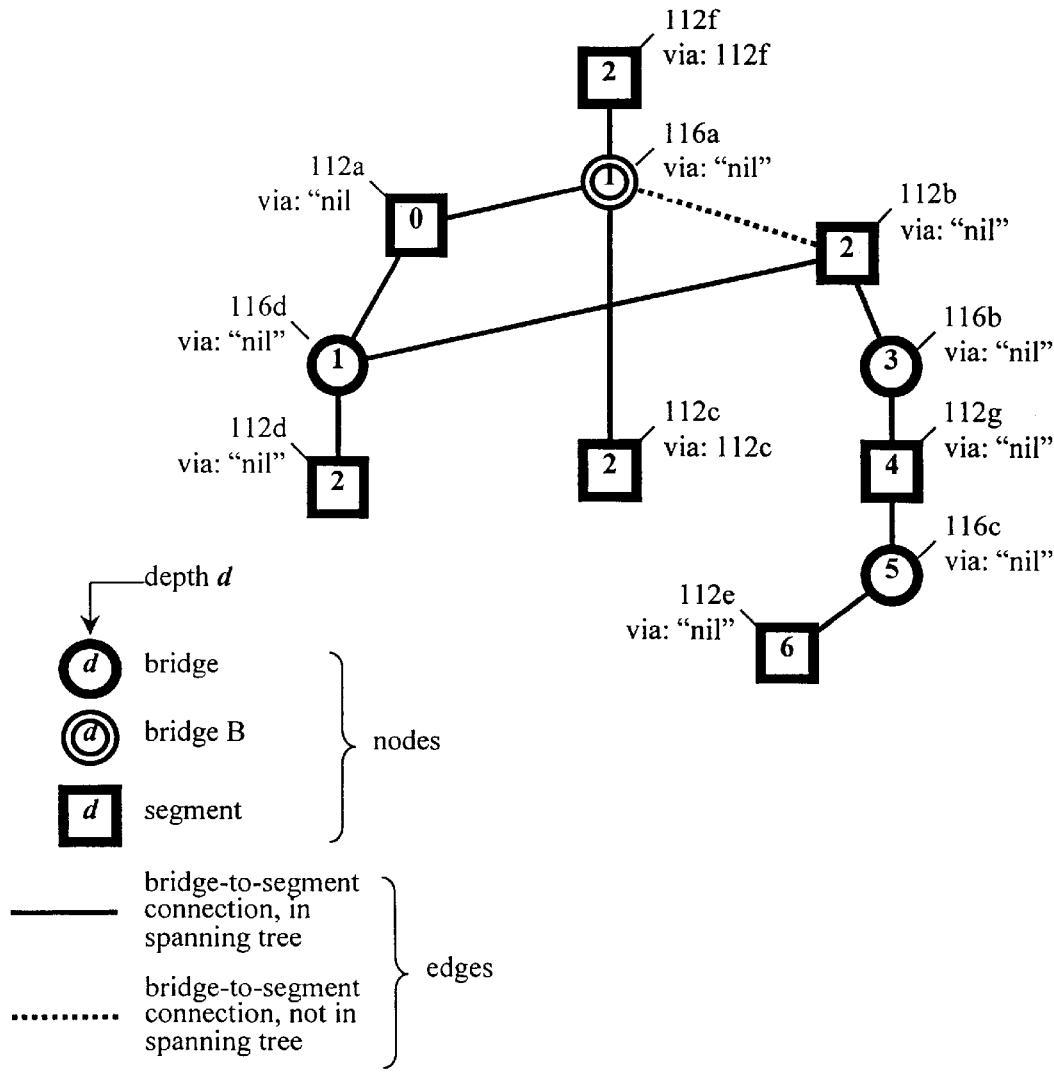
Figure 28: Spanning tree and via calculation for the best path forwarding (BPF) table of bridge 116a using a breadth-first search function given root segment 112a, taking for example the network of Figure 1 and the total ordering of nodes of Figure 27.

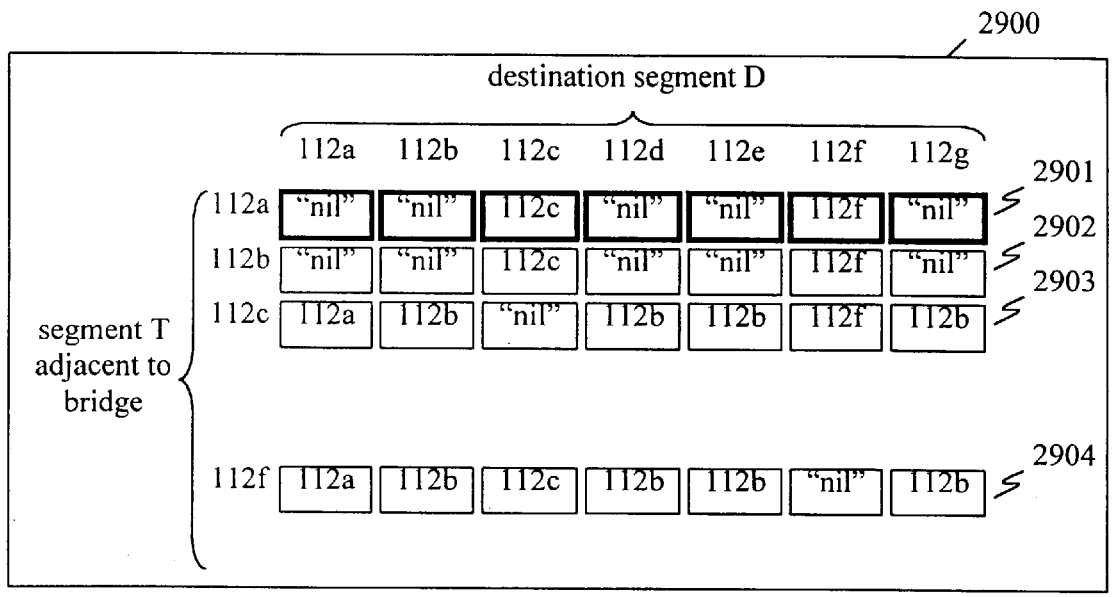
Figure 29: Best path forwarding (BPF) table for bridge 116a of the network of Figure 1, taking for example the total ordering of nodes of Figure 27.

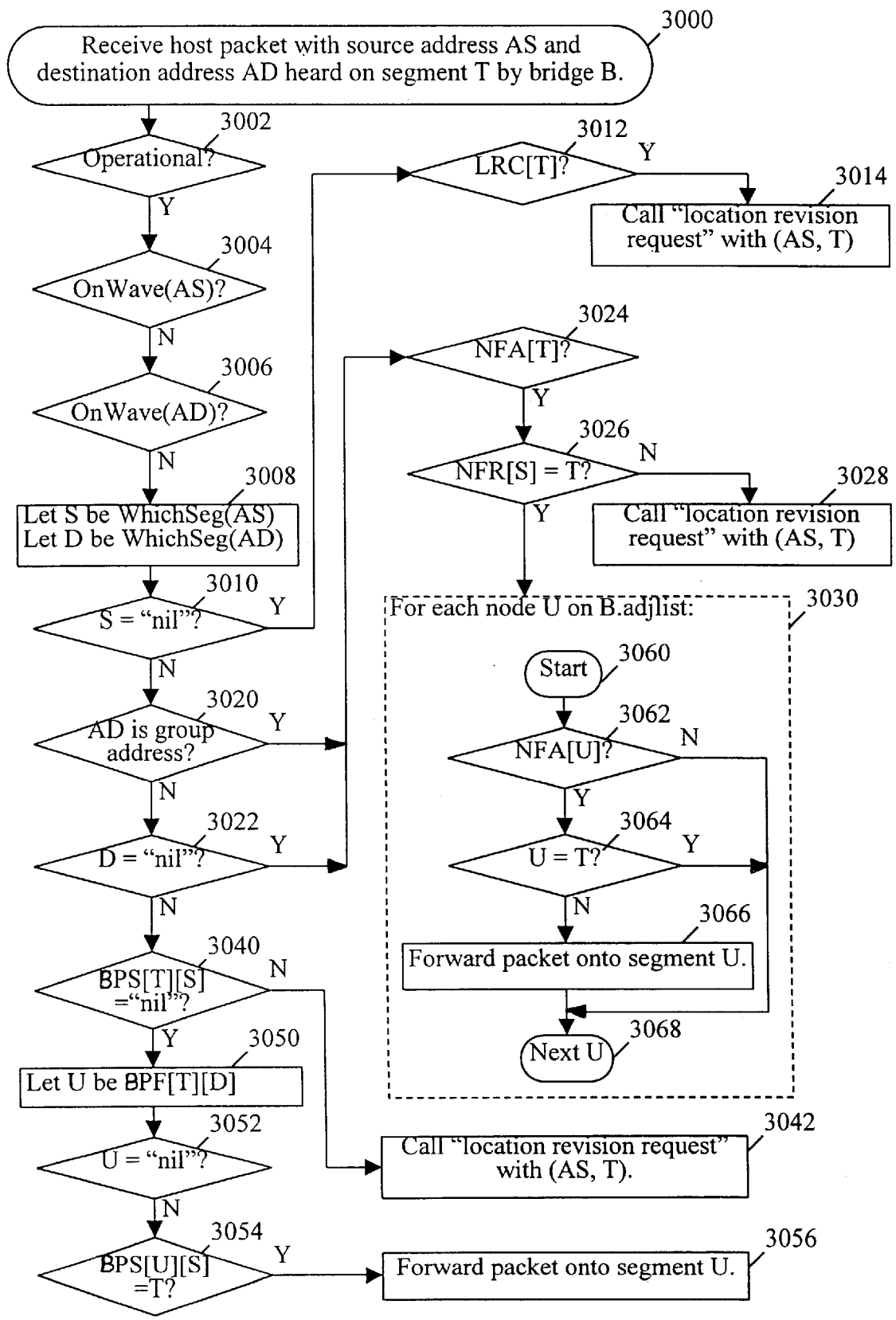
Figure 30: Flowchart of a communications operation function.

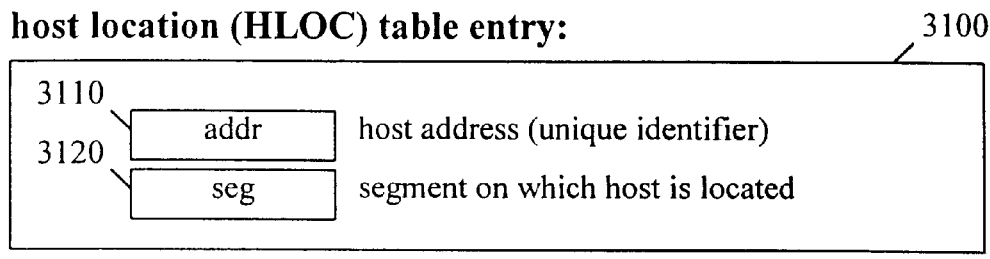
Figure 31: Host location (HLOC) table entry data structure used in the preferred embodiment.
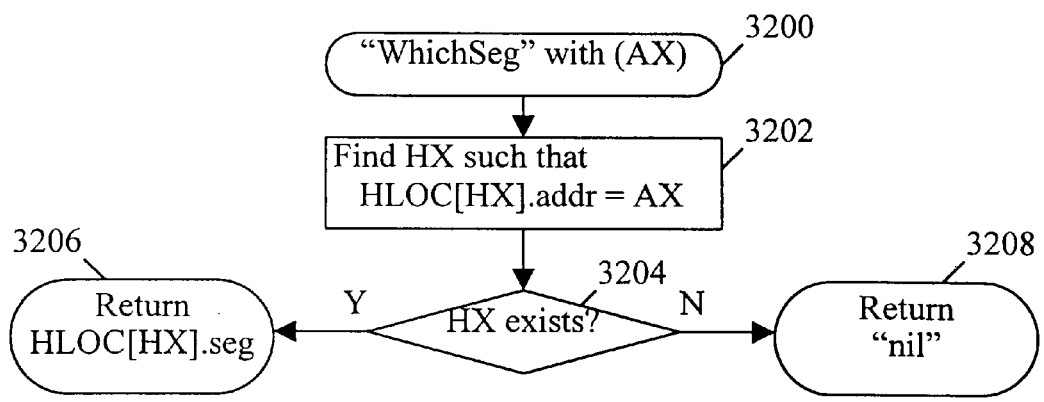
Figure 32: Flowchart of steps to map a host address to a segment location via the host location (HLOC) table.

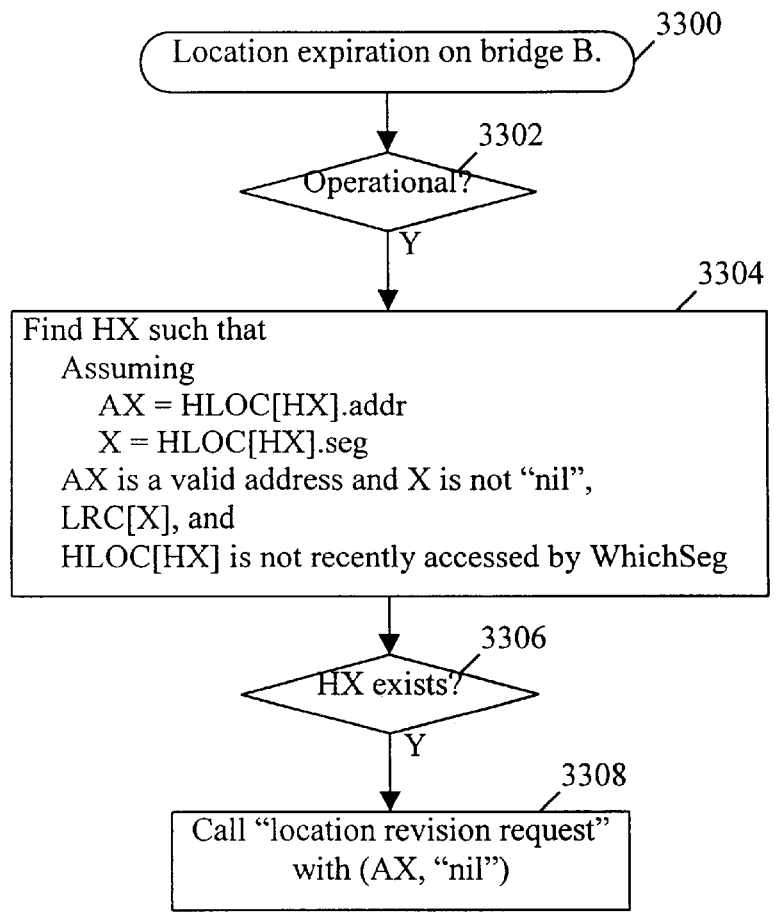
Figure 33: Flowchart of a location expiration function.
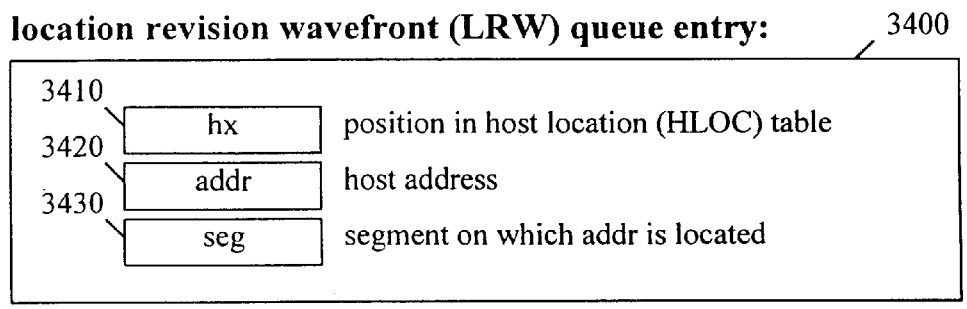
Figure 34: Location revision wavefront (LRW) queue entry data structure used in the preferred embodiment.

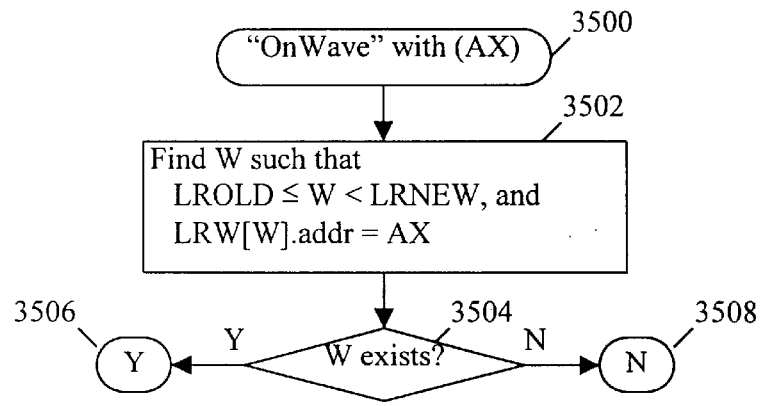
Figure 35: Flowchart of steps to determine if a host address is involved in a wavefront currently on the location revision wavefront (LRW) queue.
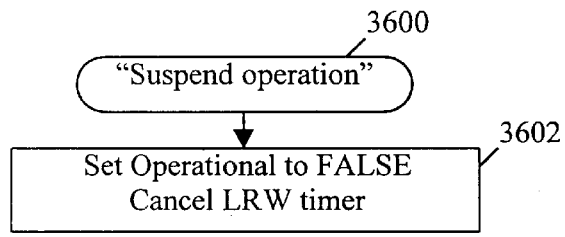
Figure 36: Flowchart of steps to suspend operation.
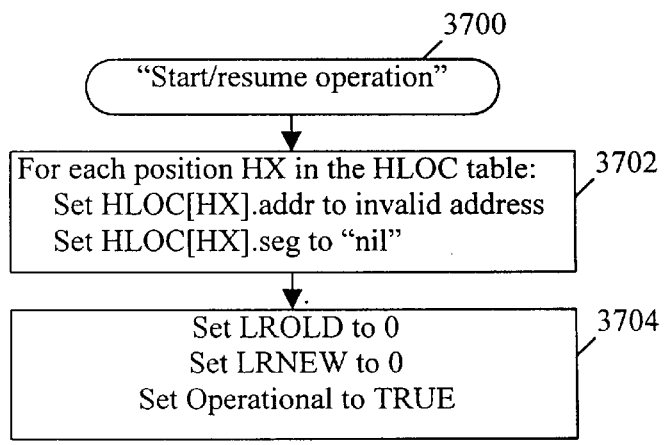
Figure 37: Flowchart of steps to start/resume operation.

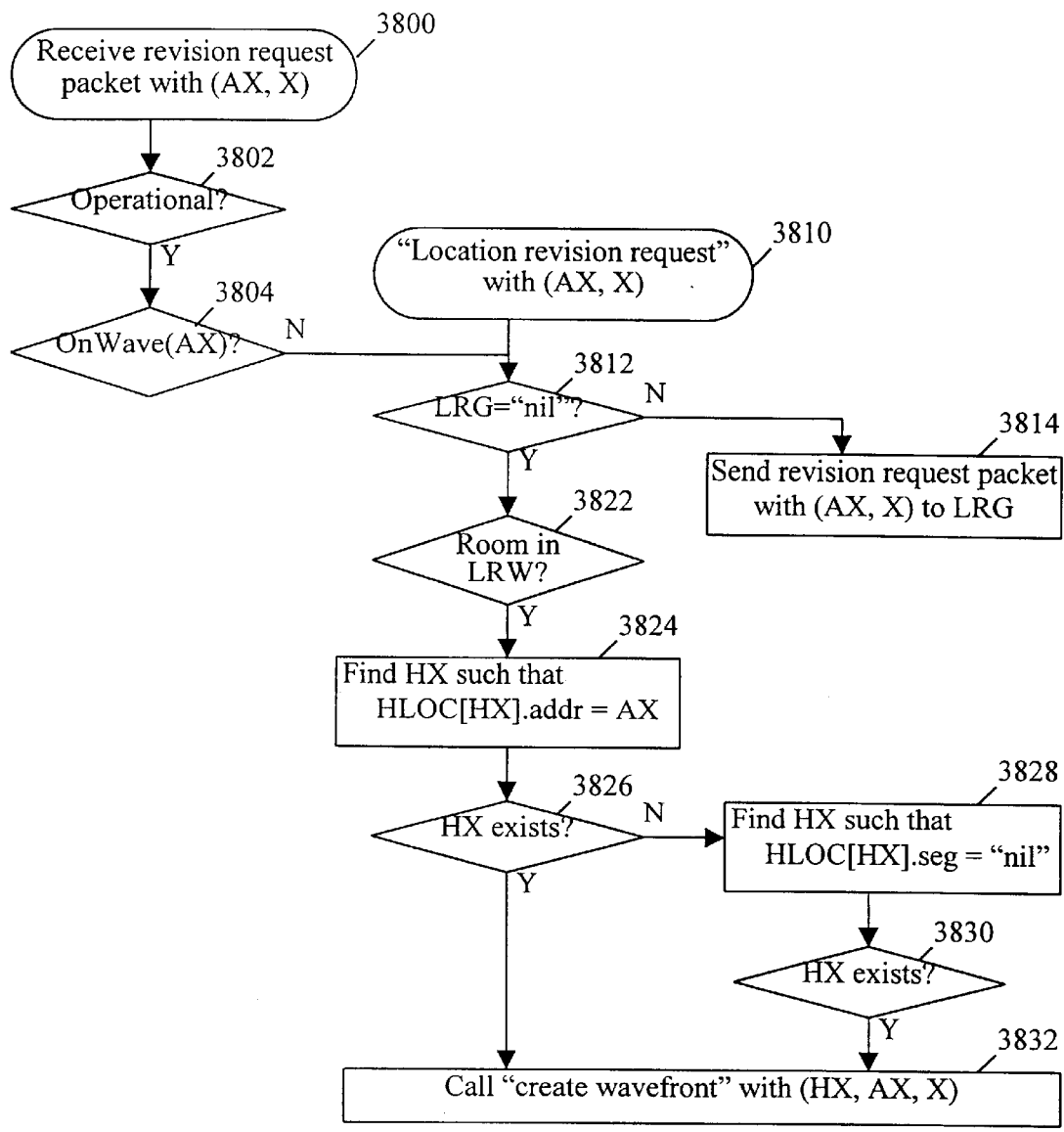
Figure 38: Flowchart of a revision request function.

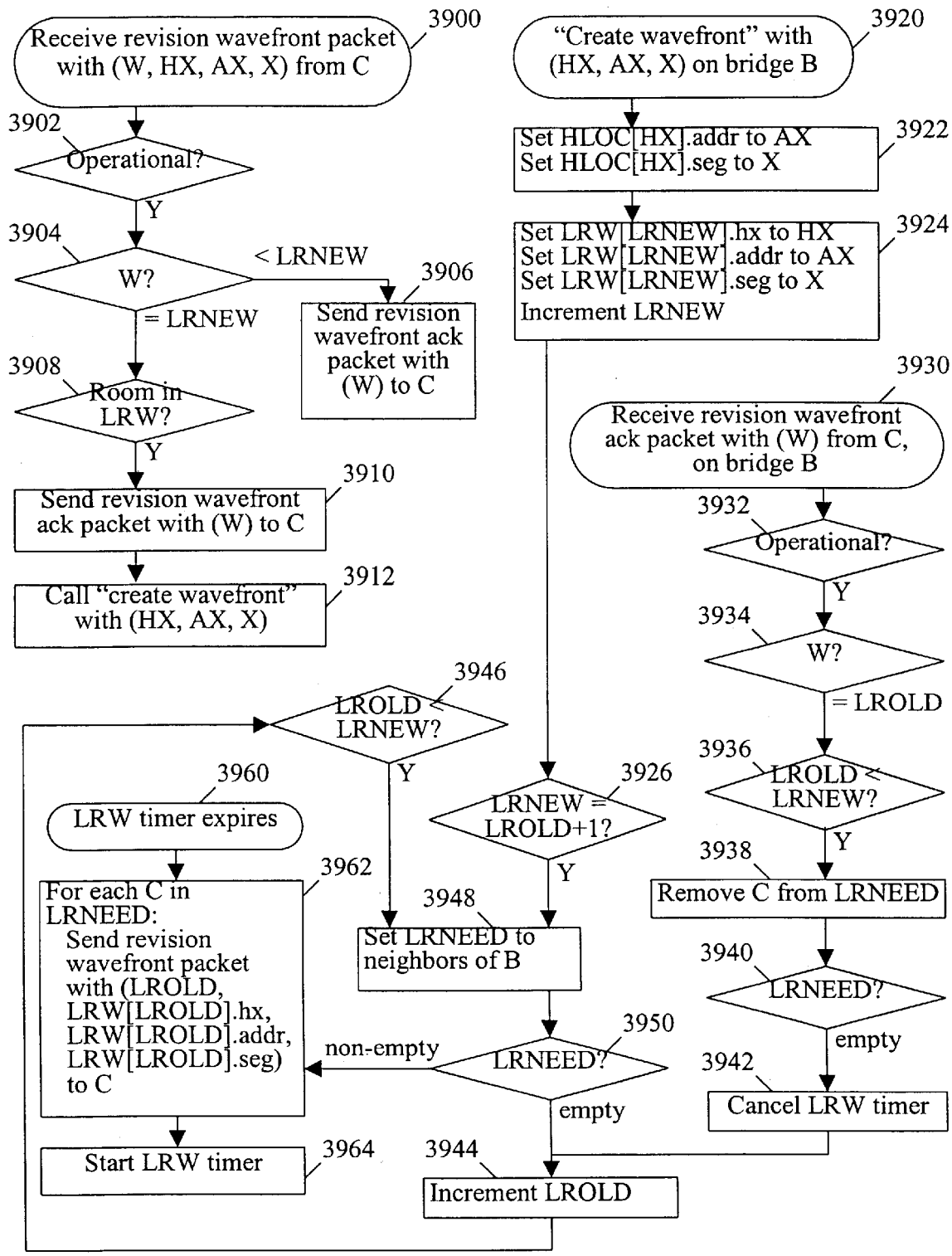
Figure 39: Flowchart of a revision wavefront function.

BRIDGED NETWORK STATIONS LOCATION REVISION

CROSS NOTING TO PROVISIONAL APPLICATION

A claim is hereby made for the benefit under 35 U.S.C. 119(e) of U.S. Provisional Applications Ser. No. 60/132,265 and 60/133,645, filed on May 3, 1999 and May 11, 1999, respectively, which are incorporated herein by reference.

RELATED APPLICATIONS

This application is related to and incorporates herein by reference the following co-pending applications: application Ser. No. 09/496,246, titled "Bridged Network With Smart Bridges"; application Ser. No. 09/496,294, titled "Bridged Network Topology Acquistion"; and application Ser. No. 09/495,986, titled "Bridged Network Communications Initialization and Operation With Transparent Shortest Path Routing," all of which were filed on Feb. 1, 2000, and which are assigned to the assignee of the present application.

FIELD OF THE INVENTION

This application relates to computer communication networks for interconnecting computers and, specifically, to routing in bridged networks.

BACKGROUND OF THE INVENTION

Computer interconnection and communication systems are typically referred to as networks. Networks are generally classified according to their geographical extent as local area networks (LANs), metropolitan area networks (MANs) and wide area networks (WANs).

LANs are commonly used to transmit messages between relatively closely located computers. LANs are characterized by several basic types of organizational architectures including linear, ring and mesh. For example, Ethernet is a widely used linear LAN and FDDI (fiber distributed data interface) is a widely used ring LAN. Unlike linear and ring LANs, mesh LANs have an arbitrary topology. One mesh LAN architecture is described in U.S. Pat. No. 5,088,091, entitled "HIGH-SPEED MESH CONNECTED LOCAL AREA NETWORK," issued on Feb. 11, 1992 to Michael D. Schroeder et al., and U.S. Pat. No. 5,138,615, entitled "RECONFIGURATION SYSTEM AND METHOD FOR HIGH-SPEED MESH CONNECTED LOCAL AREA NETWORK," issued on Apr. 11, 1992, to Leslie B. Lamport et al., both of which are hereby incorporated by reference.

A LAN is a shared transmission medium, such as a continuous conductor, that connects some number of addressable devices, such as printers, servers, and workstations. The addressable devices are called stations. Special attention is paid to LANs, such as Ethernet, in which each station has a globally unique and unchanging address, called its unique identifier (UID).

Stations on a LAN communicate by sending and receiving data packets or groups of data packets. In general, a packet contains the station address, UID, of the packet source, the station address UID of the packet destination and a payload. Packets can be distinguished by their destination address type. For example, a unicast packet is a packet with a station address as its destination. Stations on a LAN can also communicate by sending a packet to a group of destinations. In this case the packet has a group address UID as its destination and is called a multicast packet. Typically one bit in the UID is dedicated to distinguish station addresses from group addresses. Typically also one particular group address is dedicated to signify the group of all stations. A multicast packet with a group address of all the stations as its destination is called a broadcast packet.

LANs have basic limitations such as the number of stations, bandwidth and physical extent. A LAN offers, however, a useful high-speed communication service that facilitates data sharing and client-server interactions among its stations. In order to extend the benefits of a LAN beyond the basic limitations of a single LAN, forwarding devices, known as bridges, are used to interconnect LANs to form extended LANs.

An extended LAN is a collection of LANs interconnected by bridges. Bridges are addressable devices that forward packets back and forth between the bridged LANs. An extended LAN architecture with bridged LANs is referred to as a bridged network architecture. Each of the individual component LANs is known as a network segment. The network segment is also simply referred to as the segment.

Since bridges are addressable devices, they are stations on each of their connected LANs. Stations that are not bridges are known as end stations. For simplicity, end stations are also called hosts.

A bridge includes a plurality of bridge ports, each one corresponding to a connection between the bridge and a segment. Bridge functions that pertain to a specific connection between the bridge and a segment are typically described as being performed by the corresponding port.

In general, a single bridge may connect to any number of LANs, although typically a bridge connects to a small number of LANs, say between two and eight. Notwithstanding hosts, an extended LAN consists of segments, bridges and the connections between segments and bridges.

Structurally, an extended LAN can be represented as a graph. A graph is a mathematical object consisting of a set of nodes and a set of edges. Each edge in a graph connects two nodes. In a graph representing the extended LAN, the nodes represent the segments and bridges and the edges represent the connections, in the extended LAN, between the segments and bridges. This graph is called the network topology graph. The network topology graph is also referred to simply as the topology.

Using bridges to create LAN-to-LAN interconnections allows each host on the attached LANs to communicate with the other hosts on the attached LANs as if those hosts were on a same LAN. To emphasize that the interconnection of LANs using a bridge is transparent to hosts communicating across the bridge, this kind of interconnection is also called transparent bridging. An example of a LAN interconnection that is not transparent is IP (Internet protocol) subnet routing.

Transparent bridging requires that the bridges dynamically maintain address information for each of their connected LANs in order to facilitate the routing of packets. Bridges learn about the presence of hosts by listening to packets passing by. From this listening, bridges obtain the addresses of hosts on their connected LANs. Bridges use host addresses to help make forwarding decisions.

In a network with transparent bridging, the forwarded copy of a packet must be bit-for-bit identical with the original packet. Since the forwarded copy of a packet looks just like the original, it is difficult to learn exactly where hosts are located by listening to packets passing by. If a decision is made to allow forwarding of a packet in a loop, the packet would cycle endlessly in the network consuming huge amounts of bandwidth. Therefore the bridges must take care in their packet forwarding decisions never to allow any packet to be forwarded in a loop.

The Institute of Electrical and Electronics Engineering (IEEE) standard for bridged Ethernet (IEEE Std 802.1D-1993) prevents forwarding loops and solves the learning problem by classifying certain connections as active connections and the remainder as standby connections. Host packets travel only on active connections. This means that a bridge never transmits a host packet on a standby connection, and any packet a bridge might receive from a host on a standby connection is ignored. The active connections are selected so as to form a spanning tree in the network topology graph. For control purposes, one bridge is selected as the root of the spanning tree but selection of the root does not affect packet forwarding in any way. In the spanning tree of a network topology graph, for any two segments, S and D, there is exactly one path of active connections from S to D and, hence, only one path that packets from S to D can follow. Multicast packets also follow the spanning tree. When a bridge receives a multicast packet on an active connection it forwards the packet onto all of its other active connections. This results in copies of the multicast packet traveling over all active connections in the network and hence over all segments. This process is called flooding.

As previously mentioned, bridges solve the learning process by listening to packets passing by. The learning problem is solved because any host packets that a bridge hears arriving on an active connection must be from hosts that can be reached only by transmitting back on this active connection. By listening to packets the bridge learns which of its active connections to use to reach a given host. In other words, the bridge learns the direction (in the spanning tree) to a given host. Initially, none of the bridges knows the direction to any host after the bridges have selected the spanning tree. Similarly, when a bridge receives a packet (on an active connection) it may not know yet the direction to the packet's destination host. In this case, it forwards the packet onto all of its other active connections in the same manner as a multicast packet. Thus, when no bridge knows the direction to the destination host, the packet is flooded to all segments. Conversely, when bridge receives a packet and it knows the direction to the packet's destination host, the bridge forwards the packet onto a single connection just in this direction. The bridge forwards the packet unless the connection in the direction of the destination host is the same connection on which the packet was received. In this case the bridge discards the packet.

When packets are forwarded by flooding, the bandwidth of the extended LAN is limited to the bandwidth of a single LAN. By learning the location of hosts and forwarding packets only in the direction of the destination host, it is possible that the effective total bandwidth of the extended LAN may exceed that of a single LAN. In particular, if hosts communications occurs primarily between hosts that share the same segment, then after the location of these hosts is learned by the bridges, the bridges do not have to forward any of the shared-segment communications.

However, as the scale of an extended LAN increases, the total amount of communication between hosts on different segments tends to increase, if only because most workstations want occasional access to shared severs such as a corporate web server or corporate database. The result is that more and more packets must travel over more and more connections in the spanning tree and eventually the bandwidth through some bridge or segment is exhausted. This bandwidth limitation on an extended LAN scale arises even if the segments in the network are richly connected. The additional connections provide no benefit because the spanning tree design requires that redundant connections be classified as standby and not used for the forwarding of packets. It can easily happen that hosts separated by no more than a few bridges are forced to communicate through many bridges through a long path that follows the spanning tree. Sometimes a careful choice of spanning tree can alleviate this problem. However, as the scale of the extended LAN increases, eventually no spanning tree design can overcome such bandwidth limitation. This bandwidth scaling problem is referred to as the level-2 mesh (L2-mesh) problem.

Conventional approaches to mitigating the L2-mesh problem are the crossover, replication, and envelope techniques. The crossover technique takes advantage of a segment, S, that is connected to exactly two bridges, A and B; although one of the connections is standby and therefore cannot be used for forwarding packets according to the IEEE standard spanning tree method. As part of the learning, bridge A learns the set of addresses LT(A) of hosts that are lower in the spanning tree than A. That is, bridge A learns addresses of hosts that lie in a direction further away from the root bridge than A. Likewise bridge B learns the analogous set LT(B). Assuming that the two bridges, A and B, are on separate branches of the spanning tree (which means that it is impossible for LT(A) and LT(B) to have any addresses in common). The two bridges can privately exchange their knowledge LT(A) and LT(B). The bridges can also agree to forward packets across segment S, where each of the bridges, A and B, knows the packets to be destined to hosts below the other bridge. The crossover technique improves the performance of some but not all host-to-host communication, and requires careful selection of the spanning tree to get the branches and the cooperating bridges situated correctly.

The replication technique replicates the network by creating a plurality of virtual universes. Each universe contains its own spanning tree with its own root bridge. Each of the spanning trees covers the entire network. A packet is correlated to one of the plurality of universes based on a hash of the packet's source and destination addresses. The packet is processed exclusively in that universe. Since, in general, a connection will be active in some universes and standby in the others, the replication technique utilizes a greater number of connections and, to a certain degree, helps spread the communication load more evenly. However, the replication technique requires bridges to learn the location of hosts in each universe separately. Also, the replication technique gives no guarantee of a short communication path; and two hosts might hash into a universe with a spanning tree that unfortunately requires them to communicate via a long path through many bridges.

The envelope technique wraps forwarded packets with an envelope so that they can be identified as packets "in-route." An envelop may be implemented by embedding the original packet inside a larger data frame, in which case there is a problem of handling maximum size original packets. Alternatively, an envelope may be implemented by first sending a "herald" packet to announce the upcoming forwarded packet. The wrapped packet is forwarded by conventional routing mechanisms to its destination segment whereupon it is unwrapped and sent to the destination host. The envelope technique requires additional bandwidth to handle the wrapping.

None of these techniques guarantees to send packets on the shortest communication paths without requiring extra bandwidth. Hence, there remains a need to mitigate the L2-mesh problem. There is a further need to configure bridged networks with the capacity to mitigate the L2-mesh problem and to produce improved bandwidth in packets communication. Moreover, there is a need to effectively and efficiently manage the bridged network topology and host location changes. The present invention addresses these and related problems.

SUMMARY OF THE INVENTION

The present invention provides a bridged network with so called smart bridges configured to provide effective and efficient management of the bridged network topology and host location changes. These bridges are considered smart to distinguish them from other bridges that do not embody the present invention as will be further described herein. The smart bridges are further configured to provide a transparent shortest paths routing in the bridged network. In accordance with the purpose of the invention as embodied and broadly described herein, the bridged network with the smart bridges is configured to mitigate the L2-mesh problem and to produce an improved bandwidth in packets communication.

As embodied and broadly described herein, the invention relates to computer communications networks for interconnecting computers. The transparent shortest path routing improves the overall performance of such networks through implementation of a suite of functions. These functions include inventory construction, topology acquisition, communications initialization, communications operation, and location revision.

The inventory construction is performed in cooperation by the bridge ports connected to a given segment. It compiles a list (the "inventory") of the bridge ports connected to the segment and delivers this list to each of these bridge ports. The inventory is kept up to date, so that the bridge ports are informed when any change occurs regarding their segment. When an inventory change occurs, topology acquisition is initiated.

The topology acquisition is performed in cooperation by all the bridges in the network. Topology acquisition spreads through the network via a propagation function, gathers a description of all bridge-to-segment connections (the "total network report") via a collection function and then delivers the total network report to all bridges via a distribution function. The propagation function also prompts a suspension of communications operation.

The communications initialization is performed by each bridge separately based on the total network report delivered during the distribution function. Communications initialization creates an internal representation of the network topology graph from the total network report, performs a global assignment of index numbers to segments and bridges, and decides how packets are to be routed. The routing decisions are recorded in various tables that will be described later. Three different types of routing are provided: location revision routing for forwarding location revision requests, network flood routing for forwarding a packet to multiple destinations or to a destination whose location is unknown, and best path routing for forwarding a packet along a shortest path to a single destination whose location is known. Once communications initialization is complete, the bridge resumes communications operation.

The communications operation is responsive to host packets. Communications operation performs its activities based on the routing tables determined by communications initialization, and based on the hosts location (HLOC) table, which is managed by location revision. Communications operation learns the locations of hosts, detects changes in the locations of hosts, expires stale information about the locations of hosts, and forwards host packets.

The location revision is performed in cooperation by all bridges in the network. Based on the location revision routing determined by communications initialization, location revision collects reports of host locations at a central, root bridge. Location revision then distributes these reports to all bridges using a wavefront protocol. Based on the arriving wavefronts, location revision manages the HLOC table. The wavefront protocol provides a barrier between bridges "ahead" of the wavefront, which continue to use the old host location information, and bridges "behind" the wavefront, which use the new host location information.

The system aspect of the invention for providing a transparent shortest path routing in a network includes network segments and at least one bridge, the bridge is relaying packets from one of the network segments to the next. The bridge is configured to perform a suite of functions including inventory construction, topology acquisition, communications initialization, communications operation, and location revision.

In accordance with a purpose of the invention, as embodied and broadly described herein, the invention relates to a method for managing end stations locations in a bridged network. The method includes providing a smart bridge, and performing in the smart bridge communications operation using a network flood active port connections (NFA) table, a network flood reaching (NFR) table, a best path forwarding (BPF) table and a best path sourcing (BPS) table. The method further includes performing in the smart bridge an end stations locations revision which manages a host location (HLOC) table. The communications operation invokes the end stations locations revision upon detecting changes in any end station location in order to prevent different smart bridges from using different end stations locations for a same end station that changed its location.

The end stations locations revision exchanges location revision packets with other smart bridges in the bridged network according to a location revision grandparent (LRG), a location revision child (LRC) table and a location revision wavefront distribution protocol. The end stations locations revision passes the location revision request from the smart bridge via the LRG of the smart bridge up along a location revision spanning tree (LRST) over a topology of the bridged network until a root of the LRST is reached unless the smart bridge is the root of the LRST, the location revision request passing from one respective LRG to a next respective LRG until the root is reached. A location revision wavefront starts at the root and, in cooperation with other smart bridges in the bridged network, spreads to the other smart bridges a location revision request for revising the HLOC of each of the other smart bridges. The location revision wavefront spreads through the bridged network by means of a wavefront protocol which governs bridge-to-bridge exchange of location revision wavefront packets. The root assigns a serial number including an index number to each location revision wavefront the root originates so that each smart bridge forwards the location revision request together with the serial number in order to indicate whether the location revision request pertains to a new or old location revision wavefront. Receipt of a location revision wavefront packet prompts the start of the end stations locations revision in which the location revision wavefront packet provides a wavefront index, a HLOC table index, a host address, identification of the segment to which the host is attached and the source address of the packet.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention, and, together with the description, serve to explain the principles of the invention.

FIG. 1 shows an example of a network with an extended network architecture in which an embodiment of the present invention can be implemented.

FIG. 2 illustrates a data link layer bridging in the OSI (open system interconnect) architecture model.

FIG. 3 illustrates a transmission data frame (packet) that is relayed by bridges in the network.

FIG. 4 illustrates a structural model of bridges implemented in accordance with an embodiment of the invention.

FIG. 5 illustrates a suite of bridge functions in accordance with an embodiment of the inventor, including: bridged network inventory construction, topology acquisition, communication initialization and operation employing transparent shortest path routing, location revision etc.

FIGS. 6a and 6b together show a flowchart of an inventory construction function.

FIG. 7 shows a flowchart of a propagation function.

FIG. 8 illustrates a construction of a POST (propagation order spanning tree), taking for example the network of FIG. 1.

FIG. 9 shows a flowchart of a collection function.

FIG. 10 shows a flowchart of a distribution function.

FIG. 11 illustrates a total network report produced by operation of the topology acquisition function, taking for example the network of FIG. 1.

FIG. 12 shows a flowchart of a communications initialization function.

FIG. 13 is a network topology graph of the network in FIG. 1 showing a graphical representation of the bridges, segments, and connections in this network.

FIG. 14 illustrates a node data structure used for representing a network topology graph.

FIG. 15 illustrates a network topology graph data structure assuming the network of FIG. 1.

FIG. 16 shows a flowchart of a global assignments function.

FIGS. 17a–d together show a flowchart of a routing function.

FIG. 18 shows a flowchart of a breadth-first search function.

FIG. 19 shows a spanning tree constructed by the breadth-first search function taking for example the network of FIG. 1.

FIG. 20 shows a flowchart of steps to choose a location revision spanning tree (LRST).

FIG. 21 shows a flowchart of steps to compute a location revision grandparent (LRG).

FIG. 22 shows a flowchart of steps to compute a location revision child (LRC) table.

FIG. 23 shows a flowchart of steps to compute the network flood active connections (NFA) table.

FIG. 24 shows a flowchart of steps to compute the network flood reaching (NFR) table.

FIG. 25 illustrates the network flood active connection (NFA) and network flood reaching (NFR) tables for a bridge (116a) in the network of FIG. 1, taking for example the spanning tree of FIG. 19 as the network flood spanning tree.

FIG. 26 shows a flowchart of steps to compute the best path forwarding (BPF) table.

FIG. 27 shows a total ordering of nodes, taking for example the network of FIG. 1.

FIG. 28 illustrates a spanning tree constructed by the breadth-first search function and calculations for the best path forwarding (BPF) table of bridge 116a, taking for example the network of FIG. 1, root segment 112a and the total ordering of nodes of FIG. 27.

FIG. 29 shows the best path forwarding (BPF) table for bridge 116a of the network of FIG. 1, taking for example the total ordering of nodes of FIG. 27.

FIG. 30 shows a flowchart of a communications operation function.

FIG. 31 illustrates the host location (HLOC) table entry data structure.

FIG. 32 shows a flowchart of steps in a subrouting employing the HLOC table to map a host address to a segment on which the host is located.

FIG. 33 shows a flowchart of a location expiration function.

FIG. 34 illustrates a data structure of a location revision wavefront (LRW) queue entry.

FIG. 35 shows a flowchart of steps to determine if a host address is taking part in a wavefront currently on the location revision wavefront (LRW) queue.

FIG. 36 shows a flowchart of steps to suspend communications operation.

FIG. 37 shows a flowchart of steps to start/resume communications operation.

FIG. 38 shows a flowchart of a revision request function.

FIG. 39 shows a flowchart of a revision wavefront function.

DETAILED DESCRIPTION OF THE INVENTION

In describing the present invention various technical terms are used. Where applicable, the meaning attached to the technical terms in the following glossary and throughout the disclosure may also include their known usage. For example, the term "bridge" means, in accordance with its known usage, a device which interconnects a plurality of segments in an extended network. In the context of the present invention, the term bridge further means, for example, that such a device is unique in its structure and functionality as compared to conventional bridges.

Glossary active connection: a connection to and from which bridges forward packets.

Address: a unique identifier (UID) of a station, preferably a 48-bit Ethernet UID.

adjacent nodes: two nodes connected by an edge in a graph.

best path: a unique shortest path from one node to another. In the present invention, the set of best paths must satisfy the five best path properties "shortest", "unique", "suffix", "prefix", and "symmetry", as discussed in the detailed description.

best path forwarding table for a bridge B: a table that gives, for each segment T adjacent to bridge B and destination segment D, the next hop segment U on the best path (T, B, U, . . . , D) if it exists, or "nil" if it does not exist.

best path sourcing table for a bridge B: a table that gives, for each segment U adjacent to bridge B and source segment S, the previous hop segment T on the best path (S, T, B, U) if it exists, or "nil" if it does not exist.

BFS: stands for breadth-first search.

BPF table: stands for best path forwarding table.

BPS table: stands for best path sourcing table.

breadth-first search: means for visiting each node in a graph in order of increasing distance from a given initial (root) node R.

bridge: a device which interconnects a plurality of segments in an extended LAN by forwarding packets in a manner transparent to hosts from one segment to another. Bridges in the extended LAN cooperate with each other so that a host on one segment can communicate with a host on another segment as if the two hosts were on the same segment. A bridge is an addressable device also referred to as a station.

bridge identifier: a unique identifier of a bridge, also used as the station address of the bridge. In the extended LAN each station has, for example, a unique 48-bit address. Each bridge, having a plurality of connections to LANs via its ports, chooses one of its unique 48-bit addresses as its bridge identifier.

bridge port: the portion of a bridge that is configured to operate a bridge-to-segment connection. Activities are specific to a particular bridge-to-segment connection of the bridge of each bridge port. It is noted that a bridge may be configured so that activities attributed entirely to the bridge ports may be performed, in various degrees, by other modules of the bridge. For example: segment inventory may be performed in a topology acquisition module.

bridge-to-segment connection: a connection between a bridge and a segment.

connection: another way of referring to a bridge-to-segment connection.

depth in a spanning tree of a node: distance in the spanning tree between the node and the root of the spanning tree.

distance in a graph between two nodes: the length of a shortest path in the network topology graph between the two nodes.

edge: part of a network topology graph. In the context of the present invention, each edge in the network topology graph represents a bridge-to-segment connection.

edge weight: a numerical value assigned to an edge. In the present invention, the set of edge weights must satisfy the three edge weight properties "not less than length", "limited among shortest", and "unique among shortest", as discussed in the detailed description.

end station: a station that is not a bridge (e.g., a host).

epoch number: a non-negative integer representing a time stamp value, a place in a series, etc. Together with an initiator bridge identifier, the epoch number identifies a particular instance of topology acquisition. When, as a result of detecting a segment inventory change, or for any other reason, a bridge wants to initiate a new topology acquisition instance, the bridge must first increment its epoch number.

extended LAN: a network composed of a plurality of LANs interconnected by bridges.

Graph: a mathematical object consisting of a set of nodes and a set of edges, in which each edge connects two nodes.

host: a station that is not a bridge and known as an end station.

HLOC: stands for host location(s).

Initiator: the bridge that initiates a particular instance of topology acquisition. The initiator becomes the root of the propagation order spanning tree of that instance.

instance identifier: another name for a topology acquisition instance identifier.

location revision child table of a bridge B: a table that identifies segments adjacent to bridge B that are children of B in a location revision spanning tree.

location revision grandparent of a bridge B: a bridge that is the parent of a segment which, in turn, is the parent of the bridge B in the location revision spanning tree; or "nil" if bridge B is the root of the location revision spanning tree.

location revision root bridge: a bridge selected during global assignments to be the root of the location revision spanning tree which serializes location revision requests and initiates location revision wavefronts.

location revision spanning tree: a spanning tree over the network topology graph which is selected during location revision routing and which is used for collecting location revision requests at the selected location revision root bridge.

location revision wavefront: a wavefront initiated by the location revision root bridge that propagates through all bridges in the network informing them of the revised location of a host.

location revision wavefront queue of a bridge B: a queue associated with bridge B that contains information about all of the wavefronts that B is currently "on".

LRC table: stands for location revision child table.

LRG: stands for location revision grandparent.

LRST: stands for location revision spanning tree.

LRW queue: stands for location revision wavefront queue.

minimum-depth spanning tree: a spanning tree in which, as compared with other possible spanning trees having the same root, the depth of each node is minimal. A minimum-depth spanning tree can be constructed using the breadth-first search technique.

neighbor bridges: two bridges connected to the same segment. It is noted that the shortest path between neighboring bridges contains two edges: an edge corresponding to one of the two bridge-to-segment connections and an edge corresponding to the other of the two bridge-to-segment connections.

neighbors: refers to neighbor bridges.

network flood active connections table of a bridge B: a table that identifies segments adjacent to bridge B that are connected to B in a network flood spanning tree.

network flood reaching table of a bridge B: a table associated with bridge B that identifies for each source segment S in the network, a (unique) segment adjacent to bridge B that appears on the (unique) path from S to B in the network flood spanning tree.

network flood spanning tree: a spanning tree over the network topology graph which is selected during network flood routing and which is used to flood copies of a packet to all segments in the network.

network segment: an individual component LAN of an extended LAN.

network topology graph: a graph representing the structure of an extended LAN with bridges, segments and connections therebetween. The network topology graph is a connected graph. That is, the network topology graph contains at least one path between every two nodes.

NFA table: stands for network flood active port connection table.

NFR table: stands for network flood reaching table.

NFST: stands for network flood spanning tree.

node: an element of a graph. In the context of the present invention, each node in the network topology graph represents either a bridge or a segment.

packet: a transmission data frame sent from one station to another. Among other items, a packet contains a destination address, a source address, a type, and data (also known as payload.)

path: a sequence of edges $E_1, E_2, \ldots, E_n$ connecting a series of nodes $N_0, N_1, \ldots, N_n$ such that for each integer i in the range $1 \leq i \leq n$, edge $E_i$ connects nodes $N_{i-1}$ and $N_i$. Such a path is said to go from node $N_0$ to node $N_n$.

path length: the number of edges in a path. For a path P the length of P is referred to as L(P).

path weight: the sum of the weights of the edges in a path.

port: refers to a bridge port.

port identifier: a unique identifier of a port. In the preferred embodiment, for each port in a bridge the port identifier is a concatenation of the bridge identifier and an index associated with the port (hereafter port's index).

port index: a small integer unique to each port within a given bridge. In the preferred embodiment, the bridge assigns consecutive integers 1, 2, 3, etc. to its ports.

POST: stands for propagation order spanning tree.

propagation order spanning tree: a spanning tree over the network topology graph which is formed during a propagation phase and is used to manage a topology acquisition function.

segment: refers to a network segment (see: network segment).

segment identifier: a unique identifier of a segment. In the context of the present invention, the segment identifier is assigned by a segment master. In the preferred embodiment, the port selected to be the segment master assigns this port identifier as the segment identifier.

segment inventory: the list of all the port identifiers of ports connected to a given segment. The segment inventory is maintained by the segment master which broadcasts it to all of the ports connected to the segment. The bridge identifier can be extracted from the port identifier, allowing each bridge to obtain the bridge identifier and use it to contact, via a shared segment, each of its neighbor bridges.

segment master: a port connected to a segment that is selected to maintain the segment inventory and assign a unique segment identifier to the segment.

shortest path: a path between two nodes that has the minimum length over all paths between those two nodes.

spanning tree: a set of edges in a connected graph such that between any two nodes there is exactly one path using edges in the spanning tree.

spanning tree bridging method: a method for transparent bridging, such as IEEE Standard 802.1D-1993, in which each connection is classified as either active or standby, the active connections are selected so as to form a spanning tree over the network topology graph, and bridges forward packets between active connections only.

standby connection: a connection to and from which bridges do not forward packets.

station, an addressable device connected to a LAN.

subtree network report: a description of a portion of the network topology graph consisting of a list of bridge-to-segment connections, wherein each connection is described as a pairing of bridge identifier and segment identifier, said portion being a subtree of the propagation order spanning tree and all adjacent segments.

subtree report: another name for a subtree network report.

Topology: another name for the network topology graph.

topology acquisition instance identifier: a concatenation of an epoch number and the bridge identifier of the initiator of a particular instance of topology acquisition.

total network report: a description of the network topology graph consisting of a list of bridge-to-segment connections, wherein each connection is described as a pairing of bridge identifier and segment identifier.

total ordering of a set S: a relation among the members of the set S whereby (1) for any two different members S1 and S2 of S, either S1 is less than S2, written S1<S2, or S1 is greater than S2, written S1>S2, and (2) for any three members S1, S2, and S3 of S, if S1<S2 and S2<S3 then S1<S3.

wavefront protocol: a technique for propagating a piece of new information from an initial bridge through all bridges in a network via an exchange of packets such that there is always a barrier between bridges that know they can use the new information and bridges that have not yet heard of it. Bridges that have not yet heard of the new information are "ahead" of the wavefront, bridges in the barrier are "on" the wavefront, and bridges that can use the new information are "behind" the wavefront.

A Functional Model of The Bridged Network

In general, the present invention provides a network, preferably a bridged network, configured to improve the network bandwidth, and to effectively and efficiently manage the network topology and hosts location changes. The bridged network has smart bridges configured to preferably provide transparent shortest paths routing in the bridged network. In providing the transparent shortest path routing, where each such path is unique, the invention mitigates the bridged network gridlock problem referred to as the level-2 mesh (L2-mesh) problem and increases the bandwidth of the bridged network. The present invention additionally provides effective and efficient management of bridged network topology and host location changes.

The overall performance of the bridged network is improved through implementation of a suite of functions. These interrelated functions include inventory construction, topology acquisition, communications initialization, communications operation, and location revision, as will be described in further detail below.

Inventory construction is performed by cooperation of bridge ports connected to a given segment. Using a master selection protocol based on multicast packets, one bridge port is selected as the master of the segment and the remaining bridge ports become slaves. The master compiles a list (the "segment inventory") of the bridge ports connected to the segment and announces it to the slaves. In response, the slaves acknowledge the master. The master expects regular repeat acknowledgments from the slaves and the slaves expect regular repeat announcements from the master. If there are any changes associated with the segment, either the master will announce an inventory change or, in the case the master disappears, the surviving slaves will select a new master. In any event, the bridge ports will be informed if any change occurs regarding their segment. When an inventory change occurs, topology acquisition is initiated.

Topology acquisition is performed cooperatively by all the bridges in the network. Topology acquisition spreads through the network via a propagation function, gathers a description of all bridge-to-segment connections (the "total network report") via a collection function, and delivers the total network report to all the bridges via a distribution function. The propagation function also prompts a suspension of communications operation. The inventory construction and topology acquisition functions are more fully addressed in the related U.S. Patent Application entitled "Bridged Network Topology Acquisition," which is referenced hereinabove in the Related Applications section.

Communications initialization is performed by each bridge separately based on the total network report. Communications initialization first invokes a create graph function to convert the total network report into an equivalent but more useful data structure called the network topology graph. Whereas the total network report is more suitable for the collection and distribution functions of topology acquisition, the network topology graph is more suitable for the subsequent functions performed by communications initialization. The conversion is preferably deterministic, so that from identical copies of the total network report each bridge constructs an identical copy of the network topology graph. The network topology graph can be alternatively constructed by a designated bridge using a non-deterministic conversion. Using this approach, the conversion result is propagated through the network rather then having each bridge construct a copy of the network topology graph. That is, even though each bridge performs communications initialization individually, since the global assignments function is deterministic and operates on an identical copy of the network topology graph, the result in each bridge is identical.

Communications initialization further invokes a global assignments function that assigns unique index numbers to segments and bridges. The index numbers are useful in identifying segments and bridges and managing communications therebetween.

Communications initialization additionally invokes a routing function. The routing function decides how packets are to be routed based on the network topology graph and the global assignments. Three different types of routing are provided: location revision routing for forwarding location revision requests, network flood routing for forwarding multicast packets, and transparent shortest path routing for forwarding packets to a single destination whose location is known. The routing function invokes a subordinate function for each type of routing.

The location revision routing function chooses a location revision spanning tree (LRST) over the network topology graph. A bridge is chosen as the root of this tree. It is noted that in the LRST each bridge except the root bridge has a parent and grand parent for forwarding location revision information. In the LRST, each bridge has a segment for a parent and a bridge for a grandparent. As part of a location revision, each bridge, except the root bridge, forwards a location revision request to its location revision grandparent (LRG). In turn, the root bridge creates location revision wavefront when it receives the location revision request.

The network flood routing function chooses a network flood spanning tree (NFST) over the network topology graph. Host packets destined to a group of stations are classified as "network flood" packets. Also, host packets that are destined to a station whose location is not known are forwarded as "network flood" packets. As part of communications operation, network flood packets are forwarded over all segments in the network. Based on the NFST, the network flood routing function computes an active connection table (which serves as a flood forwarding table) and for each adjacent segment a flood sourcing table. Bridge-to-segment connections that are part of the NFST are called "active connections". The active connection table indicates which bridge-to-segment connections of the bridge are active connections and which are not. When during communications operation a network flood packet is received on an active connection, the communications operation function forwards the packet onto all other active connections. A packet that originates on an originating segment and follows the network flood spanning tree can be heard by a bridge on exactly one of its adjacent segments, the packet source segment. The sourcing table for the bridge indicates the packet source segment for each originating segment. The sourcing table is used during communications operation to check for host location changes.

In each bridge in the bridge network, the best path routing function computes forwarding and sourcing tables for the bridge. For each pair of originating source and destination segments, S and D, in the bridged network, a unique shortest path from S to D is chosen and called the best path. The forwarding table for the bridge indicates, for each source and destination segment pair (i.e., the packet source segment, T, adjacent to the bridge and the destination segment, D) which next hop segment, U, (if any), the bridge should use to forward a packet it heard on the packet source segment, T, so that the packet travels on the best path to its destination segment, D. The sourcing table indicates, for each segment, U, adjacent to the bridge and each originating segment, S, which previous hop segment, T, (if any), should have been the packet source segment. Namely, the sourcing table indicates on which source segment, T, the bridge should have heard the packet before forwarding it to U, assuming the packet is traveling on the best path from the originating segment, S, to the packet's destination. As mentioned, the sourcing table is used during communications operation to check for host location changes.

Also as mentioned, all steps performed by communications initialization are, preferably, deterministic based on the total network report. Therefore, using identical copies of the total network report, each bridge chooses the same LRST, the same network flood spanning tree, and the same best paths. Once communications initialization is complete, the bridge resumes communications operation.

Communications operation is responsive to application-level packets, referred to as host packets. Communications operation performs its activities based on the active connection, reaching, forwarding, and sourcing tables that are determined during communications initialization, and based on the HLOC table which is managed by the location revision function. Communications operation learns the locations of hosts, detects changes in the locations of hosts, and forwards host packets. The communications initialization and operations are more fully addressed in the related U.S. Patent Application entitled "Bridged Network Communications Initialization And Operation With Transparent Shortest Path Routing," which is referenced hereinabove in the Related Applications section.

Location revisions are performed cooperatively by all bridges in the network. Based on the LRST, the location revision function collects reports of host locations at a designated bridge. The location revision function distributes these reports to all the bridges using a wavefront protocol. Based on the arriving wavefronts, the location revision function manages the HLOC table.

A wavefront revising the location of a host is treated as an impenetrable barrier to packets to or from the host. The wavefront separates "old" bridges that are using the "old" location of the host from "new" bridges that are using the "new" location of the host. Therefore, the wavefront prevents any confusion regarding the location of the host. The location revision function is more fully addressed herein below.

Reference will be made in the following description to preferred embodiments of the invention, examples of which are illustrated in the accompanying drawings. Wherever convenient, the same reference numbers will be used throughout the drawings to refer to the same or like parts.

The Network Environment

FIG. 1 shows an example of a network 100 with an extended network architecture in which an embodiment of the present invention can be implemented. The network 100 includes LANs (local area networks) 110a through 110g (110a–g), where a LAN, e.g., 110e, may be located at a greater distance from some other LANs 110a–d or a network server 114g. In this case, communication with the distant LAN 110e may be accomplished using a communication link 112g such as a fiber optic link. For the purpose of the present invention, such a communication link is considered as a degenerate LAN 110g with two stations, bridge 116b and bridge 116c. According to an embodiment of the invention, the LANs 110a–f conform with the Institute of Electrical and Electronic Engineers standard 802.3 (IEEE 802.3) commonly referred to as Ethernet. Ethernet is a multiaccess, packet-switched communications network for carrying digital data in the form of packets among locally distributed computing systems.

In the LANs 110a–g, packets pass through a shared-communication bus known as a LAN segment (hereafter "segment") 112a–g. A packet sent from a station attached to a particular one of the segments 112a–g, is common to and received by all the other stations which are attached to the segment 112a, . . . or 112g (the alternatives 110a, . . . or 110g and 112a, . . . or 112g are hereafter collectively referred to, respectively, as 110 and 112).

The extended network architecture of network 100 shows hosts 114a–g, bridges 116a–d and segments 112a–g. The hosts 114a–g and bridges 116a–d are addressable devices attached to the network 100 and are connected to various segments 112a–g of the network 100. In the extended LAN architecture of network 100 the bridges 116a–d function as forwarding devices that interconnect the LANs 110a–g and allow hosts 114a–g on the attached LANs 110a–g to communicate with each other as if the hosts 114a–g are on the same LAN. The extended network architecture of network 100 is referred to as the bridged network architecture.

Segments 112a–g are a shared transmission medium such as, for example, a continuous conductor or fiber optic link. Any data transmitted by a host 114a–g or bridge 116a–d that is connected to a given segment 112a–g is propagated throughout the entire segment 112a–g so that all other hosts 114a–g or bridges 116a–d connected to the same segment 112a–g can receive the data.

Packets passing through a segment 112 and destined to certain addressable devices are recognized by these devices and ignored by other addressable devices. The packet address recognition is used by addressable devices that are attached to and share the same segment 112 of a LAN 110 in order to selectively take packets which pass on the segment 112. However, bridges recognize all packets regardless of destination address and are able to relay them to other segments in order to accomplish their function as forwarding devices.

The bridged network architecture of network 100 conforms with a model of network architecture such as the open system interconnect (OSI) model. This model is associated with a suite of protocols as described below. FIG. 2 illustrates a data link layer bridging in the OSI architecture model.

The OSI architecture 200 is split between seven layers from the lowest to the highest: a physical layer 202, a data link layer 204, a network layer 206, a transport layer 208, a session layer 210, a presentation layer 212, and an application layer 214. The protocol in each of the enumerated layers, except the physical layer, uses the layer below it. This arrangement of protocols in layers is called a protocol stack. Each host contains an implementation of the entire seven-layer protocol stack.

The physical layer 202 is responsible for the electrical and mechanical interface to the communications media. The data link layer 204 is responsible for transmission, framing, and error control over a single OSI communications link. High-level protocols provide functionality at layers above the data link layer 204 and are not concerned with how the data link layer implements its functions.

The data link layer 204 for LANs such as Ethernet is divided into a lower sublayer, the media access control (MAC) layer 204-1 and an upper sublayer, the logical link control (LLC) layer 204-2. The MAC layer 204-1 is responsible for framing data into packets, transmitting packets between source and destination stations on a single OSI communications link, and detecting errors.

It is helpful to understand that a single LAN such as an Ethernet is an OSI communications link. When a LAN is extended using bridges, it is still a single OSI communications link because the hosts are not aware of the presence of bridges. Hosts interconnected by bridges in an extended LAN communicate with each other using their MAC layers 204-1 just as if they were on a single LAN. Consequently, bridge functions 204-1b can be considered as being "wedged into the middle" of the MAC layer 204-1a. Bridges are called transparent because they extend the functionality of the MAC layer 204-1 without the MAC layer 204-1 in the hosts being aware of the extension. Bridging provides an interconnection of LANs transparent to hosts communicating across a bridge.

Bridge functions 204-1b are performed within bridges whose functional model is further explained below. In performing bridge function 204-1b, bridges filter and relay packets. Bridges filter packets by interpreting MAC source and destination addresses. Bridges relay packets between LANs according to a forwarding scheme so that packets are routed to their destination.

FIG. 3 illustrates a transmission data frame (packet) 300 that is relayed by bridges in the network 100. The data frame 300 includes a preamble 302, a destination address 304, a source address 306, and other pertinent fields 308, 310 and 312. In order to facilitate the routing of messages in the network, transparent bridging requires that bridges dynamically maintain a location table (accessed by MAC address) for each of their LAN connections.

Each addressable device has its own, typically 48-bit long, MAC address. The MAC address is also referred to as a unique identifier (UID) or physical address. For different types of destinations different MAC addressing modes are used. For example, when a packet is destined to a particular station, the UID of the destination station is placed in the destination address 304 of the packet. When a packet is destined to a group of stations, the group is identified by a special type of address known as a multicast address which is placed in the destination address 304 of the packet. When a packet is destined for all stations in the network, a special multicast address called the broadcast address is placed in the destination address 304 of the packet.

Bridge Functions

Bridges learn about the presence of stations by listening to packets passing by. Packets 300 provide the necessary forwarding information in the form of source and destination addresses 306 and 304, respectively. From this listening, bridges obtain the MAC addresses of stations connected to their LAN segment and from this information a location table relating MAC addresses to segments can be built. The location table is used by the bridges to make forwarding decisions.

To better understand the bridge functions it is helpful to consider the structural model of a bridge. FIG. 4 illustrates a structural model 400 of a bridge implemented in accordance with an embodiment of the invention. It is noted that modules in this simplified illustration may be modified, rearranged or combined without departing from the scope and spirit of the invention. For example, each port 410-1, . . . n may contain its own segment inventory module 412-1, . . . n as shown, or the bridge might have one segment inventory module shared among all its ports 410-1, . . . n.

Ports 410-1, . . . n of bridge 400 provide transmit and receive services using connections 414-1, . . . n to corresponding LANs 416-1, . . . n. Each port 410-1, . . . n implements the physical layer and data link layer for its corresponding LAN 416-1, . . . n. The illustrated bridge configuration shows in each port 410-1, . . . n a corresponding segment inventory module 412-1, . . . n that compiles a list (the "inventory") of all bridge ports that are connected to the corresponding LAN 416-1, . . . n via an exchange of port-to-port packets. The ports 410-1, . . . n interact collectively with the remaining bridge modules and are hereafter collectively referred to as 410. Several channels interface between the ports 410 and the remaining bridge modules. For example, data channel 422a links the ports 410 with a topology acquisition module 422, communications data channel 426a links the ports 410 with a communications operator module 426, and location data channel 428a links the ports 410 with the location revision module 428.

The ports 410 keep the segment inventories 430 up to date. When a network topology change is detected, the topology acquisition module 422, exchanges topology acquisition packets with other bridges via data channel 422a and ports 410, and eventually obtains the total network report 440. The total network report 440 lists each bridge-to-segment connection in the network. Based on the total network report 440, the communications initialization module 424 computes the location revision grandparent (LRG) 450, the location revision child (LRC) table 452, the network flood active port connection (NFA) table 460, the network flood reaching (NFR) table 462, the best path forwarding (BPF) table 470, and the best path sourcing (BPS) table 472.

As mentioned, bridge operations at the data link layer make the bridges transparent to host data link layers and any higher-level protocols that use the LAN connectivity service. Bridges provide packet-forwarding capability in that they receive, check and forward packets between LANs, e.g. 416-1, . . . 416-n. Checking and forwarding packets is the task of the communications operations module 426. The communications operations module 426 sends and receives packets via data channel 426a through ports 410. The communications operations module 426 uses the HLOC table 480 to map a packet's source and destination addresses to segments. Then, based on the source and destination segments, the communications operations module 426 consults the NFA table 460, the NFR table 462, the BPF table 470, and the BPS table 472 to check the source of the packet and to determine if and how to forward it. Checking the source of a packet can result in learning the location of a new source address or learning the new location of a supposedly known source address. Learning results are relayed to the location revision module 428.

The location revision module 428, exchanges location revision packets with other bridges according to the LRG 450, the LRC table 452, and a wavefront distribution protocol. The exchange is performed via data channel 428a through ports 410. Through the exchange by the location revision module 428, learning results from the communications operations module 426 are distributed to all bridges in the network. The location revision module 428 installs the new information into the HLOC table 480. In distributing the new information, the location revision module 428 uses the location revision wavefront (LRW) queue 482 to manage the wavefront distribution protocol. Certain interactions between modules, such as the suspension of communications operation prompted by a propagation function of the topology acquisition module, are omitted from the simplified module structure shown in FIG. 4.

It may be recalled that the L2-mesh problem is a latency and aggregate bandwidth limitation that arises in larger-scaled networks due to the restriction that active connections must form a spanning tree. That is, every packet traveling from one host to another must follow the spanning tree, even if the network contains a much shorter path. The present invention mitigates the L2-mesh and related problems by implementing in bridges the above-inentioned suite of functions. This suite of functions allows packets to be routed along shortest paths of the bridged network and, thereby, improves the network's latency and aggregate bandwidth.

FIG. 5 illustrates the suite of bridge functions 500 in accordance with an embodiment of the invention, including: bridged network inventory construction topology acquisition, communication initialization and operation employing transparent shortest path routing, and location revision. Detailed functions description in conjunction with their corresponding illustrations will be provided following this general description of the suite of functions 500.

It should be readily apparent that although all bridges (i.e., smart bridges) in the network may be configured with the suite of functions 500, they do not simultaneously perform each of the functions in the same manner. Specifically, it will become clear from the following discussion that certain designated root bridges assume unique roles in performing the network topology acquisition function and the location revision function. Moreover, from among the bridges attached to each network segment one bridge port is designated to assume the role of a segment master responsible for monitoring the fitness or failure of the network segment and changes in the set of bridge ports that are connected to it. In carrying out their roles, a root bridge and/or a segment master may perform functions in a way that other bridges are not required to perform, although the other bridges are capable of being responsive to or assuming the role of the root bridge and/or segment master.

After a network startup, or reboot, all bridges in the network perform an inventory construction function 502. In accordance with an embodiment of the invention, this function is performed in the segment inventory module (412-1, . . . n, FIG. 4). In performing this function the bridges utilize a set of rules for governing the format of packets exchanged between them. In order to keep up with network changes such as bridge failure, deactivation or activation, the bridges perform the inventory construction function 502 periodically (or continuously). Upon detecting a network change, a bridge that detects this change initiates a topology acquisition function 504. More than one bridge may notice the change and initiate the topology acquisition.

A bridge that initiates the topology acquisition becomes a new designated root bridge for this purpose. Since more than one bridge may detect a network change, more than one competing instance of topology acquisition may be initiated. Each initiator bridge is designated as the root bridge of the particular instance it initiated. Multiple instances, if present, compete with each other to gain control of the entire network. A deterministic choice selects one instance to prevail from among the most recent instances.

The topology acquisition function 504 executes a propagation function 504a which involves a 'join' request-reply protocol. This protocol governs an exchange of join request packets and reply packets between each bridge and all other bridges on its connected segments (called neighbor bridges). The propagation function 504a starts with the initiating root bridge and spreads across the entire network as neighbor bridges join their predecessors and then contact their neighbors. When a bridge (other than the root) joins the propagation function 504a it adopts as its parent the neighbor bridge that first contacted it. The result of adopting parents during the propagation function 504a is to form a propagation order spanning tree (POST) which is used to manage the subsequent collection function 504b and distribution function 504c. During the propagation function 504a each bridge becomes familiar with its parent and children in the POST, but in general no bridge knows the entire POST.

The topology acquisition function 504 uses the POST constructed during the propagation function 504a to manage a collection function 504b and a distribution function 504c. The collection function 504b allows the prevailing root bridge to collect a total network report by gathering and merging descriptions of the bridge-to-segment connections of each of the bridges in the entire network. The total network report is a list of each bridge, segment, and bridge-to-segment connection in the entire network. When the collection function 504b ends, the root bridge invokes the distribution function 504c to deliver the total network report to each of the bridges in the network. Following the distribution of the total network report, each bridge is familiar with all of the bridges, segments, and bridge-to-segment connections in the entire network.

A next function in the suite of functions is referred to as the communications initialization function 506. The communications initialization function 506 includes a create graph function 506a, a global assignments function 506b, and a routing function 506c.

The create graph function 506a converts the total network report into an equivalent but more suitable representation called the network topology graph. The global assignments function 506b assigns unique index numbers to segments and bridges. Although each bridge performs the global assignments function 506b separately, each bridge performs the same assignments because the assignments are based on identical copies of the total network report which is distributed by the network topology acquisition function 504.

An alternative implementation performs the global assignments function 506b once at the initiator bridge, after the collection function 504b and before the distribution function 504c. In accordance with the alternative implementation, the distribution function 504c distributes the results of the global assignments function 506b along with the total network report.

The communications initialization function 506 additionally includes a routing function 506c. The routing function 506c in turn contains three functions: a location revision routing function 506c.1, a network flood routing function 506c.2, and a best path routing function 506c.3. Based on the results of the create graph function 506a and the global assignments function 506b, and preferably using a breadth-first search function 512, these three routing functions compute tables that are used by the bridges to make forwarding and source checking decisions, as will be further explained below.

Once performance of the communications initialization function 506 is completed, the network is considered stable and the bridge is ready to start (or resume) the communications operation function 508. The communications operation is responsive to packets initiated by hosts (114a–g, FIG. 1).

Packet forwarding decisions in accordance with an embodiment of the invention are performed by bridges using a packet forwarding function 508a in cooperation with a location learning function 508b, a location checking function 508c, a location expiration function 508d, and a location revision function 510. These functions participate in evaluating and handling changes in host locations within the network. A host location is the segment to which the host is connected.

To better understand the above-enumerated functions of FIG. 5, a more detailed description of them is now presented. It is noted that references to the functions will be made throughout the following discussion using their corresponding designation number in FIG. 5 (in parenthesis).

The Inventory Construction Function

When a bridge is powered on, and possibly at other times, each of its ports performs a self-test function and then, provided the self-test succeeds, declares itself to be on-line. As mentioned, each bridge is identified by a unique address (UID), and within the bridge each port is uniquely identified by a port index. The port index is a small integer, typically 1, 2, 3, etc. To identify each port of a given bridge, a port identifier is formed by concatenating the unique bridge identifier and the respective port index which identifies the port within the bridge. The port identifier is used in all packets sent by the inventory construction function (502) to identify the sending port, the segment master port and, in the case of an announcement packet, each of the ports in the segment inventory. In the inventory construction function (502), each port has its own idea of who the segment master is and what ports are in the segment inventory.

The inventory construction function (502) is charged with the network topology inventory monitoring. As part of the inventory construction function (502), one port on each segment is selected as the segment master for that segment. The remaining ports which are not segment masters are called segment slaves, or, simply, slaves. Although the segment masters and slaves have different roles in the inventory construction function (502), each port is capable of performing either role, as determined by the steps in the inventory construction function (502).

Initially each bridge port in the network (hereafter "port") considers itself to be the segment master. As segment master, the port multicasts a packet announcing that it is the segment master. This announcement also contains a list of all ports on the segment that have acknowledged this bridge port as the segment master. This list is called the segment inventory. Initially the inventory contains just the segment master itself. All the other ports that share the segment with the "self proclaimed" segment master receive the announcement.

Naturally, if there is more than one port connected to the same segment, there will be announcements from more than one segment master. Since each segment is supposed to have just one segment master, this is a conflict. Preferably, the conflict is resolved in a deterministic way by comparing the port identifiers of the conflicting segment masters. It may be recalled that a port identifier is composed of a bridge identifier and a port index. Among the present segment masters, the segment masters, whose port identifier contains the lowest bridge identifier prevails, and, in the event of a tie (i.e. two or more ports of the same bridge share the segment), the segment master whose port identifier contains the lowest index wins. The prevailing port becomes the segment master. The segment master that looses this competition becomes a slave and sends an acknowledgment to the winning segment master.

The segment master repeats its announcement on a regular basis and slaves repeat their acknowledgements. The segment master expects to get acknowledgements from each of the slaves in its inventory. If no acknowledgement arrives after a suitable timeout period, the segment master removes the failing slave from its inventory. In addition, each slave expects to get announcements that list the slaves in the inventory. If no such announcement arrives at any slave after a suitable timeout period, the slave declares itself to be the segment master and begins sending multicast announcement packets.

The purpose of the inventory construction function (502) is to provide the port's current segment inventory at the port to the topology acquisition function (504). Since the segment inventory may change over time, providing the current inventory is an on-going responsibility. The inventory construction function (502) provides the current inventory by calling, for example, an inventory subroutine in the topology acquisition function. During times when the port is off-line or when there has been recent disagreement about the segment inventory, the inventory construction function (502) informs the topology acquisition function (504) of this fact by providing a special inventory indication of "off-line".

In each port, the inventory construction function (502) operates in cooperation with the inventory construction function in other ports that are connected to the given segment. Assuming that the network segment is operating properly this cooperation causes the ports to converge rapidly to the state in which each of their topology acquisition functions (504) is provided with the same inventory.

FIGS. 6a and 6b together show a flowchart of an inventory construction function (502). The flowchart illustrates the operation of the port in an event-driven fashion. Namely, some event occurs which triggers the port to execute an event service routine starting at a certain starting step. The port proceeds through one or more steps and finally the port reaches the end of the event service routine, a point at which it has no further steps to perform. At this point the port waits until a new event occurs, which again triggers the port to execute an event service routine. This description assumes that a new event never occurs during the servicing of a previous event. In practice, an event service queue can be used to achieve this effect.

When a bridge is powered on, each of its ports starts the inventory construction function (502) at step 600. In step 602 the port sets itself off-line, cancels all timers used in the inventory construction function (502) and calls an unstable inventory subroutine (which is detailed starting at step 680 of FIG. 6b). Then in step 604 the port initiates a self-test. Details of the self-test activity depend on the nature of the data link (e.g. 422a at FIG. 4) and are not shown in the flowchart. The flowchart resumes at step 605 when the self-test is complete. In step 606 the port makes a decision based on the success of the self-test. If the self-test did not succeed, the port initiates it again in step 604. Otherwise, with a successful self-test, the port sets itself on-line in step 608. Then in step 612 the port cancels all timers used in the inventory construction function (502), adopts itself as the segment master and adopts a segment inventory containing just the port itself. Finally in step 614 the port calls the unstable inventory subroutine, announces the segment inventory and starts the announcement timer.

Each port has four main timers that it uses to manage events while performing steps in the inventory construction function (502). These timers are the announcement timer, the new-master timer, the get-inventory timer and the unstable-inventory timer. In addition to these main timers, a port acting as segment master associates a timer with each entry in its segment inventory.

The segment master uses the announcement timer to issue segment inventory announcements at regular intervals. Each time the announcement timer expires, step 640, the segment master announces the segment inventory and starts the announcement timer again, via step 642.

The segment master associates a timer with each entry in the segment inventory. This timer is started in step 624 when the entry associated with a slave is added to the inventory. The timer is restarted (refreshed) in step 626 each time the slave confirms its acceptance. If a slave fails to confirm its acceptance, eventually the slave's entry timer expires. When an entry timer expires, step 630, the entry associated with the slave is removed from the inventory in step 634. The port proceeds in step 614 to call the unstable inventory subroutine, announce the new segment inventory and start the announcement timer.

The segment slaves use the new-master and get-inventory timers to verify the operation of the segment master. The new-master timer covers the interval between a slave adopting a new segment master, which happens in step 660 of FIG. 6b, until the slave expects to find itself listed in the master's segment inventory, which is checked in step 672. With each announcement received from the segment master, the slave sends an acceptance in step 666 so that if the segment master is operating correctly it should include the slave in its inventory. Once the new-master timer has expired, the slave checks the current inventory via steps 670 and 672, and checks every new announcement from the current segment master via steps 668 and 672, to verify that the slave is listed in the inventory. If the slave fails to find itself listed in the inventory, there is some fault with either the segment master or the physical network segment. The slave responds in step 674 by calling the force port self-test subroutine, which starts at step 601.

It should be noted that, in step 668, there is nothing further to do in the case that the master timer is not yet expired, hence the absence of an "N" branch from the decision step 668. Likewise in step 672, if the slave is listed in the segment inventory there is nothing further to do, hence the absence of a "Y" branch from the decision step 672.

The get-inventory timer covers the interval between successive announcements of the segment inventory. Each time a new announcement is accepted, step 662, the get-inventory timer is started again, via step 666. If the inventory timer expires, step 610, it means that too much time has passed since the last announcement. Most likely this means that the segment master has failed. In this event the slave declares itself to be the segment master and proceeds as with bridge power-on via step 612.

When a port (presumably a segment master) receives an acceptance from a slave it starts at step 620. In step 621, the port checks to make sure that the port is on-line. The acceptance from a slave is presumably in response to an announcement that the port sent out earlier when it considered itself the segment master. Since the port might now be performing the role of a slave, in step 622 the port checks to make sure that the port assumed the master role and is acting as a segment master. Next, the port checks in step 623 to see if the slave is already in the inventory. If so, the segment master refreshes the slave's entry timer in step 626 by restarting the entry's timer. If the slave is not in the inventory, the segment master adds the slave to the inventory in step 624. The segment master then proceeds in step 614 to call the unstable inventory subroutine, announce the new inventory and start the announcement timer.

It should be noted that there is nothing further to do with a received packet if, as determined in step 621, the port is not on-line, hence the absence of an "N" branch from the decision step 621. Likewise in step 622, there is nothing further to do with an acknowledgement in the case that the port is not acting as master, hence the absence of an "N" branch from the decision step 622.

When a port receives an announcement from a segment master, it starts at step 650. Again the port verifies that it is on-line via step 651. If the announcing segment master is the same as the current segment master of the port, as checked in step 652, then the port proceeds to step 662 to check the new inventory. Otherwise, the port chooses between the two masters in step 654. The port chooses a segment master by comparing the port identifiers of the two segment masters. The segment master whose port identifier contains the lower bridge identifier prevails. However, in the event of a tie, the segment master whose port identifier contains the lower port index prevails. It should be noted that the port itself may be the current segment master. That is, the port's current segment master might be itself. If the announcing segment master prevails, the port assumes (or continues in) the slave role and adopts the announcing segment master as its current segment master in step 660. Also, as a slave, the port cancels, in step 660, all of the master role timers and starts the new-master timer. The new-master timer enables the slave to verify that the new segment master hears the slave's acceptance and includes the slave in its inventory within a reasonable interval of time.

In any event, a slave arrives at step 662 when it has received an acceptable announcement from the segment master. In step 662 the slave compares the newly announced inventory against its current inventory to see if they are the same. If not, in step 664 the slave adopts the new inventory and performs the unstable inventory subroutine. Whether the inventories are the same or not, in step 666 the slave sends an acceptance to the segment master and starts the get-inventory timer. The get-inventory timer enables the slave to verify that the segment master issues a new announcement within a reasonable interval of time.

After sending an acceptance in response to an acceptable announcement, the slave checks to see if the new-master timer has expired, via step 668. If so, a reasonable interval of time has passed since the slave first sent an acceptance to the current master and the slave checks to find itself listed in the new inventory, via step 672. If the slave fails to find itself listed in the new inventory, there is some fault with either the segment master or the physical network segment. The slave responds in step 674 by calling the force port self-test subroutine, which starts at step 601.

As determined in step 654, in the event that a port receives an announcement from a presumed segment master that in fact should not be the segment master, the port proceeds in step 656 to call the unstable inventory subroutine. Clearly the segment inventory is not stable if some port that should not be the master is still claiming to be so. It should be noted that, as indicated in step 651, there is nothing further to do with a received packet in the case that the port is not on-line, hence the absence of an "N" branch from the decision step 651.

The port performs the unstable inventory subroutine in one of several instances: the port goes off-line, some change has been noticed in the current segment inventory or the port has reason to believe that the current segment inventory is not stable. The unstable inventory subroutine informs the topology acquisition function (504) that the port is not useable by providing it with the special inventory "off-line" indication. The port uses the unstable-inventory timer to detect when a reasonable interval of time has elapsed with no further calls to the unstable inventory subroutine. When the unstable-inventory timer expires, the current inventory is considered stable and ready to be provided to the topology acquisition function (504).

The unstable inventory subroutine starts at step 680 (FIG. 6b). In step 682 the inventory construction function (502) calls the new inventory subroutine in the topology acquisition function (504) to provide a port "off-line" inventory. The port that prompts the unstable inventory subroutine also starts the unstable-inventory timer.

When the unstable-inventory timer expires, step 690, the port verifies that it is on-line, via step 691. If so, it calls the new inventory subroutine in the topology acquisition function (504) to provide the current inventory.

The inventory construction function (502) runs continuously in the background in order to monitor the inventory of ports attached to the segment. If any change occurs in the set of bridge ports that are connected to a segment, one or more segment masters (including perhaps a newly declared segment master) will notice the change, via steps 634, 624 or 610. In step 614, the one or more segment masters will announce the new inventory so that all ports connected to the segment will know it. The inventory construction function (502) will start the unstable-inventory timer in step 682 for each port that announces or hears the new inventory. When the unstable-inventory timer expires the inventory construction function (502) provides the new segment inventory to the respective topology acquisition function (504) in step 692. The new segment inventory lists all ports that are currently attached to the segment, the ports being identified by their respective port identifier.

A problem arises if the segment inventory grows too large to be sent in one packet. As one solution of this problem, the segment inventory is sent as a sequence of packets, where each packet contains its sequence number and an indication of whether it is the last.

The topology acquisition function (504) is started in response to changes in inventory indicated by one or more packets of segment inventory. The topology acquisition functions (504) is described next.

The Topology Acquisition Function

The topology acquisition function (504) is performed in three phases: propagation, collection and distribution. The propagation phase is performed by the propagation function (504a), the collection phase is performed by the collection function (504b) and the distribution phase is performed by the distribution function (504c).

It may be recalled that the ports in each bridge perform the inventory construction function (502) steps in cooperation with other ports that are connected to the same segment. By comparison, each bridge performs the topology acquisition function (504) steps in cooperation with all the other bridges in the network.

The propagation phase of the topology acquisition function (504) starts when the inventory construction function (502) provides an update of the port's current segment inventory. Since the segment inventory is a list of port identifiers (i.e. bridge identifier and index) of the ports connected to the segment, it may be easy to determine who among them is associated with the prevailing segment master. Namely, by comparing port identifiers in the segment inventory it is easy to determine the segment master with the "prevailing" port identifier. One way to simplify this determination is to construct the inventory so that the port identifier of the segment master appears first. It may be recalled that the segment master assigns its port identifier as the segment identifier. Therefore, the segment identifier can be determined given the segment inventory.

The steps of the topology acquisition function (504) are performed in each bridge in cooperation with the steps performed in the other bridges. From segment inventories that are provided by each of its ports, a bridge determines who its neighbor bridges are. It may be recalled that two bridges are neighbors if they are both connected to the same segment. During the propagation phase (504a) of the topology acquisition function (504), each bridge contacts its neighbors, who then contact their neighbors, and so on until every bridge in the network has been contacted.

During this phase, a propagation order spanning tree (POST) is constructed which is used to manage the later phases of the topology acquisition function (504). The bridge that starts the propagation phase (504a) is called the initiator and becomes the root of the POST. A bridge B1 that first contacts another bridge B2 acquires B2 as a child. When bridge B2 joins B1's POST it adopts B1 as its parent. As the propagation phase (504a) spreads across the network, eventually each bridge except the initiator becomes the child of some bridge. Since a bridge cannot contact another bridge until it has first been contacted, the resulting structure of root, children, grandchildren and so on forms a spanning tree.

The topology acquisition function (504) starts in response to a change in the interconnection of bridges and segments, as detected by the inventory construction function (502) associated with a particular port. Over a period of time, there could be many such changes, some perhaps in quick succession, and it is important that the most recent change be reflected in the final result of the topology acquisition function (504). It is also important that the topology acquisition function (504) not be confused by additional interconnection changes that might occur while the topology acquisition function (504) was in progress. For this purpose, each instance of the topology acquisition function (504) is identified separately.

Each time a bridge initiates the topology acquisition function (504) it creates a new topology acquisition instance. Each instance of topology acquisition (hereafter "instance") proceeds to propagate through the network, collect the description of bridge-to-segment interconnections, and distribute it to all the bridges. When a bridge is first contacted and joins an instance, it locks the current segment inventories of its ports into that instance. If one of its segment inventories subsequently changes, the bridge of course creates a new instance of the topology acquisition function (504) in response to the change.

As an instance propagates through the network, it may encounter another instance. The basic idea is that the more recent instance should prevail and the older instance should die out. Certainly if a new instance is started because of a change in a segment inventory that has been locked into an earlier instance, then whenever the new instance encounters a bridge performing steps in the earlier instance, the bridge is required to forget about the earlier instance and join the new instance. A function with competing instances operating in this way is referred to as a competitive distributed algorithm.

Each instance is identified by an instance identifier. The instance identifier is the concatenation of an epoch number and a bridge identifier of the initiator bridge. In general, an epoch number is used as a time stamp. In the context of this discussion, the epoch number is a non-negative integer that counts up "epochs" starting from zero. Preferably, the epoch number is a 64-bit variable. Whenever a bridge creates a new instance upon detecting a change in segment inventory, it first increments its epoch number. In this manner, a larger epoch number distinguishes a newer instance from an older instance of the topology acquisition. So when comparing instance identifiers, the one having the larger epoch number prevails. However, two instances that start at nearly the same time in different parts of the network might well have the same epoch number. Rather than attempt to restructure their POSTs into a unified POST, it is easier to use the same competitive approach and let one instance prevail and the other die out. So, when comparing instance identifiers containing the same epoch number, the one having the lower initiator bridge identifier prevails.

Using the 64 bits for the epoch number, creates in fact a large number of instances. However, in the unlikely event that the epoch number attains its maximum value, say perhaps because of an undetected communications error, it becomes impossible to increase it as required for creating a new instance. In this, extremely infrequent, case, a global reset protocol can be used to reset the epoch numbers of all bridges to zero, after which the normal creation of new instances can resume for another practically unlimited period of time. The global reset protocol can be implemented as any one of the conventional protocols for globally resetting variables.

It is possible that a problem of creating redundant connections may arise in constructing the set of neighbor bridges from the segment inventories which the inventory construction function (502) provides. It is certainly possible that more than one port of a given bridge is connected to the same segment, for example, to achieve greater fault tolerance. However, it is not useful to describe the redundant connections in the network topology graph. The topology acquisition function (504) identifies redundant connections by checking for ports that have the same segment identifier. If redundant connections are found, the topology acquisition function (504) removes all but one of them by considering as "off-line" the inventory for all but one of the corresponding ports. The inventory of each of the remaining ports is scanned to produce the list of bridge identifiers for neighbor bridges that may be contacted through each of these ports. It may be recalled that a segment inventory consists of a list of port identifiers and that each port identifier contains the corresponding bridge identifier. Again, the same bridge may appear more than once (under different port identifiers) in the same inventory, in which case the redundant appearances are ignored.

It should be noted that if one bridge B1 connects to two segments, S1 and S2, and a second bridge, B2, also connects to segments S1 and S2, then the ports of the second bridge, B2, will appear in two different segment inventories of B1, and vice versa. These connections are not redundant in the sense described above, because different segments are involved. The first bridge, B1, can send one packet via segment S1 to the second bridge, B2, and at the same time send another packet to the second bridge, B2, via segment S2.

The following discussion describes in more detail the propagation function (504a), the collection function (504b) and the distribution function (504c). Though each of the above-enumerated functions is described separately, as will become evident, these functions are interdependent in that they rely on the results of their predecessor function(s).

The Propagation Function

FIG. 7 shows a flowchart of the propagation function (504a). As with the inventory construction function (502) these flowcharts depict the operation of the bridge in an event-driven fashion.

When a bridge is powered-on, it starts the propagation function (504a) at step 700. In step 702 the bridge adopts epoch number zero and adopts the "off-line" inventory for all ports. Then, in step 722, the bridge combines the inventories of all ports to form the set of neighbors (which in this case will be empty, since initially all port inventories are "off-line"). The bridge also increments its epoch number by one, and adopts itself as the initiator. The initiator bridge of a topology acquisition instance is the root of the POST. Then, in step 724, the bridge calls the suspend operation subroutine in the communications operation function (508) in order to allow the topology description to stabilize. At this point no requests have been transmitted yet, and no neighbors have replied to any requests to join this instance. Then in step 726 the bridge checks to see if all neighbors have replied. In this case the answer is vacuously "yes" since the set of neighbors is empty. Accordingly; the bridge proceeds to step 734, where it cancels a transmission timer and calls the start collection subroutine in the collection function (504b).

The propagation function (504a) uses a timer called the transmission timer to generate retransmissions of requests to neighbors that have failed to send a reply. The bridge might fail to receive a reply from a neighbor because, for example, the request or reply was lost, the neighbor's inventory construction function (502) is not yet up-to-date, or the neighbor has already joined a more preferable instance. The idea is to retransmit the request after a reasonable interval to give the neighbor another chance to reply, and these retransmissions will be repeated a reasonable number of times to allow for repeated failures.

Each time the transmission timer expires (step 750) the bridge determines, in step 752, if the reasonable number of retransmission times has been exceeded. If so, it is assumed that there is a failure in communication with any neighbor that has not yet replied. So, in step 756, the bridge calls the force port self-test subroutine of the inventory construction function (502) that is used with reference to or in each port to communicate with such a neighbor. This will result in the inventory construction function (502) placing these ports off-line for a while and, meanwhile, perhaps another instance of topology acquisition can succeed.

If it is determined, via step 752, that another time of retransmission is reasonable, the bridge sends another request to join its instance to each neighbor that has not yet replied, and starts the transmission timer again, via step 754.

At various times the inventory construction function (502) calls the new inventory subroutine to inform the propagation function (504a) of the current inventory for some port P. This subroutine starts at step 710. In step 712 the propagation function (504a) checks to see if the new inventory for port P is actually different from the last inventory it adopted for port P. The propagation function (504a) performs this check so that it can suppress superfluous instances of the topology acquisition function (504) which result from spurious new inventory reports from the inventory construction function (502). This design therefore permits the inventory construction function (502) to generate spurious new inventory reports should it be convenient to do so, without having as a consequence the disruption of communications operation that performing the network-wide topology acquisition function would have.

In the event that the new inventory for port P is actually different from the last adopted inventory for port P, the bridge adopts the new inventory, via step 714. Then, in step 722, the bridge combines the inventories adopted for all its ports to form the set of its neighbors. The bridge further increments its epoch number, and adopts itself as the initiator of a new topology acquisition instance (step 722). Then in step 724 the bridge calls the suspend operation subroutine in the communications operation function (508). At this point no requests have been transmitted yet, and no neighbors have replied to any requests to join this instance.

In step 726 the bridge checks to see if all neighbors have replied. If there are no neighbors, the bridge proceeds to step 734 as in the bridge power-on case. If there are neighbors, the bridge proceeds to step 754, where a request to join this topology acquisition instance will be sent to each neighbor bridge and the transmission timer will be started so that retransmissions can be resent if needed.

When the bridge receives a reply from a neighbor using the same instance the propagation function (504a) starts at step 730. The reply contains an instance identifier so that the propagation function (504a) can determine whether the reply belongs to the same instance in which the bridge is currently participating. Although not shown on the flowchart, a reply belonging to a different instance is simply discarded. The reply also contains an indication to the receiving bridge of whether the neighbor "accepts" or "refuses" to be a child of the receiving bridge in the POST of the topology acquisition instance. For the purpose of performing the steps in the propagation function (504a), the important information is that the neighbor has replied, and its status as a child or not is irrelevant. In step 732, the bridge checks to see if all neighbors have replied. If so, the bridge proceeds to step 734, where it cancels the transmission timer and calls the start collection subroutine in the collection function (504b).

A bridge that receives a request from a neighbor to join an instance of topology acquisition starts at step 740. In steps 741 and 742, the bridge checks to see if the neighbor's instance is the same as, more preferable than, or less preferable than the instance in which the bridge is currently participating. If the neighbor's instance is less preferable, the request is discarded and nothing more is to be done. If the neighbor's instance is the same, then the bridge proceeds to step 743 to decide which reply to send. If the neighbor is the bridge's parent in the POST, the bridge proceeds to step 746 to send an "accept" reply; otherwise the bridge proceeds to step 747 to send a "refuse" reply. The bridge might receive repeated join requests from the same neighbor and repeatedly have to send back a reply. This could happen because of communication errors resulting in lost replies and consequent retransmissions from the neighbor.

If the join request from the neighbor belongs to an instance that is more preferable than the instance in which the bridge is currently participating, the bridge proceeds to step 748. In step 748, the bridge adopts the instance from the neighbor, adopts the neighbor as its parent in the POST of this instance, and sends an "accept" reply back to the neighbor. Then, the bridge proceeds to step 724 to suspend communications operation and, in turn, start sending requests to each of its neighbors to join its instance as described before.

The propagation function (504a) may have additional features. One feature is, for example, that there is no need for a bridge that adopted a neighbor as its parent to send back to that neighbor a request to join the instance. By logical deduction, the bridge knows that its parent has already joined the instance and any reply from its parent will be "refuse". However, it should be noted that sending requests to and getting replies from all neighbors including the adopted parent could be used to guarantee that all earlier packets sent to neighbors had been flushed out, provided the bridge hardware and software guarantee to preserve packet ordering. Such a "flush out guarantee" is required for an alternative design in the revision wavefront function (510b) as will be discussed later. As an another example, the request and reply packets can be unified into a single-type packet with the incorporation of an indication as to whether or not a reply is wanted.

To further clarify the propagation function (504a), FIG. 8 illustrates a POST construction, taking for example the network 100 of FIG. 1. Since the hosts 114a–g do not participate in the propagation function (504a), for clarity they have been omitted from FIG. 8. Assuming that a first initiator bridge, bridge 116b, detects a segment inventory change and becomes the root 810 of a first POST instance. Bridge 116b sends request packets 812, 814, and 816 to its neighbor bridges 116d, 116a, and 116c, respectively. It is noted that request packets 812 and 814 travel across the same segment 112b. Assuming that soon after the neighboring bridges, i.e. bridges 116d, 116a and 116c, joined bridge 116b as its children, bridge 116d detects a segment inventory change. Since bridge 116d has already locked its previous segment inventory into the first POST which was initiated by bridge 116b, bridge 116d must now increment its epoch number and initiate a second POST instance construction. In the second POST instance, bridge 116d is the root 820. Operating in the second POST instance, bridge 116d then sends join request packets 822, 824, and 826 to its neighbors, bridges 116a, again 116a, and 116b, respectively. It is noted that bridge 116a is twice a neighbor of bridge 116d, once via LAN 110a and once via LAN 110b. Therefore bridge 116d sends bridge 116a two join request packets, 822 and 824, via segments 112a and 112b, respectively. Since the second POST instance has a larger epoch number, bridges 116a and 116b drop the first POST instance and join bridge 116d as its children in the second POST instance. Operating in the second POST instance, bridge 116b will proceed to contact its neighbor bridge 116c, which will become a child of bridge 116b and a grandchild of bridge 116d. In the exemplary network of FIG. 8, the second POST instance remains the only POST with bridge 116d being the designated root bridge of the POST. At this point the propagation function (504a) is completed.

However, each bridge is initially only familiar with its neighbors—that is, its parent and children in the POST. In order to inform each bridge of all of the bridge-to-segment connections in the entire network, the topology acquisition function (504) invokes the collection function (504b).

The Collection Function

FIG. 9 shows a flowchart of the collection function (504b). As is the case with the inventory function (502) and topology acquisition function (504), this flowchart depicts the activity of the bridge in an event-driven fashion.

When a bridge performing an instance of the propagation function (504a) receives replies from all of its neighbors it calls the start collection subroutine in the collection function (504b), via step 900. In step 904, the bridge checks if it has received subtree reports from all of its children. A bridge that is a leaf in the POST has no children, and in such a case it proceeds to step 906. Otherwise, the bridge waits to receive subtree reports from all its children.

A subtree report for a bridge B is a list of all bridge-to-segment connections for all bridges in the POST subtree that is rooted at bridge B. A bridge-to-segment connection, known as a "connection identifier," is described by combining the bridge identifier and segment identifier of the bridge and segment to which the bridge is connected. The connection identifier is formed by concatenating the bridge and segment identifiers. It is noted that the connection identifier is a unique identifier for a connection. In the case of a bridge that is a leaf in the POST, the subtree report is simply the list of the connections of that bridge to its parent.

When a bridge receives a subtree report, step 902, it determines if it has received subtree reports from all of its children in the POST. If so, the bridge proceeds to step 906.

Once a bridge has received subtree reports from all of its children, it merges these reports with a description of its own connections from its subtree report, via step 906. In step 908, the bridge checks if it is the root of the POST. If it is not the root, the bridge sends its subtree report to its parent, via step 910. If the bridge is the root, its "subtree report" is in fact the total network report (step 912). In this case, the root bridge calls the start distribution subroutine in the distribution function (504c).

It is noted that the flowchart shown in FIG. 9 omits certain details to simplify the illustration. For example, to guarantee reliable transmission, sending a subtree report requires an acknowledgement and retransmission protocol similar to that shown in steps 750, 752, 754, and 756 of FIG. 7. As a second example, to keep competing instances separate, a bridge labels a subtree report which it sends with its current instance identifier and ignores any received subtree report except one that belongs to its current instance. As a third example, to guarantee that a bridge is familiar with all of its children, the bridge also checks that the start collection subroutine has been called in its current instance, via step 904.

A difficulty arises if the subtree report grows too large to be sent in one packet. One way that this difficulty can be handled is by sending the subtree report as a sequence of packets, where each packet contains its sequence number and an indication of whether it is the last.

When merging the subtree reports from its children, it may be discovered that the same bridge, say Z, appears in the subtree reports of more than one child. The following example illustrates how this unlikely situation can arise.

Suppose that bridge Z is a neighbor of bridge A, bridge A is a neighbor of bridge B, bridge B is a neighbor of bridge C. Suppose also that the current epoch number everywhere is 10, and all topology acquisition activities with respect to epoch 10 have been completed. Next it is assumed that a new bridge, say D, appears as a neighbor of B and that bridge B initiates as a result a new instance with epoch 11. In this case, bridge B is the root bridge of the new instance. Next let epoch 11 propagate to bridge A and then to bridge Z. Since Z is a leaf, it starts the collection phase and sends its subtree report to A. Bridge A then sends its subtree report to B. Next suppose that bridge Z crashes and then reappears as a neighbor of bridge C. Of course, bridge A, which is neighbor with bridge Z, notices this and initiates epoch 12. Since bridge Z has crashed, its epoch number has restarted at zero. Bridge C notices its new neighbor bridge Z. At this point, bridge C is still in epoch 10 since epoch 11 which bridge B initiated has not reached bridge C and thus bridge C does not yet know about epoch 11. Accordingly, bridge C initiates an epoch 11 to deal with its new neighbor, Z. At this point, let the epoch 11 from bridge B propagate to C, and suppose that bridge B is the prevailing root bridge. Thus, bridge C joins the epoch 11 from bridge B, which it then propagates to bridge Z. Since Z has crashed and restarted its epoch number at zero, it agrees to join the epoch 11 initiated by bridge B. Since Z is a leaf, it starts the collection phase and sends its subtree report to bridge C. Bridge C then sends its subtree report to bridge B. Bridge B is now in the unusual situation of having subtree reports from A and C, both of which contain bridge Z and epoch 11.

This unusual situation is not stable since, as indicated, epoch 12 which bridge A initiated will kill off epoch 11 of bridge B. In fact, this unusual situation can never be stable since a bridge has to disappear from one place in order to appear in another, and the disappearance will invariably initiate a new epoch. However, in the meanwhile, bridge B needs to perform some rational action in step 906. To that end, preferably, each bridge checks for the situation where one bridge appears in more than one subtree report, via step 906. If this situation is detected, the bridge initiates a new epoch.

When the subtree report arrives at the root bridge of the POST, it constitutes a total network report. At this point no other bridge is familiar with the total network report. To disseminate the total network report, the root bridge invokes the distribution function (504c) by calling the start distribution subroutine.

The Distribution Function

FIG. 10 shows a flowchart of the distribution function (504c). This flowchart also depicts the activity of the bridge in an event-driven fashion.

The distribution function (504c) starts in the root bridge of the POST at step 1000. The root bridge is the prevailing bridge among the initiator bridges. In step 1004 the bridge sends a copy of the total network report to each of its children bridges. A bridge that receives the total network report, via step 1002, then proceeds to step 1004 to send further copies to all of its children. In this manner, the total network report propagates in the POST from parents to children where, eventually, every bridge in the network becomes familiar with the total network report. A bridge completes its topology acquisition function (504) operation after it sends the total network report to each of its children bridges (step 1004). The bridge then calls the communications initialization function (506), via step 1006.

It is noted that, to simplify the illustration, the flowchart shown in FIG. 10 omits certain details. For example, to guarantee reliable transmission, sending a total network report requires an acknowledgement and retransmission protocol similar to that shown in steps 750, 752, 754, and 756 of FIG. 7. As a second example, to keep competing instances separate, a bridge sends the total network report labeled with its current instance identifier. Moreover, the bridge ignores any received total network report except one that belongs to its current instance. As a third example, to prevent redundant operations, the bridge takes care to perform step 1004 at most once per topology acquisition instance, in spite of retransmitted reports.

A difficulty may arise if the total network report grows too large to be sent in one packet. One way this can be handled is by sending the subtree report as a sequence of packets, where each packet contains its sequence number and an indication of whether it is the last.

FIG. 11 illustrates a total network report 1100 produced by operation of the topology acquisition function (504), taking for example the network of FIG. 1. Each row 1100-1 through 1100-11 in the total network report 1100 includes the two parts of a connection identifier describing a respective bridge-to-segment connection in the network (100, FIG. 1). It may be recalled that the connection identifier is a concatenation of the bridge identifier and segment identifier for describing the bridge-to-segment connection. Column 1100a contains the respective bridge identifier for each connection, and column 1100b contains the respective segment identifier for each connection. To simplify the illustration, in place of bridge and segment identifiers FIG. 11 shows the reference labels of the bridges and segments from FIG. 1. Furthermore, although the total network report may list connections in any order, the distribution function (504c) provides each bridge with an identical copy of the total network report 1100 so that each bridge becomes equally familiar with the connections as ordered in the listing.

Next, the communications initialization function (506) begins. The communications initialization sets the necessary parameters for orderly, and successful communications, as hereafter described.

The Communications Initialization Function

FIG. 12 shows a flowchart of the communications initialization function (506). The bridge starts this process at step 1200. In performing the communication initialization the bridge first invokes a create graph function (506a), via step 1202. In step 1204, the bridge next invokes a global assignments function (506b). In step 1206, the bridge further invokes a routing function (506c). Finally, in step 1208, the bridge calls the start/resume operation subroutine in the communications operation function (508). The start/resume operation subroutine starts/resumes the communications operation of the respective bridge.

The Create Graph Function

The create graph function (506a) converts the total network report into a more suitable data structure called a network topology graph. The conversion is preferably deterministic so that identical copies of the total network report result in identical copies of the network topology graph. Whereas the total network report is a more suitable data structure for the topology acquisition function (504), the network topology graph is a more suitable data structure for the communications initialization function (506). Although different in format, the total network report and the network topology graph are equivalent in the sense that they each contain the same information about the bridges, segments, and bridge-to-segment connections in the network. The preferred format of the network topology graph is described below.

FIG. 13 is a network topology graph of the network 100 of FIG. 1 showing a graphical representation of the bridges, segments, and bridge-to-segment connections in this network. Nodes in the graph represent bridges (shown as circles 1302) and segments (shown as squares 1304). Edges in the graph represent bridge-to-segment connections (shown as lines 1306). The bridges 116a–d and segments 112a–g in the graph 1300 have the same respective designation numbers as in FIG. 1.

FIG. 14 illustrates a node data structure used to represent nodes in the network topology graph. It is noted that the node data structure may vary without departing from the scope and spirit of the invention. The following describes an example of the node data structure.

The node data structure 1400 representing a node, N, contains several fields. A type field 1410 indicates whether node N represents a bridge or a segment. In the case of a bridge node, the id field 1411 contains the bridge identifier; in the case of a segment node, the id field 1411 contains the segment identifier. The adjlist field 1412 contains a list of nodes that are adjacent to node N. It may be recalled that two nodes are adjacent if and only if there is an edge that connects them. One approach to implementing the list of nodes in the adjlist uses a linked list of consecutive bridge or segment identifiers representing the nodes adjacent to N.

The type field 1410, id field 1411, and adjlist field 1412 of a node 1400 are initialized to by the create graph function (506a). The create graph function (506a) arranges the nodes in the adjlist field 1412 into a, preferably, deterministic order based on the total network report. The remaining fields are used during subsequent operations of the communications initialization function (506).

As an alternative implementation, the communications initialization function (506) uses the total network report directly without first converting it into a network topology graph (via the create graph function (506a)). In accordance with this alternative, the create graph function (506a), step 1202, is omitted. It is noted that this alternative is not as efficient as the preferred implementation. For example, it is less efficient to enumerate all bridges that are connected to a given segment, or all the segments that are connected to a given bridge.

FIG. 15 illustrates a network topology graph data structure assuming the network 100 of FIG. 1. For each node, only fields that are based on the result of the topology acquisition function (504) are shown. In place of the bridge and segment identifiers, FIG. 15 shows bridge and segment designation numbers as in FIG. 13. As shown, the node data structure 1501, which represents bridge 116a in the network topology graph data structure, has in its adjlist field a connection to node data structure 1505. Node data structure 1505 represents segment 112a. Referring back to FIG. 13, it is observed that bridge 116a and segment 112a are indeed connected with an edge in the graph.

The Global Assignments Function

FIG. 16 shows a flowchart of the global assignments function (506b). The bridge performs this function starting at step 1600. In step 1602 the global assignments function (506b) assigns a unique index number to each of the segments. In step 1604 a unique index number is assigned to each of the bridges. The global assignments function (506b) ends at step 1606.

In accessing reaching, forwarding and sourcing tables, the index number assigned to a segment is used as a table index. That is, the index number of a given segment indicates where in the table the segment information maybe found. As an alternative, the reaching, forwarding and sourcing tables can be accessed by searching for an entry matching a given segment identifier. This approach is less efficient than simply accessing by segment index number. As yet another alternative, the entry in these tables for each segment can be incorporated into the node data structure for the segment.

In the following discussion, accesses to the reaching, forwarding, and sourcing tables is explained assuming that the segment index numbers are used for accessing segment information.

An additional purpose of the segment index numbers is to provide an efficient means for bridges to refer to a particular segment in revision request and revision wavefront packets. Alternatively, the segment identifier can be used, although this approach may be less efficient as it requires the receiving bridge to search through the segment information to find the one referred to.

For the purpose of this discussion, packets containing references to segments show these references as if the segment index number is itself supplied. Since the assignment of segment index numbers is preferably deterministic based on the total network report, of which each bridge has an identical copy, each bridge has the same segment index numbers assignment.

Preferably, the segment index numbers start at zero and count up from there, and then the bridge index numbers continue the count. Index numbers are assigned by traversing over all segments in the topology graph and assigning to each of them a segment index number, and then traversing over all bridges in the topology graph and assigning to each of them a bridge index number. The nodenum field 1420 (FIG. 14) is used to hold the index number.

As an alternative, index numbers can be assigned to nodes during the create graph function (506a) as it constructs nodes while processing bridge-to-segment connections from the total network report. In this case, it is important that the assignment be deterministic so that each bridge produces the same assignment given the same total network report.

FIGS. 17a–d together show a flowchart of the routing function (506c). A bridge performing the routing function (506c) starts at step 1700. In step 1702, the bridge invokes the location revision routing function (506c.1). Then in step 1704, the bridge invokes a network flood routing function (506c.2). In step 1706, the bridge invokes a best path routing function (506c.3). The sequence of these operations may vary without departing from the scope and spirit of the invention. The routing function (506c) ends via step 1708.

The bridge begins performing the location revision routing function (506c.1) at step 1720. First a location revision spanning tree (LRST) is chosen in step 1722. Based on this tree, the bridge determines its location revision grandparent (LRG) (step 1724) and its location revision child (LRC) table (step 1726). The sequence of these operations may vary without departing from the scope and spirit of the invention. The location revision routing function (506c.1) ends via step 1728.

The bridge begins performing the network flood routing function (506c.2) at step 1740. First a network flood spanning tree (NFST) is chosen in step 1742. Based on the NFST, the bridge determines its network flood active ports (NFA) table (step 1744) and its network flood reaching (NFR) table (step 1746). The sequence of these operations may vary without departing from the scope and spirit of the invention. The network flood routing function (506c.2) ends in step 1748.

The bridge begins performing the best path routing function (506c.3) at step 1760. The bridge next determines its best path forwarding (BPF) table (step 1762) and its best path sourcing (BPS) table (step 1764). The sequence of these operations may vary without departing from the scope and spirit of the invention. The best path routing function (506c.3) ends via step 1766.

Each step of the above-mentioned routing functions involves additional steps. A more detailed explanation of these functions is provided after a description of the breadth-first search function (512).

The Breadth-First Search Function

The location revision routing function (506c.1) and the network flood routing function (506c.2) each requires the choice of a spanning tree over the network topology graph. Although there are many ways of choosing a spanning tree over a graph, a breadth-first search function (512) is preferably used. The best path routing function (506c.3) also uses the breadth-first search function (512).

A breadth-first search technique produces a spanning tree in which the path from each node to the root is as short as possible. The resulting spanning tree is referred to as a minimum-depth spanning tree. The paths between nodes in a minimum-depth spanning tree tend on average to be shorter than similar paths in an arbitrary spanning tree. Generally speaking, shorter paths are better. Since in addition to producing spanning trees that tend to be better, breadth-first search is also efficient, it is a preferred technique. The breadth-first search technique is employed in the present invention to make use of its advantages in ways not previously explored.

FIG. 18 shows a flowchart of the breadth-first search function (512). The breadth-first search function (512) starts traversing the network topology graph with a given root node, R, and proceeds to "visit" each node in the network topology graph in the order of increasing distance from the root, R. It may be recalled that the distance between two nodes in a graph is the length of the shortest path between the two nodes. A node's distance from the root, R, is called the node's depth. The root, R, is the only depth 0 node.

For each depth n node, C, where n>0, the breadth-first search function (512) selects a depth n−1 node, P, as the parent of node C. Each depth n−1 node adjacent to node C is a "parent candidate". Since there might be several parent candidates, the breadth-first search function (512) employs a tie-breaker rule to determine which parent candidate is most preferred as the parent of node C. The tie-breaker rule is implemented in the breadth-first search function (512) as a prefer subroutine, which determines if one parent candidate is to be preferred over another.

It may be recalled that the breadth-first search function (512) visits each node in the order of increasing depth. When the breadth-first search function (512) visits nodes of depth d, the parents of all nodes of depth d and below are known, after applying the tie-breaker rule. However, no node of depth d has yet been considered as a parent candidate for any node of depth d+1. The visit subroutine is called by the breadth-first search function (512) when a node is visited.

The breadth-first search function (512) places results of its operations into two fields of the node N data structure in the network topology graph structure (1400, FIG. 14). The two fields are: the depth field 1430 (written as N.depth, or simply depth) and the parent field 1431 (written as N.parent, or simply parent). N.depth contains the depth of node N. N.parent contains a reference to the parent of node N, or "nil" if node N is the root. The breadth-first search function (512) calls the visit subroutine with node N as a parameter to produce final result values for the two fields.

During its operation, the breadth-first search function (512) uses two lists, NEXTLIST and WORKLIST, and a set, DISCOVERSET, to manage the order in which nodes are visited. Nodes are added to NEXTLIST, the contents of NEXTLIST is then transferred to WORKLIST. Nodes are removed from WORKLIST in a deterministic manner. NEXTLIST is used to remember nodes (at depth d) that have been discovered but not yet visited. Preferably, NEXTLIST and WORKLIST are implemented as stacks threaded through a dedicated field (not shown in FIG. 13) in the node data structure. Alternatively, NEXTLIST and WORKLIST can be implemented as queues or in fact as a single queue. Moreover, the implementation of stacks or queues can use an auxiliary array and index pointers. Other variations are also possible without departing from the scope and spirit of the invention.

Nodes are added to DISCOVERSET and checked for membership in DISCOVERSET. Preferably, DISCOVERSET is implemented by initializing the depth field 1430 in each node data structure to the impossible depth value of −1. When a node, N, is discovered, N.depth is set to a non-negative value which signifies also that node N is included in DISCOVERSET. Alternatively, DISCOVERSET can be implemented using a dedicated field (not shown in FIG. 13) in the node data structure. Other implementation variations are also possible.

Performance of the breadth-first search function (512) starts at step 1800. In step 1802, the breadth-first search function (512) sets the depth and parent fields of the root node, R, initializes NEXTLIST to contain R, and initializes DISCOVERSET to contain R. Since R is the root, its depth is 0 and its parent is "nil".

When the breadth-first search function (512) first reaches step 1804, NEXTLIST is a list of all the depth 0 nodes in the network topology graph; on the second iteration NEXTLIST is a list of all the depth 1 nodes; and so on. In step 1804 the function checks if NEXTLIST is empty. If so, the function proceeds to step 1806, where it ends. If not, the function proceeds to step 1808, where it sets the WORKLIST to NEXTLIST and then sets the NEXTLIST to empty.

At this point, WORKLIST is a list of all the depth d nodes in the graph, where d depends on the iteration. In step 1810, the function calls the visit subroutine for each of these nodes in WORKLIST. Namely, the visit subroutine is performed repeatedly, once for each node. The visit subroutine calling loop ends after the last node in the WORKLIST is visited.

Step 1812 consists of another loop through the WORKLIST. For each node, N, in the WORKLIST, the function performs step 1814. Step 1814 is itself a loop through the nodes adjacent to node N. For each node, C, adjacent to node N, the step 1814 loop body starts at step 1820.

In step 1822, the function checks if node C is a member of DISCOVERSET. If not, this is the first time node C has been discovered. Accordingly, the function proceeds to step 1824, where it sets the depth of node C to one greater than the depth of node N, adds node C to NEXTLIST so that node C will be visited later, and adds node C as a member to DISCOVERSET to indicate that node C has been discovered. It may be recalled that membership in DISCOVERSET is preferably indicated by a non-negative depth so that no explicit steps related to adding node C to DISCOVERSET are required. Next, the function proceeds to step 1830 to record node N as the current best parent candidate for node C.

On the other hand, if in step 1822 it is determined that node C has been discovered before, the function proceeds to step 1826. Since node C is adjacent to node N, the depth of node C is either one less than, equal to, or one greater than the depth of node N. Node N is a parent candidate for node C when the depth of node C is one greater than the depth of node N (step 1826). If node N is a parent candidate for node C, the breadth-first search function (512) calls step 1828 the prefer subroutine to apply the given tie-breaker rule and determine if node N is preferable to the current best parent candidate for node C. If so, in step 1830 the function records node N as the current best parent candidate for node C. The function ends its operations with reference to node C, via step 1820, after one of the following: completing step 1830, if node N is not a parent candidate for node C, and if node N is not preferred over the current best parent candidate for node C. If there are additional nodes, C, adjacent to node N, the function resumes at step 1820 to consider another node C.

Once all nodes adjacent to node N have been explored, step 1814 is complete. Once all nodes on the WORKLIST have been processed, step 1812 is complete. As noted before in each iteration; NEXTLIST is a list of all d depth nodes in the network topology graph. The function then proceeds to step 1804 to check if the NEXTLIST contains any nodes of the next higher depth. If not, the breadth-first search function (512) ends at step 1806. It is noted that the breadth-first search technique may be implemented in another way (e.g., different loop organization) without departing from the scope and spirit of the invention. FIG. 19 illustrates a spanning tree constructed by breadth-first search function (512) in accordance with an embodiment of the invention as explained above. Assuming that the bridge is familiar with the total network report (1106, FIG. 11) for network 100 (FIG. 1), the breadth-first search function (512) proceeds as hereafter outlined. It may be recalled that a graphical representation of the bridges, segments, and connections of network 100 is illustrated in FIG. 13 and that the create graph function (504a) produces a network topology graph data structure such as the network topology graph 1500 of FIG. 15.

Assuming that bridge 116b is the designated root node, the breadth-first search function (512) assigns it a 0 depth and visits it first. As shown, segments 112b and 112g are adjacent to bridge 116b. The breadth-first search function (512) assigns a depth 1 to segments 112b and 112g and visits them next. Next, the breadth-first search function (512) assigns a depth 2 to bridges 116a, 116d, and 116c and visits them. The breadthfirst search function (512) proceeds to assign a depth 3 to segments 112e, 112f, 112c, 112a, and 112d.

It is noted that segment 112a has two parent candidates, bridge 116a and bridge 116d. The breadth-first search function (512) invokes the prefer subroutine to decide between the two candidates based on a tie-breaker rule. Assuming that the prefer subroutine elects bridge 116d as the preferred parent candidate, the breadth-first function (512) assigns bridge 116d as the parent for segment 112a. The connection 1901 between segment 112a and its unelected parent candidate, 116a, is not part of the spanning tree.

It may be recalled that in a spanning tree there is exactly one path between any pair of nodes since no redundant connections are allowed. Furthermore, the breadth-first search produces a minimum-depth spanning tree in which the path from each node to the root is as short as possible. As shown, these properties apply to the example in FIG. 19. Although the example in FIG. 19 shows a breadth-first search function (512) which starts with a bridge as the root node, the function can be likewise used starting with a segment as the root node.

It may be recalled that the steps (as described in FIG. 17) of the location revision routing function (506c.1), the network flood routing function (506c.2), and the best path routing function (506c.3) involve using the breadth-first search function (512). These function steps are explained in more detail below.

The Routing Function

The routing function (506c) includes three functions: the location revision routing function (506c.1), the network flood routing function (506c.2), and the best path routing function (506c.3). Each of these functions is described separately.

The Location Revision Routing Function

FIG. 20 shows a flowchart of the steps that a bridge uses to choose a location revision spanning tree (LRST; step 1722, FIG. 17). This flowchart is not to be construed as an invariable way for choosing an LRST since other implementations are possible including using an alternative to the breadth-first search function (512). The process of choosing the LRST starts at step 2000.

In step 2002, the location revision routing function (506c.1) picks a root bridge (referred to as "R") for the LRST. Preferably, the choice of root bridge is deterministic based on the total network report where each bridge chooses the same root. Namely, each bridge in the network performs separately the routing function (506c) based on identical copies of the total network report such that each bridge chooses the same root. Preferably, the bridge with the lowest bridge identifier is chosen as the LRST root bridge.

In step 2004 the location revision routing function (506c.1) invokes the breadth-first search function (512), passing to it the identity of the chosen root bridge, R, and two subroutines, visit and prefer. The visit subroutine, starting at step 2010, specifies additional steps, if any, to be performed when the breadth-first search function (512) visits a node. In the case of choosing the LRST, no additional steps are needed, so the visit subroutine ends immediately, in step 2012. The prefer subroutine, starting at step 2020, specifies the tie-breaker rule needed during breadth-first search to determine which of the parent candidates, P0 and P1, of a node should be designated as the parent of the node. In the case of choosing (i.e., constructing) the LRST, any deterministic selection can be used. Preferably, the prefer subroutine always says "no" in step 2022. This tie-breaker rule is one that prefers the first parent candidate to be discovered. Other tie-breaker rules may prefer a parent candidate whose bridge identifier is lowest. Since each bridge chooses the LRST based on identical copies of the total network report, the order of operations in each bridge will be identical and thus each bridge will choose the same LRST.

The location revision routing function (506c.1) ends at step 2006. At this point, the chosen LRST is represented in the node data structure of the network topology graph. The depth field 1430 of node N (written as N.depth or simply depth) contains the distance of node N from the root R. The parent field 1431 of node N (written as N.parent or simply parent) contains a reference to the parent node of node N, or "nil" if node N is the root R which has no parent.

Once the LRST has been chosen, the bridge determines its location revision grandparent (step 1724, FIG. 17) and its location revision child table (step 1726, FIG. 17). The sequence of these steps may change without departing from the scope and spirit of the invention.

Assuming that node B represents the bridge itself in the network topology graph, FIG. 21 shows a flowchart of the steps that a bridge uses to determine its location revision grandparent (LRG; starting at step 2100). If bridge B is the LRST root, as checked in step 2102, its LRG is "nil" (step 2108). Otherwise, bridge B has a segment S as its parent, and segment S has a bridge P as its parent (step 2104). Bridge P will not be "nil" because the LRST root is chosen to be a bridge and hence each segment has a bridge as a parent. Accordingly, bridge P is the LRG of bridge B (step 2106). In either case the LRG selection, ends at step 2110.

Assuming that node B represents the bridge itself in the network topology graph, FIG. 22 shows a flowchart of the steps that a bridge uses to determine its location revision child (LRC) table, starting at step 2200. The LRC table contains one entry for each segment, T, adjacent to bridge B. Each entry contains either TRUE or FALSE, depending on whether or not segment T is a child of bridge B in the LRST.

To simplify the explanation, the LRC table is described as being accessed by a segment T adjacent to bridge B. Alternatively, since each such segment T corresponds to exactly one port PT that connects B to T, the LRC table can be accessed by a port PT of bridge B. Preferably, the LRC table is accessed by a port PT of bridge B.

In step 2202 the location revision child table selection loops through the nodes adjacent to bridge B. That is, the process is reiterated for each node adjacent to node B. Since B is a bridge, each of the nodes adjacent to it is a segment. For each segment, S, adjacent to B, the loop body starts at step 2210. If B is the parent of S, as checked in step 2212, then the process proceeds to step 2214, where it sets an LRC[S] table entry to TRUE. Otherwise it proceeds to step 2216, where it sets LRC[S] to FALSE. In either case, the loop body is complete at step 2218. If there are more nodes adjacent to B to consider, the loop body return to step 2210 to start considering the next node. When the loop in step 2202 is complete, the process of setting the LRC table ends at step 2204. At this point, the location revision routing function (506c.1) is completed.

Next is the network flood routing function (506c.2). The following discussion explains in more detail the steps in the network flood routing function (506c.2).

The Network Flood Routing Function

The process of choosing the network flood spanning tree (NFST; step 1742, FIG. 17) may be similar to the process of choosing the LRST as described above, except that the root node and tie-breaker rule may be different. Hence, the process need not be separately described. Alternatively, the network flood spanning tree (NFST) may be precisely the same as the LRST, in which case it need not be separately chosen. Preferably, the NFST is the same as the LRST and step 1742 is omitted.

Once the NFST is chosen, the bridge determines its network flood active connection (NFA) table (step 1744, FIG. 17) and its network flood reaching (NFR) table (step 1746, FIG. 17). The sequence of these actions may vary without departing from the scope and spirit of the invention.

Assuming that node B represents the bridge itself in the network topology graph, FIG. 23 shows a flowchart of the steps that the bridge uses to determine its NFA table. The NFA table contains one entry for each segment, T, adjacent to bridge B. Each entry contains either TRUE or FALSE, depending on whether or not the connection between bridge B and segment T is in the network flood spanning tree (NFST). It may be recalled that a connection in the NFST is called an active connection.

To simplify the explanation, the NFA table is described as being accessed by a segment T adjacent to bridge B. Alternatively, since each such segment T corresponds to exactly one port, PT, that connects B to T, the NFA table can be accessed by a port PT of bridge B. Preferably, the NFA table is accessed by a port PT of bridge B.

Determining the NFA table starts at step 2300. In step 2302, the process determining the NFA table loops through the nodes adjacent to bridge B. Namely, the process repeats for each node adjacent to B until all nodes have been traversed. Since B is a bridge, each of the nodes adjacent to it is a segment. For each segment S in B.adjlist, i.e., adjacent to bridge B, the loop body starts at step 2310. If either bridge B or segment S is the parent of the other, as checked in steps 2312 and 2314, the connection between bridge B and segment S is part of the NFST, and the process proceeds to step 2316, where it sets the NFA entry for segment S to TRUE. Otherwise, the connection between bridge B and segment S is not part of the NFST and the process proceeds to step 2318, where it sets the NFA entry for segment S to FALSE.

In either case, the loop body ends at step 2320. If there are more segments adjacent to B to consider (in B.adjlist), the loop body resumes at step 2310 to consider another segment. When the loop in step 2302 ends, the process ends at step 2304.

Assuming that node B represents the bridge itself in the network topology graph, FIG. 24 shows a flowchart of the steps that the bridge uses to determine its network flood reaching (NFR) table. The NFR table contains an entry for each segment S in the network. Entry NFR[S] contains a reference to a segment T adjacent to bridge B, where the path in the NFST from segment S to bridge B passes through segment T. It is noted that a network flood packet that originates on segment S and travels correctly according to the NFST must reach bridge B via segment T.

To simplify the explanation, the NFR table is described as being accessed using an originating segment, S. Preferably, the NFR table is accessed using segment index number. It may be recalled that the segment index number for segment S can be found in the nodenum field (1420, FIG. 14) of the node data structure for segment S.

To simplify the explanation, the NFR table is described as containing references to segments T adjacent to bridge B (which are in B.adjlist). Alternatively, since each such segment T corresponds to exactly one port PT that connects bridge B to segment T, the NFR table can be described as containing references to ports PT of bridge B. Preferably, the NFR table contains references to the ports of bridge B.

The determination of the NFR table takes the form of a walk over the NFST starting with bridge B. When the walk over the NFST is finished, the via field (1440, FIG. 14) of each segment S contains the segment T adjacent to bridge B which defines the path from bridge B to segment S in the NFST. Since a spanning tree contains exactly one path between any two nodes, segment T is the same for the path from segment S to bridge B. The path from bridge B to segment S and vice-a-versa goes through segment T.

During creation of the NFR table, sets of NEXTSET and DISCOVERSET are used to manage the traversal of nodes. Nodes can be added to and removed from NEXTSET in one of several ways. For example, NEXTSET may be implemented as a stack (actually a re-use of the breadth-first search function (512) stack WORKLIST) by threading through a dedicated field (not shown in FIG. 14) in the node data structure. Alternatively, NEXTSET can be implemented, for example, as a queue, either by threading through the nodes data structure or with a separate data structure. Preferably, NEXTSET is a stack.

Nodes are added to DISCOVERSET and checked for inclusion in DISCOVERSET. In one embodiment, DISCOVERSET is implemented by initializing the via field 1440 (FIG. 14) in each node data structure to an impossible value. When a node N is discovered, N.via is set to a value which also indicates that node N is included in DISCOVERSET. Alternatively, DISCOVERSET can be implemented using a dedicated field (not shown in FIG. 14) in the node data structure. Other variations of the foregoing configurations are possible without departing from the scope and spirit of the invention.

The bridge starts the NFR table creation process at step 2400. In step 2402 the process sets B.via to "nil", initializes NEXTSET to contain just the node B, and initializes DISCOVERSET to contain just the node B. NEXTSET is used to remember nodes that have been discovered but not yet visited.

In step 2404 the process checks if NEXTSET is empty. If not, the process proceeds to visit the node(s). In step 2406, a node, N, is removed from NEXTSET.

In visiting node N, nodes adjacent to N (listed in N.adjlist) are traversed, one at a time. Step 2408, consists of a loop through the nodes adjacent to N. For each node C adjacent to N, the loop body starts at step 2420. If either node N or node C is the parent of the other in the NFST, the connection between node N and node C is part of the NFST. The process makes this parent-child determination in steps 2422 and 2424, and if the connection between node N and node C is part of the NFST, the process proceeds to step 2426. If node C has already been discovered during the walk-through over the NFST, then node C is of no further interest. This check keeps the walk-through going forward through the NFST and prevents it from returning back on itself A node C that has already been discovered is identified by determining if node C is included in DISCOVERSET. This determination is performed in step 2426. If node C has not previously been discovered, in step 2428, the process adds node C to NEXTSET and to DISCOVERSET. The process then decides what value to assign to C.via. In step 2430, the process checks if node N is the same as node B, which represents the bridge itself If so, then node C must be a segment adjacent to bridge B. Accordingly, in step 2432 C.via is set to node C. Otherwise, in step 2434 the process sets C.via to N.via, inheriting the same segment, T, that is used to reach node N. In either case, or if node C had already been discovered, or if the connection between nodes N and C is not part of the NFST, in step 2436 the loop body ends. If further nodes adjacent to N remain to be considered, the loop body starts again at step 2420 to consider another node.

When the loop, step 2408, is complete, in step 2404 the process checks if all discovered nodes have been visited. If so, in step 2410, for each segment S, the entry NFR[S] is set to the value of S.via. The process of creating the network flood reaching table ends at step 2412.

FIG. 25 shows an example of NFA and NFR tables created according to an embodiment of the present invention for a bridge (116a) in network 100 of FIG. 1. This example as illustrated in FIG. 19 is chosen as the network flood spanning tree.

The illustrated NFA table 2510, contains an entry for each segment T adjacent to bridge 116a. Each entry indicates whether or not the connection between bridge 116a and segment T is part of the NFST. As shown in FIG. 19, the connections between bridge 116a and segments 112b, 112c, and 112f are part of the NFST, and the connection between bridge 116a and segment 112a is not. Accordingly, the entries in the NFA table 2410 for segments 112b, 112c, and 112f are TRUE and the entry for segment 112a is FALSE.

The illustrated NFR table 2520, contains an entry for each segment S in the network. FIG. 25 shows the entries accessed by segment reference numbers 116a–g but in the preferred approach the access would be by segment index number. It may be recalled that the segment index number for a segment S can be found in S.nodenum (FIG. 14). The entry for segment S in the NFR table 2520 contains a reference to the segment T adjacent to bridge B through which the path in the NFST from node S to bridge B reaches bridge B. For example, as shown in FIG. 19, segment 112c reaches bridge 116a through segment 112c, segment 112f reaches bridge 116a through segment 112f, and all other segments reach bridge 116a through segment 112b. The entries in the NFR table 2520 are set accordingly. It is noted that since segment 112a in FIG. 19 is not connected to bridge 116a in the NFST, it does not appear in any entry in the NFR table 2520.

The NFST is a spanning tree, that is, it covers all nodes in the network and has no loops. Accordingly, each segment reaches a given bridge B through exactly one of the segments T adjacent to bridge B.

This completes the explanation of the network flood routing function (506c.2). Before discussing the best path routing function (506c.3), it is helpful to first understand some routing principles that are fundamental to the invention. The best path routing function (506c.3) is used to determine paths with certain properties based on these principles, as hereafter shown. Then, it is particularly helpful to understand the properties of unique, best shortest paths routing that are advantageously achieved by the invention.

Unique, Best Shortest Paths And The Best Path Routing Function

It may be recalled that a path, P, of length L is a path through a sequence of L+1 nodes, $P=(N_0, N_1, \ldots, N_L)$, where for each i in the range $0 \leq i \leq L$, nodes $N_i$ and $N_{i+1}$ are adjacent. That is, the network topology graph contains an edge $E_{i+1}$ that connects nodes $N_i$ and $N_{i+1}$. The path P can also be represented by the sequence of L edges, $(E_1, E_2, \ldots, E_L)$. The path P is said to be a path from node $N_0$ to node $N_L$.

Given any nodes, A and B, and any path, P, from A to B, a path that is the reverse of P can be constructed by reversing the order of the nodes in the sequence. The reverse of P is a path from node B to A.

Given any nodes A, B, and C, any path PAC from nodes A to C, and any path QCB from nodes C to B, paths PAC and QCB can be concatenated, and written as PAC+QCB, producing a path from node A to node B.

Given any nodes A and B and any path P from node A to node B, the length of P, written as L(P), is the number of edges in path P. Of all the paths from A to B, those that have the smallest length are considered the shortest paths. It is noted that no node appears more than once on any given shortest path. The length of a shortest path from node A to node B is called the distance from node A to node B. Since paths can be reversed, the distance from A to B is the same as the distance from B to A.

It may be noted that given any nodes A and B, there may be several shortest paths from A to B. The present invention provides a tie-breaker rule that selects one of these shortest paths as the "best" path from A to B. The best path is selected to satisfy the five best path properties: shortest, unique, suffix, prefix and symmetry. By definition, the set of best paths is a subset of all the paths such that for any nodes A and B, the following five properties hold:

(1) each best path from node A to node B is a shortest path from A to B (i.e., "shortest");

(2) there is exactly one best path from node A to node B (i.e., "unique");

(3) if node C is on a best path, P, from node A to node B, then the best path from node C to node B is the part of P from node C to B (i.e., "suffix");

(4) if node C is on a best path, P, from A to B, then the best path from node A to C is the part of P from node A to C (i.e., "prefix"); and (5) the reverse of a best path is a best path (i.e., "symmetry").

Given the "symmetry" property, the "prefix" property can be derived from the "suffix" property and vice versa.

In accordance with an embodiment the invention, a packet originating on segment S and destined to segment D travels along the unique best path from segment S to segment D. Due to the "shortest" property, this path is a shortest path. Due to the "suffix" property, each bridge can forward the packet based on the best path from the packet's current position to its destination, D, without having to consider the packet's origin segment S. That is, suppose that a bridge B hears the packet on segment T (through a bridge B port that is connected to segment T). Assuming also that the packet is traveling on the best path from its origin segment S to its destination segment D. It follows that T is on the best path from segment S to segment D. Suppose that bridge B examines the set of best paths and determines that the best path from segment T to segment D is T, B, U, D. This tells bridge B to forward the packet from segment T to segment U. From the "suffix" property, it follows that the best path from S to D is S, . . . , T, B, U, . . . , D, and, in fact, the bridge's forwarding decision correctly results in forwarding the packet along the unique best path from S to D.

The "prefix" property is used to detect packets that originate on a segment other than the packet's presumed originating segment S, without having to consider the packet's destination segment D. The "prefix" property is used to detect a host that has changed its segment location. Suppose that the packet appears on a segment U different from segment S. Assuming that the packet is traveling on the best path from its presumed origin segment S to its destination segment D, it follows that U is on the best path from S to D. Suppose that the best path from S to U is S, . . . , T, B, U. From the "prefix" property it follows that the best path from S to D is (S, . . . , T, B, U, . . . , D). That is, the packet appears on segment U because bridge B forwarded it from segment T.

The present invention depends on the fact that a bridge port distinguishes packets that it transmits from packets that other ports transmit on a segment. That is, the bridge distinguishes between packets it hears (through the port) on the segment and packets it forwards (through the port) onto the segment. Thus, if bridge B hears on segment U a packet transmitted from some other port on segment U, the assumption that the packet is traveling on the best path from its presumed origin segment S to its destination segment D is no longer true (considering that the best path from S to D (S, . . . T, B, U, . . . D) goes through bridge B where bridge B expects to forward the packet to U and not receive the packet from U). Since a packet is always forwarded along the best path from its origin to its destination, this means that the presumed origin of the packet is not its actual origin segments. In particular, if the actual origin of the packet is segment U' different from S, the bridge B' on the best path (S, . . . , B', U') will detect it.

For its forwarding decisions, bridge B needs to determine, for each of its adjacent segments T, the best path from segment T to segment D for each destination segment D. Because of the "prefix" property, the set of best paths from segment T takes the form of a spanning tree rooted at segment T.

For its decisions regarding the detection of changed host locations, bridge B needs to determine, for each of its adjacent segments U, the best path from S to U for each originating segment S. Because of the "suffix" property, the set of best paths to U takes the form of a spanning tree rooted at U.

The "symmetry" property allows bridge B to determine the best path from bridge A to B by determining the reverse of the best path from bridge B to A. Therefore bridge B needs to determine only the set of best paths to each of its adjacent segments T. By reversing the paths in this set, the bridge derives the set of best paths from each of its adjacent segments T.

As a result of the "symmetry" property, a packet traveling on the best path from bridge A to B follows exactly the reverse of the best path traveled by a packet from bridge B to A. That is, two hosts, HA and HB, send packets to each other through exactly the same sequence of segments and bridges, except that the sequences are reversed.

In the present invention, the means for choosing a set of best paths involves assigning each edge E a weight, W(E), in a manner that satisfies three edge weight properties as listed below. In the present invention, each edge weight is a rational number slightly greater than 1. Given an assignment of edge weights, the weight of a path, P, written as W(P), is the sum of the weights of the edges on path P. In assigning edge weights for any nodes, A and B, the following three properties apply:

(1) for any path, P, from A to B, $L(P) \leq W(P)$ (i.e., "not less than length");

(2) for any shortest path, P, from A to B, $W(P) < L(P)+1$ (i.e., "limited among shortest"); and (3) for any shortest paths, P and Q, from A to B, $W(P) = W(Q)$ implies $P = Q$ (i.e., "unique among shortest").

Among all paths from A to B, paths of least weight are called least weight paths. Given an assignment of edge weights that satisfies the foregoing three edge weight properties, it can be proven that the set of least weight paths is a set of best paths by showing that the set of least weight paths satisfies the above-mentioned five best path properties.

To prove the "shortest" property, any paths P and Q from A to B are selected, where P is a shortest path but Q is not. If supposedly no such Q exists, then all (rather than some) paths from A to B are shortest. However, where it is assumed that P is a shortest path from A to B and Q is not the shortest path, it follows that $L(P)+1 \leq L(Q)$. From the "limited among shortest" property, it follows that $W(P) < L(P)+1 \leq L(Q)$. From the "not less than length" property, it follows that $W(P) < L(P)+1 \leq L(Q) \leq W(Q)$. That is, any shortest path from A to B has less weight than any not-shortest path from A to B. Therefore the least weight paths from A to B must be found among the shortest paths from A to B.

To prove the "unique" property, it is shown that only one path among the shortest paths has the least weight. Since the network topology graph is connected, there is at least one least weight path from A to B. From the "shortest" property, it follows that any least weight path from A to B is a shortest path. From the "unique among shortest property", it follows that there is exactly one least weight path from A to B.

To prove the "suffix" property, it is shown that for any node C along the unique path from A to B the unique shortest path from C to B is part of the unique shortest path from A to B. Given any least weight path P from A to B and given any node C on P, let PAC be the portion of P from A to C and PCB be the portion of P from C to B. Since a path weight is simply the sum of the weights of its edges, it follows that $W(P) = W(PAC) + W(PCB)$. Suppose that there exists a path QCB from C to B such that $W(QCB) < W(PCB)$ which means that there is a path PAC+QCB from A to B whose weight is less than $W(P)$. However, this result contradicts the fact that P is a least weight path from A to B. Therefore no such path QCB exists and PCB is a least weight path from C to B i.e., PCB is the unique shortest path from C to B.

The "symmetry" property is proved by considering that the weight of a path is simply the sum of the weights of its edges. Therefore a path has the same weight as its reverse.

The "prefix" property follows as a consequence of the "suffix" property and the "symmetry" property. Therefore, for given an assignment of edge weights that satisfies the foregoing three edge weight properties listed above, the set of least weight paths is the set of best paths.

One way to assign edge weights that satisfy the three edge weight properties is based on a total ordering of edges. The total ordering allows two different edges, $E_1$ and $E_2$, to be correlated such that they result in either $E_1$ being less than $E_2$, written as $E_1 < E_2$, or $E_1$ being greater than $E_2$, written as $E_1 > E_2$. Such an ordering can be created in more than one way. The ordering can be derived from the order in which connections are listed in the total network report (FIG. 11). Alternatively, the ordering can be derived by comparing the bridge and segment identifiers that describe connections, or any other deterministic way.

Each edge E can be assigned a rank, written as $r(E)$, according to its position in the total ordering of edges. The edge at the highest position is assigned rank 1, the edge just below the highest position is assigned rank 2, and so on. Each edge E is further assigned a weight $WE(E) = 1 + 2^{-r(E)}$ which, as hereafter demonstrated, satisfies the three edge weight properties listed above.

The "not less than length" property follows from the fact that no edge has a weight less than one. The "limited among shortest" property follows from the facts that no shortest path contains a given edge more than once and each edge has a unique rank that is at least one. Therefore the integer parts of the weights total to $L(P)$ and the fractional parts $2^{-r(E)}$ total to a value less than one.

The "unique among shortest" property is proved as follows. From the fact that no shortest path contains a given edge more than once and each edge has a unique rank that is at least one, it follows that the presence or absence in a shortest path, P, of any given edge, E, can be determined by examining the value of bit $-r(E)$ in the binary representation of the total weight $WE(P)$. That is, the set of edges in a shortest path P is completely determined by the path's total weight $WE(P)$. From the fact that no shortest path $P = N_0, N_1, \ldots, N_{L(P)}$ contains a given node more than once, it follows that each of the initial and final nodes, $N_0$ and $N_{L(P)}$, appears on exactly one edge and each of the intermediate nodes, $N_1, \ldots, N_{L(P)-1}$, appears on exactly two edges. Hence, given the initial node, $N_0$, and the total weight, $WE(P)$, of a shortest path, P, the entire path P can be derived. Therefore, two different shortest paths P and Q from the same node $N_0$ must have different weights $WE(P)$ and $WE(Q)$. Therefore it is demonstrated that an edge weight assignment based on a total ordering of edges satisfies the three edge weight properties and results in the set of least weight paths being a set of best paths.

Another way to assign edge weights that satisfy the three edge weight properties is based on a total ordering of nodes (e.g., see FIG. 27). The total ordering of nodes allows two different nodes, $N_1$, and $N_2$, to be correlated such that they result in either $N_1$ less than $N_2$, written as $N_1 < N_2$, or $N_1$ being greater than $N_2$, written as $N_1 > N_2$. Such an ordering can be derived in any deterministic way, for example, from the order in which nodes first appear in the total network report, or by comparing the nodes' type and id fields.

Each node, N, can be assigned a rank, written as $r(N)$, according to its position in the total ordering of nodes. Let the node at the highest ordering position be assigned rank 1; let the node just below the highest ordering position be assigned rank 2, and so on. Each edge E is assigned a weight $WN(E) = 1 + 2^{-2r(N)} + 2^{-2r(M)}$, where N and M are the two nodes connected by edge E, and the edge weight assignment WN satisfies the three edge weight properties listed above.

The "not less than length" property follows from the fact that no edge has a weight less than one. The "limited among shortest" property is demonstrated by proving that the weight of the shortest path, $WN(E)$, is lower than $L(P)+1$. It is clear that the sum of the integer parts of the weights equals $L(P)$. Since no shortest path contains a given node more than once, it follows that no node appears in the fractional parts more than twice, once for an edge arriving at the node and once for an edge departing from the node. Since each node has a unique rank which is equal to at least one, and the sum of the fractional parts $2^{-r(N)} + 2^{-2r(M)}$ equals a value less than one, the weight $WN(E)$ is less than $L(P)+1$.

The "unique among shortest" property is demonstrated as follows. From the above argument, it follows that the presence or absence in a shortest path P of any given node N can be determined by examining the value of bits $-2r(N)$ and $-2r(N)+1$ in the binary representation of the total weight WN(P). That is, the set of nodes in a shortest path P is determined by the total weight WN(P) of the path. Suppose that path P is $N_0, N_1, \ldots, N_L$. Since P is a shortest path, node $N_i$ has distance i from node $N_0$, for each i in the range $0 \leq i \leq L$. Given the initial node $N_0$ and the total weight WN(P) of a shortest path P, the entire path P can be derived. Therefore, two different shortest paths P and Q from the same node $N_0$ must have different weights WN(P) and WN(Q). Therefore the edge weight assignment based on a total ordering of nodes has been demonstrated to satisfy the three edge weight properties and resulting in the set of least weight paths being a set of best paths.

It may be recalled that the best path routing function (506c.3) preferably uses the breadth-first search function (512) to determine the set of best paths from a given root node R. It may be further recalled that the distance of a node N from the root is called the depth of N. The breadth-first search function (512) visits nodes in order of increasing depth. That is, first all nodes of depth 0 are visited (which is just the root R itself), then all nodes of depth 1 are visited, and so on. Because of the best paths "prefix" property, any prefix of a best path is also a best path. That is, the best path from the root, R, to a depth d+1 node is simply the extension of the best path from the root R to some depth d node. Therefore, given that the best paths from root R to all depth d nodes are known, the best path from root R to a depth d+1 node C can be determined by deciding which of the parent candidates of node C is on the best path from root R to node C. This decision is based on the tie-breaker rule that the best path routing function (506c.3) invokes for the breadth-first search function (512).

It may be recalled that the best path is chosen as the least weight path, according to some suitable edge weighting. Because the least weight path is always a shortest path, only shortest paths need to be considered.

Explicit weight design is one way to implement the tie-breaker rule in the best path routing function (506c.3) by having a field in the node data structure for each node N for containing the weight of the best path from the root R to N. In the explicit weight design, the tie-breaker rule compares two parent candidates by determinining the path weights for each and choosing the smaller. To compute a path weight, the tie-breaker rule adds the weight of the best path from the root to the parent candidate and the weight of the connection from the parent candidate to the child. The tie-breaker rule records in the child what is, thus far, the best path weight. Alternatively, the best path weight can be computed when the node is visited after all parent candidates had been considered. The explicit weight design requires an initialization phase to compute and store connection weights. Alternatively, the initialization phase can compute and store the edge ranks or node ranks upon which the connection weights are based.

The explicit weight design has the advantage that the tie-breaker rule can choose the best parent candidate of the child based only on information stored in the parent candidates and the child. The disadvantage of the explicit weight design is that the weight is a cumbersome value and each node of the graph must contain a weight.

It may be recalled that edge weights described above contain many bits in their fractional parts. For WE, which is based on a total ordering of edges, there are as many bits as the number of edges in the graph. For WN, which is based on a total ordering of nodes, there are as many bits as twice the number of nodes in the graph. It is noted that since only shortest paths are considered for best paths, the integer part of the paths weight is always the same when paths are compared, therefore their integer part can be omitted. However, the number of bits needed to store a path weight is still proportional to the number of edges or nodes in the graph.

Implicit weight design is an alternative to the explicit weight design approach. Implicit weight design is possible since the best paths routing function (506c.3) tie-breaker rule does not actually need to compute path weights—all that is actually needed is to determine what the result would be if the weights of the two paths were compared. To this end, in the "implicit weight" design the tie-breaker rule compares two parent candidates by determining which parent candidate lies on the path of least weight, without actually computing the path weights.

In the case of WE, (total ordering of edges) the implicit weight tie-breaker rule is based on the observation that each bit in the fractional part of the weight of a shortest path can be set only by the presence in the path of one edge. So given two parent candidates P1 and P2 for child C, the implicit weight tie-breaker rule considers the two shortest paths Q1=R. . . . , P1, C and Q2=R, . . . , P2, C and removes all common edges from these paths producing Q1' and Q2'. Q1' and Q2' must both be non-empty since Q1 and Q2 have the same length and P1 differs from P2. The implicit weight tie-breaker rule then determines the highest-position edge E1 in Q1' and the highest-position edge E2 in Q2' according to the total ordering of edges. It may be noted that E1 has the least rank of any edge in Q1' and the same applies to E2' in Q2'. Therefore if E1>E2, then r(E1)<r(F2) for any edge E2 in Q2', and consequently WE(Q1)>WE(Q2). On the other hand if E1<E2, then in an analogous manner WE(Q1)<WE(Q2). It is noted that E1 and E2 must be different since no common edges remain in Q1' and Q2'. In this manner, the weights of two shortest paths from the root R to node C are compared without ever actually computing the weights.

In the case of WN (total ordering of nodes), the implicit weight tie-breaker rule works in an analogous manner: removing all common nodes, determining the highest-position remaining node on each path, and comparing the two highest-position nodes to decide which path has the least weight.

It may be recalled that the set of best paths from a given node R, form a tree rooted at the node R. Therefore the best paths from root node R to parent candidates P1 and P2 must have some initial common sequence from root R to a node A, after which they diverge (i.e., R, . . . A, P1, C, and R, . . . A, P2, C). Node A, which could be root node R itself, is the last common ancestor of P1 and P2 (i.e., R, . . . P1, C, and R, . . . P2, C). Since P1 and P2 have the same depth, their last common ancestor A can be found by examining the parents of P1 and P2, and then the grandparents of P1 and P2, and so on until a common node is found, which will be node A.

In the case of WE, the tie-breaker rule can enumerate the edges in Q1' and Q2' by walking back the paths from C to P1 to P1's ancestors and from C to P2 to P2's ancestors until a common node (or the root R) is encountered. The same design works in the case of WN, except that A and C are common nodes and thus must be ignored. Each of the nodes encountered on the two paths from A to C (through P1 and P2, respectively) must be distinct because, otherwise, one of the paths from the root R to P1 or from the root R to P2 would not be a best path.

The implicit weight tie-breaker rule can compare two edges or nodes directly, based on some property deterministically derived from the total network report. Alternatively, as in the explicit weight design, an initialization phase can determine and store the edge ranks or node ranks upon which the connection weights are based.

It is preferred to use the implicit weight design based on a total ordering of nodes (WN), with the node ranks predetermined. The node ranks can be stored in a field (not shown in FIG. 14) in the node data structure. The nodenum field (1420, FIG. 14) is preferably appropriated to describe the node's rank. Although, as noted before, the global assignments function (506*b*) assigns to each node a unique index number (stored in nodenum) starting with zero, the node's rank can be correlated to the index number.

Having provided the foregoing information regarding best path routing, this information is used, as illustrated in FIG. 26, to facilitate bridge forwarding decisions. FIG. 26 shows a flowchart of the steps that a bridge uses to create its best path forwarding (BPF) table (1762, FIG. 17). The BPF table is a two-dimensional table with entries accessed using as a pointer BPF[T][D]. T is a segment adjacent to B. D is a destination segment. The BPF table contains one entry for each pair of T and D. Each entry contains a reference to a segment U adjacent to B or "nil".

It is noted that if the best path from T to D goes through bridge B, bridge B, which is adjacent to T, must appear immediately after T on the best path. That is, the best path must traverse the nodes in the order of T, B, U, . . . , D, where segment U could be D. If the best path from T to D includes this sequence, the entry BPF[T][D] contains U. This entry indicates that for a packet heard by bridge B on segment T, bridge B forwards the packet onto segment U since U is on the best path to D. Otherwise, if the best path from T to D does not pass through bridge B, the entry BPF[T][D] contains "nil", indicating that bridge B should not forward such a packet.

To simplify the explanation, the BPF table is described as being accessed in the first dimension by a segment T adjacent to bridge B. Preferably, since each such segment T corresponds to exactly one port PT that connects B to T, the BPF table can be accessed in the first dimension by a port PT of bridge B.

The BPF table is described as being accessed in the second dimension by a destination segment D. Preferably, the BPF table is accessed in the second dimension by a segment index number. It may be recalled that the segment index number for segment D can be found in the nodenum field (1420, FIG. 14) of the node data structure for D.

The BPF table is further described as containing references to segments U adjacent to bridge B. Preferably, since each such segment U corresponds to exactly one port PU that connects B to U, the BPF table contains references to ports PU of bridge B.

As shown in FIG. 26, the best path forwarding (BPF) table is created by the bridge, starting at step 2600. In step 2602, all the BPF table entries are initialized to "nil". Namely, for each node T on B.adjlist and for each destination segment D the BPF entry (BPF[T][D] is set to "nil". Step 2604 consists of a loop through the segments adjacent to bridge B.

For each segment T adjacent to bridge B (in B.adjlist), the loop body starts at step 2610. In step 2612 the breadth-first search function (512) is invoked with root T as the point of origin.

It may be recalled that breadth-first search visits nodes in order of increasing depth. When the breadth-first search function (512) visits a node N, it calls the visit subroutine with node N. In the best path routing function (506*c*.3) the purpose of the visit subroutine is to set the via field (1340, FIG. 13) in the node N data structure. The via field indicates which segment U appears after bridge B on the best path from the root T to the bridge or beyond to node N (i.e., segment N).

The visit subroutine starts at step 2630 and reads node N's parent in step 2532. If node N is the root, as checked in step 2634 by testing if N's parent is "nil", then N=T. The best path when N=T is simply T, on which bridge B does not appear. Thus, in step 2636, N.via is set to "nil" to indicate that bridge B is not on the best path from N to T. If N's parent is the bridge B, as checked in step 2638, then the best path is T, B, N. Thus, in step 2640, N.via is set to N. Otherwise, in step 2642 node N inherits the same via as its parent P.via. In any event, the visit subroutine ends at step 2644.

It may be recalled that breadth-first search needs a tie-breaker rule to choose between depth d parent candidates of a depth d+1 child. When the breadth-first search function (512) discovers a second (or third, etc.) parent candidate P1 for a child C, it calls the prefer subroutine to determine if P1 is a better parent candidate for C than the currently best known candidate, P0. In the preferred embodiment of the best path routing function (506*c*.3), the prefer subroutine implements the implicit weight design based on a total ordering of nodes (WN).

The prefer subroutine starts at step 2650, given parent candidates P1 and P0. The child node C is irrelevant to the decision, since it is common to both best path candidates. The subroutine initializes local variables in step 2652. Local variables W1 and W0 are initialized to P1 and P0, respectively. The subroutine uses W1 and W0 to walk up the ancestors of P1 and P0 respectively until their last common ancestor is encountered, as checked in step 2654. Local variables M1 and M0 are each initialized to "nil". The subroutine uses M1 and M0 to collect the highest position node (according to the total ordering) among ancestors of P1 and P0 respectively.

In step 2654, the subroutine checks if W1 and W0 have reached the last common ancestor of P1 and P0. If not, in step 2656 the subroutine updates M1 to the higher positioned of M1 and W1, and M0 is updated to the higher positioned of M0 and W0, according to the total ordering of nodes. The initial value of "nil" indicates less than any node. Preferably, the selection of the node is performed based on node ranks determined by the nodenum fields (1420, FIG. 14). Alternatively, the comparison can be based on the id fields (1411, FIG. 14) of the nodes.

After updating the variables M1 and M0 to include the highest positioned nodes, the subroutine updates W1 and W0 to their respective parents in step 2658, and then proceeds to step 2654 to check if the last common ancestor has been reached (i.e., same respective parents).

When the last common ancestor has been reached, the subroutine proceeds to step 2660 to compare M1 and M0. If M1<M0, (i.e., the node rank in M1 is lower than the node rank in M2) then the best path candidate through P1 weighs less than the best path candidate through P0. Thus, P1 should be preferred to P0. The subroutine proceeds to step 2662 where it returns the decision "Y". Otherwise the subroutine proceeds to step 2664 where it returns the decision "N".

When the breadth-first search loop in step 2612 is complete, the function proceeds to step 2614, where it sets the BPF entries for segment T adjacent to B. For each destination segment D, entry BPF[T][D] is copied from the via field (1440, FIG. 14) of node D.

In step 2616 the loop body ends for segment T. If there are more segments adjacent to bridge B to be considered, the loop body resumes at step 2610 to consider another segment. Creating the BPF table (1762, FIG. 17) ends at step 2606 when all the segments adjacent to bridge B (in B.adjlist) have been examined.

It may be recalled that the best path routing function (506c.3) also includes a step to compute the best path sourcing (BPS) table (1764, FIG. 17). The same alternatives for accessing and contents apply to the BPS table as apply to the BPF table. Like the BPF table, the BPS table is accessed in two dimensions, written as BPS[U][S]. The first access dimension is a segment U adjacent to B. The second access dimension is a source segment S. The BPS table contains one entry for each pair of U and S. Each entry contains either a reference to a segment T adjacent to B or "nil".

It is noted that if the best path from S to U goes through bridge B, bridge B which is adjacent to U, must appear immediately before U on the best path. That is, the best path must have the form S, . . . , T, B, U, where segment T could be S. If the best path from S to U has this form, the entry BPS[U][S] for bridge B contains T. This indicates that it is permissible (in the sense of following a best route) for bridge B to forward from T to U a packet presumably originated from source S. Indeed, any packet presumably originated from S should be on U because bridge B forwarded the packet to segment U. Otherwise, if the best path from S to U does not go through B, the entry BPS[U][S] contains "nil", indicating that bridge B should not forward such a packet (i.e., the packet from S to U is not expected to pass through B).

Because of the best path "symmetry" property, the best path from S to U is the same as the best path from U to S. Therefore, for any segment U adjacent to B and any segment S, the best path sourcing table entry BPS[U][S] is the same as the best path forwarding table entry BPF[U][S]. Therefore the BPS table need not be separately created. Preferably, the entry in the BPF table is used wherever an entry in the BPS table is needed and the creation of the BPS table (1764, FIG. 17) is omitted.

FIG. 27 shows an example total ordering of nodes assuming the network 100 of FIG. 1. FIG. 28 illustrates a best path spanning tree constructed by the breadth-first search function (512) and calculations for the BPF table of the bridge (116a). For the illustration in FIG. 28 of network 100 of FIG. 1, several assumptions apply: the total ordering of nodes as illustrated in FIG. 27 is used, the best path calculation is for bridge 116a, and the spanning tree is rooted at segment 112a. Bridge nodes 116a–d are shown as circles and segment nodes 112a–g are shown as squares. The depth of each node in the spanning tree is shown inside the node symbol.

As shown in FIG. 28, depth 2 node 112b has two depth 1 parent candidates, nodes 116a and 116d. The corresponding best path candidates are 112a, 116a, 112b and 112a, 116d, 112b. In this case, node 112a is the last common ancestor of 116a and 116d. As illustrated in FIG. 27, node 116a is greater than node 116d according to the total ordering of nodes. Therefore the path 112a, 116a, 112b weighs more than the path 112a, 116d, 112b. For this reason, as shown on FIG. 28, parent candidate 116d is preferred over parent candidate 116a for child node 112b.

The spanning tree result shown in FIG. 28 indicates the set of best paths from segment 112a. For example, the best path from 112a to 112g is 112a, 116d, 112b, 116b, 112g. It is noted that the first node on any best path from 112a is, of course, 112a itself. Given any best path 112a, 116a, U, . . . , D, where the first node is segment 112a and the second node is bridge 116a, then U is the value for D.via. As shown in FIG. 28, this is the case for the best paths 112a, 116a, 112c and 112a, 116a, 112f. None of the other nodes have best paths from 112a of the required form, i.e., through bridge 116a, and, as shown, their via values are "nil" (for bridge 116a).

FIG. 29 shows a resulting best path forwarding (BPF) table computed in accordance with an embodiment of the present invention, taking for example the network 100 of FIG. 1. For this illustration it is assumed that the total ordering of nodes as illustrated in FIG. 27 is used, and that the BPF table is computed for bridge 116a. Row 2901 shows the entries that bridge 116a uses to decide how to forward packets it hears on segment 112a. The entries in row 2901 are the via values whose calculations are illustrated in FIG. 28. Rows 2902, 2903, and 2904 show the entries calculated in a similar fashion for segments 112b, 112c, and 112f, respectively. As shown, and as mentioned above, the "nil" entries indicate to bridge B that the best path from segment to segment (e.g., 112b to 112d) does not go through bridge B.

As shown in FIG. 29, the non-nil entries throughout each column are identical. This will always be the case. Because of the best path "suffix" property, if T, B, U, . . . , D is a best path, then B, U, . . . , D is a best path. Also, because of the best path "unique" property, this is the only best path from B to D. Therefore, an alternative implementation of the best path forwarding (BPF) can store one bit for each adjacent segment S and destination segment D, indicating whether or not BPF[S][D] was "nil". This implementation also includes storing one segment reference for each destination segment D (i.e., for each column) giving the single next-hop segment U for any best path through bridge B to D.

As an additional note regarding the routing function (506c) and, particularly, the breadth-first search function (512), each routing function (506.c1,2,3) may have a specialized version of the breadth-first search function (512), thus eliminating the requirement to pass "visit" and prefer subroutines. This ends the routing function (506c) explanation.

It may be recalled that when the communications initialization function (506) completes the create graph function (506a), the global assignments function (506b) and the routing function (506c), it calls the start/resume communication subroutine (1208, FIG. 12). This subroutine will be discussed below in the context of the location revision function (510). Once the communications initialization function (506) ends the bridge is ready to start/resume the communications operation function (508) which is hereafter described.

The Communications Operation Function

FIG. 30 shows a flowchart of the steps that a bridge performs in the communications operation function (508). The steps shown in FIG. 30 depict a combination of the packet forwarding function (508a), location learning function (508b) and location checking function (508c). These functions are not described in separate flowcharts. The location expiration function (508d) will be described separately later.

The flowchart shows the operation of the bridge in an event-driven fashion. Arrival of a host packet triggers the bridge to start at a certain event service starting step, the bridge proceeds through one or more steps and finally reaches a point at which it has no further steps to perform in service of the event. At this point the bridge waits until another host packet arrives which triggers the bridge to start again.

When a host packet is received, the bridge starts at step 3000. The bridge examines the packet to determine the packet's source address AS and destination address AD. The bridge is aware of the segment T from which the packet was received. Preferably, the bridge is aware of the port on which the packet was received. Since each segment T connected to the bridge corresponds to one port of the bridge, the bridge being aware of the port is equivalent to the bridge being aware of the segment T from which the packet was received. It is assumed that node B represents the bridge itself in the network topology graph.

In step 3002 the bridge checks that communications is operational. The "operational" state is set to FALSE by the suspend operation subroutine which is called by the propagation function (504*a*). The "operational" state is set to TRUE by the start/resume operation subroutine which is called by the communications initialization function (506). These subroutines will be discussed later. If communications is not operational, the bridge has no further actions to perform in communications operation. Hence there is no "N" branch from step 3002. In this case the host packet is discarded.

If communications is operational, the bridge proceeds to step 3004. It may be recalled that a wavefront updating the segment location of a host address AX acts as an impenetrable barrier that separates packets routed based on the old location of AX from packets routed based on the new location of AX. Therefore, if the bridge is processing a wavefront involving either the packet's source address AS or destination address AD, the bridge must discard the packet. This is checked in steps 3004 and 3006, using an OnWave subroutine in the location revision function (510) that will be discussed later.

If the packet survives the wavefront check, in step 3008 the bridge determines which segments, S and D, are associated with addresses AS and AD, respectively, and to which segments the source and destination hosts are attached. For this determination, the bridge uses a WhichSeg subroutine in the location revision function (510).

The WhichSeg subroutine returns "nil" if the segment on which the address is located is not known. In step 3010 the bridge checks if the location of the source address is unknown. It may be recalled that a host packet of unknown source location is never forwarded. Therefore, if the source location is initially unknown, the source is assumed to be located on the segment T on which the host packet was heard. So, if the source address is unknown, in step 3012, the bridge checks if it is the parent of segment T in the LRST. If so, in step 3014, the location revision request subroutine is invoked in the location revision function (510), passing to it the host address AS and segment location T. The location revision request initiates a re-learning of the host location based on the segment on which the packet was heard.

It is to be noted that every bridge connected to segment T hears the packet from the new host. The check in step 3012 causes all bridges except the LRST parent of T to suppress their calls to the location revision request subroutine, resulting in only one bridge generating this call. Alternatively, step 3012 could contain some other test to select one "representative" bridge from those connected to segment T, such as, for example, selecting the bridge whose bridge identifier is the "least". The approach using the LRST parent of T is preferred because the LRST parent of T is closest to the LRST root bridge and thus its revision request packets have fewer hops to traverse. Alternatively, step 3012 can be omitted, with the result that every bridge connected to segment T would generate a call to the location revision request subroutine and send a revision request packet to the LRST root bridge. Preferably, only the LRST parent bridge of segment T generates calls to the location revision request subroutine for new hosts that are detected on segment T.

If step 3010 determines that the source location is known, i.e., not "nil," the bridge proceeds to step 3020. If the packet's destination is a group address or if the location of the packet's destination address is unknown, then the host packet is or is considered a network flood packet (steps 3020, 3022, and 3024). It may be recalled that network flood packets are forwarded along all connections in the network flood spanning tree (NFST). A bridge only forwards network flood packets that arrive on a bridge-to-segment connection that is in the NFST, as checked in step 3024. It may be recalled that each network flood reaching (NFR) table entry, NFR[S], indicates to bridge B on which of its adjacent segments the network flood packets that originate on segment S can reach bridge B. In step 3026, the bridge checks if this segment NFR[S] is the same as T, the segment on which the packet was heard. If S is not T, the packet is not forwarded because the packet source is not initially known, as required. Furthermore, since no such packet is forwarded, the conclusion that follows is that the host must be located on segment T. Therefore the bridge proceeds to step 3028, where it calls the location revision request subroutine in the location revision function (510), including passing to it the new host address AS and segment location T.

Otherwise, if the adjacent segment S is T, the network flood packet reaches bridge B on the active connection that correctly corresponds to the source location of the packet, and the bridge proceeds to forward the packet, via step 3030. A network flood packet is forwarded onto all active connections except the one on which it arrived. Step 3030 consists of a loop through all the segments adjacent to bridge B. For each such segment U, the loop body starts at step 3060. In step 3062, the bridge checks that its connection to segment U is an active connection. Then in step 3064, the bridge checks that segment U is not the same as the segment T from which the packet arrived. Then in step 3066, the bridge forwards the host packet onto segment U. In any case, the loop body ends at step 3068. If more segments adjacent to B remain to be considered, the loop body starts again at step 3060 to consider another segment. When the loop in step 3030 is complete, the bridge has no more actions to perform for the current host packet.

If the packet survives the wavefront check, and if it does not have a group destination address and both its source and destination locations are known, the bridge proceeds to step 3040. In step 3040 it is determined whether bridge B is on the best path from the packet source location S to the segment T on which bridge B heard the packet. Namely, it is determined if entry BPS[T][S] is set to "nil" or a segment number. It may be recalled that a bridge distinguishes between packets it hears (receives) and packets it forwards (sends). If bridge B is on the best path, the packet could not have been forwarded along the best path from S to T. In other words, if bridge B is on the best path from S to T (i.e., S, . . . B, T, . . . ), bridge B expects to forward (send) the packet from S onto segment T. If bridge B hears (receives) a packet on segment T, the packet could not have been forwarded along the unique best path from S to T. Since packets with known source and destination locations are always forwarded along the unique best path from source to destination, it follows that the packet could not have started on segment S. Therefore, it follows that host address AS is not located on segment S, contradicting the information in the host location (HLOC) table.

Accordingly, for any packet heard by bridge B, step 3040 checks if bridge B is on the best path from S to T by examining the best path sourcing (BPS) table entry BPS[T][S], which gives the previous-hop segment for the best path from S to T through bridge B. If there is no such path, which is indicated by BPS[T][S]="nil", the packet is nonetheless presumed to be forwarded correctly and bridge B proceeds to step 3050.

In step 3050, the bridge consults the best path forwarding (BPF) table entry BPF[T][D] to determine the next-hop segment, U, on the best path from T to D through bridge B. If there is no such path, indicated at entry BFT[T][D] by U="nil", as checked in step 3052 the bridge ignores the packet. The packet is not forwarded.

Otherwise, if there is a path, the bridge proceeds to step 3054, where it consults the best path sourcing (BPS) table entry BPS[U][S] to determine if the best path from S to U has the form S, . . . , T, B, U. If so, then taking the packet from segment T through bridge B to segment U agrees with both the best path from S to U and the best path from T to D. Therefore, with the best path "prefix" and "suffix" properties, the path T, B, U is part of the best path from S to D. The bridge proceeds to step 3056, where it forwards the packet onto segment U. Otherwise, if in step 3054 it is determined that the best path from S to U is not S, . . . , T, B, U, the bridge discards the packet, i.e., the packet is discarded if T is not the source or U is not on the next-hop.

It is noted that the failure of the test in step 3054 is sufficient to prove that the packet could not have originated on segment S. This follows because steps 3050, 3052, and 3054 guarantee that no packet with known source and destination locations S and D is ever forwarded except along the best path from S to D. However, supposing that the best path from S to D is S, . . . , T, B, U, . . . , D, the packet could have originated on any segment between S and B and the test in step 3054 would have succeeded. Therefore, the test in step 3040 is necessary.

Suppose that the packet actually originates on segment S1 that is different from S; and there is a best path from S to S1 through bridge B1 which is the next to last node. The best path from S to S1 is described as S, . . . , B1, S1. When B1 hears the packet from S1 and consults the best path sourcing table entry BPS[S1][S] in step 3040, the test will fail. Therefore, if a host changes its segment location and sends a packet, a bridge that hears the packet will detect the location change in step 3040. Namely, the location change is detected via the test in step 3040. The location change results in failure of the test in step 3040 since the previous-hop segment on the best path from S to S1 is indicated in BPS[S1][S] entry at bridge B1 as "nil".

Hence, when the test in step 3040 fails the bridge calls, via step 3042, the location revision request subroutine in the location revision request function (510a). This will initiate the process of revising the host address AS to the new host location.

One approach to revising the host location is referred to as the "two pass location revision". Since the bridge knows that address AS is not located on segment S, in step 3042 the bridge calls the location revision request subroutine, passing to it as parameters address AS and segment "nil" to indicate that the (segment) location of address AS is unknown. Eventually, a location revision wavefront sweeps over the network and revises the HLOC tables in all the bridges to indicate that the location of address AS was unknown. Subsequently, when another packet sent from AS is heard, the bridges hearing it (on segment T) follow the "Y" branch from step 3010 and the LRST parent (step 3012) proceeds to claim a new location for address AS via step 3014.

The two pass location revision alternative has the disadvantage that it requires two packets sent by a host and two passes through the location revision process in order to determine the new segment location of a host that has changed segments. On the first pass, the change is detected via the first packet and the old location of the host is erased. On the second pass, the new location of the host is learned via the second packet. The two pass location revision alternative has the advantage that the test in step 3054 can be omitted.

An alternative approach to revising the host location is referred to as the "one pass location revision", proceeds as follows. As noted above, steps 3050, 3052, and particularly 3054, guarantee that no packet with known source and destination segment locations S and D can be forwarded except along the best path from S to D. Theoretically then, if the source host is located in fact on segment S1, as supposed above, the test in step 3040 fails in exactly one bridge, specifically, in bridge B1 on the best path S, . . . , B1, S1.

In the context of the flowchart of FIG. 30, bridge B1 is B and segment S1 is T. Hence, when bridge B (B1) hears the packet on segment T (S1) the test in step 3040 fails. Nonetheless, in accordance with the one pass location revision approach, bridge B assumes that address AS should be located on segment T. Accordingly, in step 3042 it calls the location revision request subroutine with address AS and segment T to indicate that address AS is located on segment T.

The one pass location revision approach has the disadvantage that the test in step 3054 is required. It has the advantage that it requires only one packet from the host and one pass through the location revision process. Hence, preferably, the communications operation function (508) uses the one pass location revision alternative, with steps 3042 and 3054 as shown in FIG. 30.

The communications operation function (508) determines how and whether to forward host packets based on a mapping from host addresses to segments. This mapping is contained in the host relocation (HLOC) table (480, FIG. 4), which is maintained by the location revision function (510).

FIG. 31 illustrates a data structure used to represent an entry 3100 in the host location (HLOC) table. An entry 3100 in the HLOC table is accessed by an index HX, which is preferably a non-negative integer. Each entry 3100 has two fields, an addr field 3110 and a seg field 3120.

The addr field 3110 in the entry 3100 contains the host address. It may be recalled that the host address is a unique identifier of the host; and, preferably, this unique identifier is a 48-bit Ethernet address. In place of a host address, the addr field 3110 contains a special value that is not a valid host address. This special value is used to indicate entries that do not contain a valid mapping. The special value can be implemented using an invalid host address, such as an all-zero 48-bit Ethernet address. Alternatively, and preferably, a separate "valid" bit can be used to discriminate between valid and invalid host addresses. The addr field 3110 in the entry 3100 of the HLOC table which is accessed by index HX is written as HLOC[HX].addr.

The seg field 3120 contains a reference to the segment on which the host is located, or "nil" if the segment is unknown. The seg field 3120 preferably contains the segment index number of the segment. It may be recalled that the segment index number for a segment S can be found in the field S.nodenum.

As shown in FIG. 30, the communications operation function (508) invokes, in step 3008, the "WhichSeg" subroutine. FIG. 32 shows a flowchart of the steps in the WhichSeg subroutine. This subroutine consults the HLOC table to determine the segment on which a given host address AX is located. The WhichSeg subroutine starts at step 3200. In step 3202 the subroutine searches through the HLOC table to find for an index HX the entry whose addr field 3110 contains the desired host address AX. This search can be performed using various techniques, for example, one or more hash tables or an associative memory. Step 3204 checks if the search was successful or not. If the search was successful, the subroutine proceeds to step 3206, where it returns the value (HLOC[HX].seg) contained in the seg field 3120 of the entry found in the search. The seg field 3120 of the HLOC table contains a reference to the segment on which host address AS is known to be located, or "nil" if the segment on which the host address AS is located is unknown.

That is, if the search was not successful, the subroutine proceeds to step 3208, where it returns "nil", meaning that, according to the HLOC table, the segment on which the host address AS is located is not known.

In addition to a packet forwarding function (508a), a location learning function (508b), and a location checking function (508c), the communications operation function (508) also includes a location expiration function (508d). The purpose of the location expiration function is to prevent the HLOC table from getting full. A secondary purpose is to remove stale entries from the HLOC table.

FIG. 33 shows a flowchart of the steps that a bridge B performs in location expiration function (508d). The bridge starts this function from time to time as needed (step 3300). In step 3302 the bridge verifies that its operational state is TRUE. If so, the bridge proceeds to step 3304, where it determines if an entry HX expired. To expire this entry needs to satisfy three requirements. First, the entry needs to contain a valid host address AX and a non-nil segment X. Second, the segment X needs to be a child of bridge B in the LRST. Third, the entry needs to be stale, i.e., not accessed recently by the WhichSeg subroutine.

There are two reasons to require that the segment X be a child of bridge B in the LRST. First, a bridge should expire HLOC entries only for segments to which it is connected. A bridge connected to a segment X hears all packets to and from hosts on segment X. Bridges not connected to segment X will not be necessarily familiar with all the traffic to and from hosts on segment X. If segment X is a child of bridge B in the LRST, bridge B is certainly connected to segment X. Thus, the HLOC entries for segment X are accessed by the WhichSeg subroutine in such a bridge for all the traffic to and from hosts on segment X.

Second, to eliminate redundant efforts, only one bridge should expire HLOC entries for a given segment X. The best choice is the parent of X in the LRST, since its revision request packets will have the shortest distance to travel to the LRST root bridge.

There are various techniques for selecting an entry HLOC [HX] that fulfills the three requirements as mentioned above. For example, the location expiration function (508d) can make regular passes through the HLOC table, each time incrementing a field (not shown in FIG. 31) in the HLOC table entry. The WhichSeg subroutine would set this field to zero whenever it accessed the entry. When the field for HLOC[HX] reaches a sufficiently high value, i.e., becomes stale, and assuming fulfillment of the other requirements (i.e., HLOC[HX] containing a valid address and a non-nil segment X, and LRC[X] containing segment X child of B), the location expiration function (508d) chooses to expire the HCLOC[HX] entry.

In step 3306 the bridge checks if the attempt to find the HLOC[HX] entry was successful (i.e., if an entry corresponding to HX exists). If so, the bridge proceeds to step 3308, where it calls the location revision request subroutine to indicate that the currently known segment location of address AX is invalid; or to remove the currently known location. Eventually a revision wavefront will sweep through the network and revise the HLOC tables accordingly.

While, as explained above, the communications operation function (508) of the bridge involves packets forwarding decisions, the location revision function (510) involves revising packet source host locations in order to facilitate the forwarding decisions. The "start/resume operation" and suspend operation subroutines, nominally part of the communications operation function (508), are discussed below in the context of the location revision function (510).

The Location Revision Function

The location revision function (510) includes two subsidiary functions: a revision request function (510a) and a revision wavefront function (510b). The revision request function (510a) is initiated when the communications operation function (508) learns a host location, detects a change in host location, or decides to expire a host location. The communications operation function (508) calls the location revision request subroutine passing to it the host address and new segment location. The new segment location is "nil" in the case that the communications operation function (508) desires to remove from the HLOC table the currently known but invalid host's segment location. This happens, for example, when the communications operation function (508) detects that the known location according to the HLOC table is wrong but is unable to determine what the correct segment location should be.

It may be recalled that the LRST is chosen by the location revision routing function (506c.1), based on the total network report (440, FIG. 4). Since each bridge preferably operates deterministically from identical copies of the total network report, each bridge chooses the same LRST. As part of the location revision routing function (506c.1), each bridge inspects the LRST to determine its grandparent, the LRG (450, FIG. 4).

Hence, the revision request function (510a) passes the revision request up along the location revision spanning tree (LRST) by sending a revision request packet to its location revision grandparent (LRG). The LRG repeats the process by sending a packet to its LRG. The revision request packet progresses along the LRST from LRG to LRG until it reaches the root bridge of the LRST, at which point the revision wavefront function (510b) is initiated.

The revision wavefront function (510b) starts at the root bridge of the LRST and creates a revision wavefront that, in cooperation with the other bridges in the network, spreads through the network revising each bridge's HLOC table. A wavefront spreads through the network by means of a wavefront protocol based on an exchange of bridgeto-bridge packets. With regards to any given wavefront, at any moment in time each bridge is either "ahead," "on," or "behind" the wavefront. A bridge is "ahead" of a wavefront as long as it has not yet received any location revision wavefront packet. When a bridge first receives such a packet, it is "on" the wavefront. A bridge on a wavefront exchanges packets with each of its neighbor bridges, informing them of the wavefront and receiving acknowledgements. Once acknowledgements from all of its neighbors have been obtained, a bridge is "behind" the wavefront. Because of the way a wavefront protocol works, for any given wavefront in progress a path from a bridge ahead of the wavefront to a bridge behind the wavefront always goes through a bridge on the wavefront. This isolates the old from the new and prevents forwarding packets to incorrect addresses.

To manage the operations of a bridge in spreading wavefronts across the network, the revision wavefront function (510b) uses, for example, a location revision wavefront (LRW) queue (482, FIG. 4) and several other state variables. Wavefronts are originated by the LRST root bridge, which assigns successive index numbers to each wavefront. When forwarding revision wavefront packets, each bridge includes in each packet the wavefront index number in order to determine whether a packet from a neighbor bridge pertains to an old wavefront that the bridge already knows about, or to a new wavefront.

As a simple example, the wavefront index numbers start at 0 and count up from there. A bridge requires that a neighbor acknowledge wavefront W before the bridge will send anything to that neighbor about wavefront W+1. Therefore, a small, finite cycle of sequence numbers conveyed in the wavefront and acknowledgement packets suffices to allow neighboring bridges to discriminate between old and new wavefronts. Although in this design the wavefront index numbers are not conveyed explicitly in the revision wavefront and acknowledgement packets, they are conveyed implicitly in the order of succession of new wavefronts. The preferred approach uses a cycle of 256 sequence numbers.

Also in this example, the wavefront index numbers are used to access entries, LRW[W], in the location revision wavefront (LRW) queue. LRW[W] is an entry in the location revision wavefront queue that corresponds to the wavefront index number W. The revision wavefront function (510b) uses several related variables. LROLD is a variable containing the highest index number of a wavefront that the bridge has not yet been behind. LRNEW is a variable containing the highest index number of a wavefront that the bridge has not yet been on. Only entries for wavefront index numbers W in the range LROLD≦W≦LRNEW need to be considered. To this end, a finite circular buffer is arranged to function as a queue whose entries are indexed, provided that LRNEW never gets too far ahead of LROLD. Moreover, a finite cycle of values is used for LROLD, W, and LRNEW.

In addition to the LRW queue and the LROLD and LRNEW variables, the revision wavefront function (510b) also uses variables such as LRNEED and LRW timer. LRNEED contains the set of neighbors that have not yet acknowledged the bridge's oldest wavefront which is identified with the wavefront index number LROLD. Various other ways of implementing the LRNEED set are possible. For example, the LRNEED set is implemented using a flag field (not shown in FIG. 14) in the node data structure, along with a counter that contains the number of elements in the set. The LRNEED set and the LRW timer are used to control transmissions of wavefront packets.

FIG. 34 illustrates a data structure used to represent an entry 3400 in the location revision wavefront (LRW) queue. Each entry 3400 has three fields: an hx field 3410, an addr field 3420, and a seg field 3430. The hx field 3410 contains an index into the host location (HLOC) table, of which each bridge has a copy. The addr field 3420 contains a host address, for example, a 48-bit Ethernet address. The seg field 3430 contains a reference to the segment on which the host is located, or "nil" if the segment is unknown.

FIG. 35 shows a flowchart of the steps in an OnWave subroutine. The OnWave subroutine determines whether or not a given host address AX is the subject of a wavefront that the bridge is currently on. The OnWave subroutine starts at step 3500. In step 3502 the subroutine searches through the LRW queue to find a wavefront W for an entry whose addr field 3520 contains the desired host address AX. This search can be performed by various techniques such as checking entries one by one, using one or more hash tables, or using an associative memory. Step 3504 checks if the search was successful or not. If the search was successful, the subroutine proceeds to step 3506, where the result is "Y"; otherwise the subroutine proceeds to step 3508, where the result is "N".

It may be recalled that the propagation function (504a) invokes a suspend operation subroutine to suspend the communications operation. FIG. 36 shows a flowchart of the steps in the suspend operation subroutine. The suspended operation subroutine starts at step 3600. In step 3602 the subroutine sets the operational state to FALSE and cancels the LRW timer. There are no further actions in the subroutine. When the operational state is FALSE, the communications operation function (508) and the location revision function (510) discard all received packets without processing them, as may be noted in the relevant flowcharts.

FIG. 37 shows a flowchart of the steps in the start/resume operation subroutine, which is called from the communications initialization function (506). The start/resume subroutine starts at step 3700. In step 3702 the subroutine initializes the host location (HLOC) table, setting each entry to contain an invalid address and a "nil" segment reference. In step 3704 the subroutine resets the wavefront index numbers LROLD and LRNEW to zero and then sets the operational state to TRUE. There are no further actions in the subroutine.

It is noted that the suspend operation subroutine is called from the propagation function (504a) when the bridge first hears of a new topology acquisition instance. Conversely, the start/resume operation subroutine is called from the communications initialization function (506) after the bridge has received the total network report and completed its routing computations. A bridge receives the total network report during the distribution function (504c), after all bridges in the network perform the propagation function (504a) and the collection function (504b). Therefore, there is a point in time when all bridges in the network have their operational state set to FALSE if the POST root bridge has finished the collection function (504b) but has not yet started the distribution function (504c).

When the network advances from one topology acquisition instance to the next, it is more convenient if there are no host packets, revision request packets, or revision wavefront packets that survive from the old instance. Since the new topology acquisition instance may have a different assignment of segment index numbers, the old packets may not even make sense in the new instance. It is noted that an occasional survival of old host packets or old revision request packets is not a serious problem since the damage extends only to locating a host on the wrong segment. The location learning function (508b) and location checking function (508c) are prepared to deal with hosts located on the wrong segment as a matter of normal operation. However, to prevent confusion old revision wavefront packets should not be allowed to survive, especially in the design that uses a small cycle of sequence numbers for distinguishing between old and new wavefronts.

To that end, an "explicit instance" approach includes the topology acquisition instance identifier in each wavefront packet in order to prevent the survival of old revision wavefront packets from one topology acquisition instance to the next. Then, all wavefront packets that do not belong to the current topology acquisition instance are ignored as spurious. This approach has the advantage that it does not depend on packet delivery order between bridges. This approach has the disadvantage that additional space and time is consumed in processing wavefront packets.

An alternative approach, called "ordering dependent", relies on a packet delivery ordering property and the fact that each bridge (1) calls "suspend operation," (2) sends a propagation packet to each neighbor and gets back a reply, and (3) calls "start/resume operation" after getting the total network report. If the bridge hardware and software guarantees that packets are not reordered, then sending a propagation packet to each neighbor will flush any wavefront packet in front of it. Therefore when a bridge gets propagation acknowledgements from all of its neighbors it knows that all of its wavefront packets have been flushed out. Consequently, when the POST root bridge finishes the collection function (504b) it knows that all old wavefront packets in the entire network have been flushed out. This alternative has the advantage of not requiring additional space and time for wavefront packets. It also guarantees that no host packet or revision request packet can survive from one topology acquisition instance to the next. It has the disadvantage of relying on a packet delivery ordering property. Therefore, "explicit instance" is the preferred approach.

FIG. 38 shows a flowchart of the steps that a bridge performs in the revision request function (510a). A bridge starts performing the revision request function (510a) when it receives a revision request packet or when the communications operation function (508) calls the location revision request subroutine.

When a bridge receives a revision request packet, it starts at step 3800. In step 3802 the bridge checks to see that communications operation and location revision is operational, and if so, it proceeds to step 3804. If not, there are no further actions to perform for this packet. In step 3804 the bridge checks if the given host address is involved in a wavefront that the bridge is currently on. If so, the bridge must act as an impenetrable barrier and discard the packet. Otherwise, the bridge proceeds to step 3812, where steps continue in the same manner as for the location revision request subroutine.

The location revision request subroutine starts at step 3810. It is assumed that the host address AX is not involved in a wavefront that the bridge is currently on. This assumption applies, the location revision request subroutine is called only from the communications operation function (508) and only for host addresses AS and AD that were checked, as can be observed in steps 3004 and 3006 of FIG. 30. In step 3812 the bridge checks if it is the root bridge of the LRST. If not, it proceeds to step 3814 where it relays the revision request packet to its location revision grandparent (LRG) bridge.

Otherwise, if the bridge is the root bridge of the LRST, the bridge proceeds to step 3822. As the LRST root bridge, it creates a revision wavefront for this request. In step 3822 the bridge checks if there is room in its LRW queue. Since the LRW queue is finite, it might be full at this moment, and if it is determined to be full, the LRST root bridge simply discards the revision request. If the queue is not full, the bridge proceeds to step 3824, where it attempts to find an entry in the HLOC table pertaining to the host address AX. There are various ways to do this, as discussed earlier in the context of the WhichSeq subroutine. The success of the HLOC table search is checked in step 3826. If there is no such entry, in step 3828 the bridge attempts to find an entry corresponding to a host address whose segment location is unknown. The success of this table search is checked in step 3830. If an entry is found, the bridge proceeds to step 3832, where it calls the create wavefront subroutine. If neither table search attempt has succeeded, the HLOC table is full and the revision request (which in this case must be for a new host address) must be discarded.

In the "explicit HX" approach, the LRST root bridge finds a HLOC table entry to use for the location revision and explicitly passes the index HX of this entry to the create wavefront subroutine. The create wavefront subroutine explicitly includes HX in the wavefront packets that spread through the network.

Alternatively, since each bridge processes wavefronts in the same order, starting from the same, empty HLOC table, each bridge can deterministically perform the same searches for the entry and separately calculate the same index HX. Therefore, in the "implicit HX" approach, each bridge can perform the same updates.

The implicit HX approach has the advantage that the HX value need not be carried in the wavefront packets. The explicit HX approach is preferred since it has the advantage that searching for an entry is performed only once for each wavefront. A non-deterministic function can be used as in the case of an associate memory.

To simplify the illustration, certain variations are omitted from the flowchart in FIG. 38. For example, it would be useful to suppress a flurry of repeated revision requests involving the same subject host and segment. Additionally, it would be useful to include multiple revision requests into one revision request packet. It would also be useful to limit the rate at which revision request packets were generated.

It is not necessary to guarantee that revision request packets are received. If a revision request packet is lost, a subsequent packet sent by the subject host will invoke another revision request packet. Alternatively, a reliable transmission protocol can be used to send revision request packets, but the additional complexity may not be worth the benefit.

At the conclusion of the revision request function (510a), the location revision function (510) prompts the start of the revision wavefront function (510b). The revision wavefront function is discussed next in conjunction with FIG. 39.

FIG. 39 shows a flowchart of the steps that a bridge performs in the revision wavefront function (510b). The flowchart illustrates the bridge operation in an event-driven fashion.

When a bridge receives a revision wavefront packet it starts at step 3900. The bridge inspects the packet and extracts the wavefront index number W, the HLOC table index HX, the host address AX, and the segment X. The bridge determines also the neighbor bridge C that sent the packet. The bridge can use the source address of the packet to determine the neighbor bridge C (the "implicit neighbor" alternative) or, preferably, the neighbor can include its assigned node index number in the packet (the "explicit neighbor" alternative).

In step 3902 the bridge checks if its operational state is TRUE. If not, the bridge has no further actions to perform and the revision wavefront packet is discarded. Otherwise the bridge proceeds to step 3904, where it checks the wavefront index number W to determine if the packet corresponds to a new or an old wavefront. If W is less than LRNEW, it is an old wavefront and all the bridge has to do is send an acknowledgement, which it does in step 3906. If W equals LRNEW, it is a new wavefront and the bridge proceeds to step 3908. Since the neighbor bridge C does not send a packet for wavefront W+1 until this bridge acknowledges wavefront W, it is unlikely that W is even greater than LRNEW; but if so, the bridge just discards the packet.

In step 3908 the bridge checks that there is room for another entry in the LRW queue. If so, then the bridge proceeds to step 3910, where it sends a wavefront W acknowledgement back to neighbor bridge C. Then in step 3912, it calls the create wavefront subroutine with the HLOC table index HX, address AX, and segment X that it extracted from the revision wavefront packet.

The create wavefront subroutine assigns HX, AX, and X to fields in the entry of the LRW queue that is accessed by wavefront index number LRNEW. As noted before, the index number LRNEW, is checked in step 3904 to determine if it is equal to the wavefront index number W of the revision wavefront packet. Thus, even though the wavefront index number W is not passed explicitly to the create wavefront subroutine, the correct entry in the LRW queue is used.

Before completing the revision wavefront function (510*b*), the bridge invokes the create wavefront subroutine for the revision wavefront packet it received in step 3912. The create wavefront subroutine starts at step 3920. In the LRST root bridge, this subroutine is called from the revision request function (510*a*) as a result of receiving a revision request packet or a call to the location revision request subroutine. In bridges other than the LRST root bridge, the create wavefront subroutine is called from the revision wavefront function (510*b*) as a result of receiving a revision wavefront packet, as just described.

The create wavefront subroutine assumes that when invoked the operational state is TRUE, that the LRW queue has room to hold another entry, and the wavefront index number of the new entry is LRNEW. The HLOC table index is given as HX, the address is given as AX, and the segment is given as X.

In step 3922, the bridge revises entry HLOC[HX] to contain the host address and segment for the new wavefront. Alternatively, this can be done just prior to step 3944, or at any point while the bridge is "on" the wavefront.

In step 3924 the bridge constructs a new entry in the LRW queue and increments LRNEW. Inserting the entry for wavefront index number LRNEW in the LRW queue means that the bridge is now "on" this wavefront. The OnWave subroutine indicates that address AX is involved in a wavefront that the bridge is on. It is noted that a given host address AX may appear multiple times in different entries in the LRW queue. A given HLOC table index HX may also appear multiple times in different entries in the LRW queue, perhaps with different host addresses.

After step 3924, the bridge proceeds to step 3926, where it compares LRNEW and LROLD to determine if the newly added entry on the LRW queue is the only entry. If not, then the LRNEED set and the LRW timer are already in use for the LROLD wavefront, and no further actions are needed. Otherwise, the newly added entry is wavefront number LROLD and bridge proceeds to step 3948 to initiate transmission for it.

In step 3948 the bridge sets the variable LRNEED to the set of neighbors of the bridge. These are the neighbors that still need to provide an acknowledgement of wavefront LROLD to the bridge. In step 3950 the bridge checks if this set is empty. If the network contains only one bridge, then it will have no neighbors and the set LRNEED will be empty at this point. If LRNEED is empty, the bridge proceeds to step 3944, where it increments LROLD, thus removing the oldest wavefront from the LRW queue. Then in step 3946 the bridge checks if the LRW queue is empty, and if not, proceeds again to step 3948 to initiate transmission of the oldest remaining wavefront.

Otherwise the test in step 3950 determines that the LRNEED set is not empty, and the bridge proceeds to step 3962, where it sends a revision wavefront packet to each neighbor remaining in the set LRNEED. Then in step 3964 it starts the LRW timer, so that a suitable interval may pass allowing for the neighbors to acknowledge the wavefront. When the LRW timer expires, step 3960, the bridge proceeds again to step 3962 to retransmit a revision wavefront packet to each neighbor remaining in the LRNEED set.

When a neighbor bridge receives a revision wavefront packet, it follows steps starting at 3900 and replies with an acknowledgement in step 3906 if the wavefront is old, or in step 3910 if it accepts the wavefront as new. Conversely when the bridge receives a revision wavefront acknowledge packet, it starts at step 3930.

The bridge examines the packet and extracts the wavefront index number W and the identity of the sending neighbor bridge C. The bridge can use the source address of the packet to determine the neighbor bridge C (the "implicit neighbor" approach) or, preferably, the neighbor can include its assigned node index number in the packet (the "explicit neighbor" approach). Additionally, the bridge verifies that the operational state is TRUE and that the wavefront index number W equals LROLD, in steps 3932 and 3934. In step 3936 the bridge verifies that its LRW queue actually contains the wavefront for LROLD. If all these tests succeed, then the bridge is currently sending wavefront packets to its neighbors and neighbor bridge C has just acknowledged. The bridge proceeds to step 3938, where it removes neighbor bridge C from the LRNEED set. Then in step 3940 the bridge checks if the LRNEED set is now empty. If the LRNEED set is not empty, there are no further actions to perform. If it is empty, then the bridge proceeds to step 3942, where it cancels the LRW timer to avoid further retransmissions. Then the bridge proceeds to step 3944, where it removes the oldest wavefront from the LRW queue by incrementing LROLD, and in succeeding steps the bridge handles any remaining wavefronts on the LRW queue, as discussed above.

To simplify the illustration, certain details have been omitted from the flowchart in FIG. 39. For example, as in all reliable transmission protocols, some provision needs to be made for the case in which an acknowledgement fails to arrive after repeated retransmissions. Preferably, after a suitable number of retransmissions, the bridge calls the force port off-line subroutine for the port that is used to send packets to a neighbor that has failed to acknowledge. Also, certain variations in the implementation of the revision wavefront function may include limiting the rate at which the LRST root bridge creates new wavefronts. It may also be useful to include multiple revision wavefronts into one revision wavefront packet.

The foregoing features, although optimal and varied, improve the operation of revision wavefront function (510*b*). This, in turn, provides for improved hosts location management at the bridged network level with the improvement pertaining to the location revision function (510) of each bridge.

As an additional feature of the invention, a variant of a replication technique can be incorporated therein in order to spread the communication load among different shortest paths. A network that is interconnected with a high degree of redundancy, for example, for the purpose of fault-tolerance, will generally have multiple shortest paths between any two given segments. The functions that need to be modified in order to incorporate replication are the best path routing function (506c.3) and the communications operation function (508). With replication incorporated therein, the best path routing function (506c.3) creates a plurality of BPF and BPS tables, one set for each universe, using different tie-breaker rules in each universe so that, if any exist, different sets of best paths are likely to be chosen. The different tie-breaker rules can be obtained by applying a different permutation to the node ranks in each universe. This can be accomplished through deterministic construction of a set of pseudo-random permutations.

The communications operation function (508) with the replication incorporated therein, when handling a packet whose source and destination segment locations are known, performs a hash of the source and destination addresses to determine the universe to which the packet belonged. With this configuration, the communications operation function also uses the corresponding BPF and BPS tables.

The location revision routing and network flood routing can also be replicated into a plurality of universes. However, there seems to be no advantage in doing so. The segment inventory function (502), topology acquisition function (504), and location revision function (510) operate exactly the same as without replication.

It is noted that when the replication technique is applied to standard spanning-tree bridges, a bridge must learn the location of each host separately in each universe. This is because what is learned is not the actual segment location of the host but rather the bridge port that lies in the direction of the host, and this bridge port is likely to be different in each universe. When the segment location of a host is learned, that location is the same in all universes. Hence, once its HLOC table is updated, a bridge can forward packets in any universe along a shortest path to and from that host. The only difference between the universes is the choice of shortest path.

In summary, the present invention provides a bridged network configured to overcome the network bandwidth limitation and improve its overall performance. Each bridge in the network is equipped with the above-described suite of functions in order to facilitate the improved performance of the network. One of the noted features in the bridge operations is the transparent shortest path routing. The above described bridge operations are transparent to hosts. Namely, hosts communicate with each other through bridges as if they were on the same network segment. In providing the transparent shortest path routing, the invention improves the network bandwidth and mitigates the bridged network gridlock problem referred to as the L2-mesh problem.

Other embodiments will be apparent to those skilled in the art from consideration of the specification and practice of the invention disclosed herein. It is intended that that the specification and examples be considered as exemplary only, with a true scope of the invention being indicated by the following claims and equivalents.

What is claimed is:

1. A method for managing end stations locations in a bridged network, comprising:

providing one or more smart bridges;

performing in each of the smart bridges an end stations locations revision which manages a host location (HLOC) table, the end stations locations revision being invoked upon detecting changes in any end station location in order to prevent different smart bridges from using different end stations locations for a same end station that changed its locations; and wherein a location revision wavefront starts at a root of a location revision spanning tree (LRST) over a topology of the bridged network, the location revision wavefront, in cooperation with other smart bridges in the bridged network, spreading to the other smart bridges a location revision wavefront for revising the HLOC of each of the other smart bridges.

2. The method of claim 1, further comprising:

performing in each of the smart bridges communications operation using a network flood active port connections (NFA) table, a network flood reaching (NFR) table, a best path forwarding (BPF) table and a best path sourcing (BPS) table, the communications operation invoking the end stations locations revision upon detecting the changes in any end station location.

3. The method of claim 1, wherein the HLOC table includes entries accessed by an index, each entry having host address and segment fields.

4. The method of claim 3, wherein the host address is an identifier of the host including a 48-bit Ethernet address.

5. The method of claim 3, wherein each HLOC table entry further includes a "valid" bit indicating valid and invalid host address.

6. The method of claim 3, wherein each segment field indicates the segment on which a given host address is located.

7. The method of claim 1, wherein the end stations locations revision passes a location revision request from a smart bridge via a location revision grandparent (LRG) of the smart bridge up along a location revision spanning tree (LRST) until a root of the LRST is reached unless the smart bridge is the root of the LRST, the location revision request passing from one respective LRG to a next respective LRG until the root is reached.

8. The method of claim 1, wherein the location revision wavefront spreads through the bridged network by means of a wavefront protocol which governs bridge-to-bridge exchange of location revision request packets.

9. The method of claim 1, wherein the root assigns a serial number including an index number to each location revision wavefront the root originates so that each smart bridge forwards the location revision request together with the serial number in order to indicate whether the location revision request pertains to a new or old location revision wavefront.

10. The method of claim 9, wherein the end station location revision uses a location revision wavefront (LRW) queue for managing location revision wavefronts, the index number being used for accessing the LRW queue.

11. The method of claim 1, wherein the end stations locations revision uses a location revision wavefront (LRW) queue for managing location revision wavefronts.

12. The method of claim 11, wherein the LRW queue is a finite circular buffer arranged to function as a queue whose entries are indexed so that only entries which correlate to index numbers between old (LROLD) and new (LRNEW) need to be considered.

13. The method of claim 12, wherein any one of the smart bridges that receives the location revision wavefront packet determines a neighbor bridge that sent the location revision wavefront packet from the source address or from a node index associated with the neighbor bridge if the node index is included in the location revision wavefront packet.

14. The method of claim 1, wherein receipt of a location revision wavefront packet prompts the start of the end stations locations revision in which the location revision wavefront packet provides a wavefront index, a HLOC table index, a host address, identification of the segment to which the host is attached and the source address of the packet.

15. The method of claim 14, wherein, if the wavefront index equals a new wavefront index number (LRNEW), the end stations locations revision revises an entry of the HLOC pointed by the HLOC table index with the host address and segment identification.

16. The method of claim 14, wherein the end stations locations revision sends an acknowledgment to a neighbor bridge that sent the location revision wavefront packet if the wavefront index is less than LRNEW.

17. A method for managing end stations locations in a bridged network, comprising:
providing one or more smart bridges;
performing in each of the smart bridges an end stations locations revision which manages a host location (HLOC) table he end stations locations revision being invoked upon detecting changes in any end station location in order to prevent different smart bridges from using different end stations locations for a same end station that changed its location; and
wherein the end stations locations revision in any of the smart bridges exchanges location revision packets with other smart bridges in the bridged network according to a respective location revision grandparent (LRG), a respective location revision child (LRC) table and a location revision wavefront distribution protocol.

18. A method for managing end stations locations in a bridged network, comprising:
providing one or more smart bridges;
performing in each of the smart bridges an end stations locations revision which manages a host location (LOC) table, the end stations locations revision being invoked upon detecting changes in any end station location in order to prevent different smart bridges from using different end stations locations for a same end station that changed its location; and
wherein a location revision wavefront starts at a root of a location revision spanning tree (LRST) over a topology of the bridged network, for any location revision wavefront each of the smart bridges being ahead, on or behind the location revision wavefront.

19. The method of claim 18, wherein any one of the smart bridges is ahead of the location revision wavefront as long as the smart bridge did not yet receive a location revision wavefront packet pertaining to said location revision wavefront, the smart bridge being on the location revision wavefront upon receiving a first location revision wavefront packet pertaining to said location revision wavefront, the smart bridge being behind the location revision wavefront when it receives an acknowledgment to its location revision wavefront packet pertaining to said location revision wavefront from all its neighbor bridges.

20. The method of claim 18, wherein the location revision wavefront provides a barrier between smart bridges that are ahead of the location revision wavefront which continue to use old end stations locations and smart bridges that are behind the location revision wavefront which use new end stations locations.

21. A bridged network, comprising
one or more smart bridges configured to manage end stations locations in a bridged network, each of the smart bridges comprising:
a location revision module configured to exchange location rein packets with other bridges according to a location revision grandfather (LRG), a location revision child (LRC) table and a location revision wavefront distribution protocol, the location revision module inserting new host location information into a host location (HLOC) table; and
a communications operation module configured to check and forward packets; the communications operation module invoking the location revision module to update host locations upon detecting a change in the host locations.

22. The bridged network of claim 21, wherein the communications operation module uses a network flood active port connections (NFA) table, a network flood reaching (NFR) table, a best path forwarding (BPE) table and a best path sourcing (BPS) table.

23. The bridged network of claim 21, wherein the smart bridge further comprises a data channel and a port, the location revision module exchanging location revision packets with other bridges via the data channel and through the port.

* * * * *